(12) United States Patent
Dubey et al.

(10) Patent No.: US 11,224,990 B2
(45) Date of Patent: Jan. 18, 2022

(54) CONTINUOUS METHODS OF MAKING FIBER REINFORCED CONCRETE PANELS

(71) Applicant: UNITED STATES GYPSUM COMPANY, Chicago, IL (US)

(72) Inventors: Ashish Dubey, Grayslake, IL (US); Peter B. Groza, Antioch, IL (US); Christopher R. Nelson, Lindenhurst, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 1054 days.

(21) Appl. No.: 15/663,007

(22) Filed: Jul. 28, 2017

(65) Prior Publication Data
US 2018/0036912 A1 Feb. 8, 2018

Related U.S. Application Data

(60) Provisional application No. 62/371,554, filed on Aug. 5, 2016.

(51) Int. Cl.
*B28C 7/04* (2006.01)
*B28C 5/40* (2006.01)
(Continued)

(52) U.S. Cl.
CPC .......... *B28C 7/0418* (2013.01); *B01F 3/1221* (2013.01); *B01F 7/0065* (2013.01);
(Continued)

(58) Field of Classification Search
CPC ..... B28C 7/0418; B28C 5/402; B28C 5/1246; B28C 5/1238; B28C 5/143; B28C 5/148;
(Continued)

(56) References Cited

U.S. PATENT DOCUMENTS

| 2,407,514 A | 9/1946 | Rembert |
| 3,284,980 A | 11/1966 | Dinkel |

(Continued)

FOREIGN PATENT DOCUMENTS

| CL | 2007003152 A1 | 4/2008 |
| CL | 2009000371 A1 | 10/2009 |

(Continued)

OTHER PUBLICATIONS

International Search Report and Written Opinion dated Nov. 27, 2017 for PCT/US2017/0045433 to United States Gypsum Company filed Aug. 4, 2017.

(Continued)

*Primary Examiner* — Charles Cooley
(74) *Attorney, Agent, or Firm* — Vorys, Sater, Seymour and Pease LLP; Pradip Sahu; Philip T. Petti

(57) ABSTRACT

Continuous method including mixing water and cementitous powder to form slurry; mixing the slurry and reinforcement fibers in a single pass horizontal continuous mixer to form fiber-slurry mixture, the mixer including an elongated mixing chamber having a reinforcement fiber inlet port, and upstream of the fiber inlet port is an inlet port to introduce water and cementitous powder together as one stream or at least two inlet ports to introduce water and dry cementitous powder separately as separate streams into the chamber, a rotating horizontal shaft/s within the chamber, part of the chamber for mixing the fibers and slurry and moving the fiber-slurry mixture to a mixture outlet; discharging the fiber-slurry mixture from the mixer outlet; forming and setting the fiber-slurry mixture on a moving surface; cutting the set mixture into fiber reinforced concrete panels and removing the panels from the moving surface.

20 Claims, 41 Drawing Sheets

(51) Int. Cl.

| | | |
|---|---|---|
| *B28C 5/12* | (2006.01) | |
| *B28B 5/02* | (2006.01) | |
| *B28B 3/22* | (2006.01) | |
| *B01F 7/00* | (2006.01) | |
| *B01F 7/08* | (2006.01) | |
| *B28C 5/14* | (2006.01) | |
| *B01F 7/04* | (2006.01) | |
| *B29B 7/48* | (2006.01) | |
| *B28B 1/52* | (2006.01) | |
| *B29B 7/90* | (2006.01) | |
| *B29C 48/67* | (2019.01) | |
| *B29B 7/72* | (2006.01) | |
| *B29B 7/44* | (2006.01) | |
| *B01F 3/12* | (2006.01) | |
| *B28B 13/02* | (2006.01) | |
| *B01F 15/02* | (2006.01) | |
| *B01F 3/20* | (2006.01) | |
| *B05C 1/08* | (2006.01) | |

(52) U.S. Cl.
CPC .......... *B01F 7/00708* (2013.01); *B01F 7/042* (2013.01); *B01F 7/085* (2013.01); *B28B 1/522* (2013.01); *B28B 1/526* (2013.01); *B28B 3/224* (2013.01); *B28B 5/027* (2013.01); *B28B 13/0275* (2013.01); *B28C 5/1238* (2013.01); *B28C 5/1246* (2013.01); *B28C 5/1284* (2013.01); *B28C 5/143* (2013.01); *B28C 5/146* (2013.01); *B28C 5/148* (2013.01); *B28C 5/402* (2013.01); *B29B 7/44* (2013.01); *B29B 7/482* (2013.01); *B29B 7/483* (2013.01); *B29B 7/488* (2013.01); *B29B 7/72* (2013.01); *B29B 7/90* (2013.01); *B29C 48/67* (2019.02); *B01F 3/2042* (2013.01); *B01F 7/048* (2013.01); *B01F 2015/0221* (2013.01); *B05C 1/0834* (2013.01)

(58) Field of Classification Search
CPC ....... B28C 5/146; B28C 5/1284; B28B 5/027; B28B 3/224; B28B 1/526; B28B 1/522; B28B 13/0275; B01F 7/00708; B01F 7/085; B01F 7/042; B01F 7/0065; B01F 3/1221; B01F 2015/0221; B01F 3/2042; B01F 7/048; B29B 7/483; B29B 7/482; B29B 7/90; B29B 7/488; B29B 7/72; B29B 7/44; B29C 48/67; B05C 1/0834
See application file for complete search history.

(56) References Cited

U.S. PATENT DOCUMENTS

| | | | |
|---|---|---|---|
| 3,354,031 A | 11/1967 | Kozacik | |
| 3,785,621 A | 1/1974 | Hoskins | |
| 3,885,774 A | 5/1975 | Harris et al. | |
| 3,972,972 A | 8/1976 | Yano et al. | |
| 4,093,471 A | 6/1978 | Greig | |
| 4,187,275 A | 2/1980 | Bracalielly et al. | |
| 4,205,919 A | 6/1980 | Attwell | |
| 4,298,413 A | 11/1981 | Teare | |
| 4,450,022 A | 5/1984 | Galer | |
| 4,504,533 A | 3/1985 | Altenhofer et al. | |
| 4,793,892 A | 12/1988 | Miller et al. | |
| 5,018,673 A | 5/1991 | Eirich et al. | |
| 5,051,221 A | 9/1991 | Bold | |
| 5,221,386 A | 6/1993 | Ensminger et al. | |
| 5,249,547 A | 10/1993 | Takada et al. | |
| 5,306,452 A | 4/1994 | Todd | |
| 5,366,676 A | 11/1994 | Kobayashi | |
| 5,520,779 A | 5/1996 | Bold | |
| 5,891,374 A | 4/1999 | Shah et al. | |
| 5,902,528 A | 5/1999 | Spragg | |
| 6,001,496 A | 12/1999 | O'Haver-Smith | |
| 6,248,156 B1 | 6/2001 | Lucas | |
| 6,248,214 B1 | 6/2001 | Stotz et al. | |
| 6,299,970 B1 | 10/2001 | Richards et al. | |
| 6,620,487 B1 | 9/2003 | Tonyan et al. | |
| 6,986,812 B2 | 1/2006 | Dubey et al. | |
| 7,049,251 B2 | 5/2006 | Porter | |
| 7,347,895 B2 | 3/2008 | Dubey | |
| 7,347,896 B2 | 3/2008 | Harrison | |
| 7,354,876 B2 | 4/2008 | Porter et al. | |
| 7,384,514 B2 | 6/2008 | Walters et al. | |
| 7,416,636 B2 | 8/2008 | Blomqvist et al. | |
| 7,513,963 B2 | 4/2009 | Frank et al. | |
| 7,524,386 B2 | 4/2009 | George et al. | |
| 7,615,504 B2 | 11/2009 | Porter et al. | |
| 7,670,520 B2 | 3/2010 | Dubey | |
| 7,732,032 B2 | 6/2010 | Dubey | |
| 7,754,052 B2 | 7/2010 | Frank et al. | |
| 7,794,221 B2 | 9/2010 | Dubey | |
| 7,842,629 B2 | 11/2010 | Jaffee | |
| 7,845,130 B2 | 12/2010 | Tonyan et al. | |
| 7,846,536 B2 | 12/2010 | Dubey | |
| 7,870,698 B2 | 1/2011 | Tonyan et al. | |
| 7,897,079 B2 | 3/2011 | Miller | |
| 7,989,370 B2 | 8/2011 | Currier et al. | |
| 8,030,377 B2 | 10/2011 | Dubey et al. | |
| 8,038,790 B1 | 10/2011 | Dubey et al. | |
| 8,038,915 B2 | 10/2011 | Stivender | |
| 8,057,915 B2 | 11/2011 | Song et al. | |
| 8,061,108 B2 | 11/2011 | Tonyan et al. | |
| 8,061,257 B2 | 11/2011 | Tonyan et al. | |
| 8,062,741 B2 | 11/2011 | Tonyan et al. | |
| 8,065,853 B2 | 11/2011 | Tonyan et al. | |
| 8,069,633 B2 | 12/2011 | Tonyan et al. | |
| 8,128,767 B2 | 3/2012 | Jaffee | |
| 8,137,490 B2 | 3/2012 | Frank et al. | |
| 8,163,352 B2 | 4/2012 | Jones | |
| 8,461,067 B2 | 6/2013 | Smith et al. | |
| 8,568,544 B2 | 10/2013 | Engbrecht et al. | |
| 8,727,254 B2 | 5/2014 | Lucas et al. | |
| 8,770,139 B2 | 7/2014 | Frank et al. | |
| 10,272,399 B2 * | 4/2019 | Dubey | B01F 7/083 |
| 10,646,837 B2 * | 5/2020 | Dubey | B01F 15/0251 |
| 2003/0146539 A1 | 8/2003 | Chen et al. | |
| 2004/0219845 A1 | 11/2004 | Graham et al. | |
| 2005/0064164 A1 | 3/2005 | Dubey et al. | |
| 2006/0061007 A1 | 3/2006 | Chen et al. | |
| 2006/0144005 A1 | 7/2006 | Tonyan et al. | |
| 2006/0168905 A1 | 8/2006 | Blanc et al. | |
| 2006/0168906 A1 | 8/2006 | Tonyan et al. | |
| 2006/0174572 A1 | 8/2006 | Tonyan et al. | |
| 2006/0185267 A1 | 8/2006 | Tonyan et al. | |
| 2006/0233043 A1 | 10/2006 | Himmelsbach | |
| 2007/0110970 A1 | 5/2007 | Dubey | |
| 2007/0148430 A1 | 6/2007 | Agrawal | |
| 2007/0149083 A1 | 6/2007 | Agrawal | |
| 2008/0099133 A1 | 5/2008 | Stivender | |
| 2008/0308968 A1 | 12/2008 | Immordino, Jr. | |
| 2009/0218720 A1 | 9/2009 | Chen et al. | |
| 2009/0239977 A1 | 9/2009 | Dubey et al. | |
| 2010/0143682 A1 | 6/2010 | Shake et al. | |
| 2010/0151757 A1 | 6/2010 | Herbert et al. | |
| 2011/0186664 A1 | 8/2011 | Lucas et al. | |
| 2012/0219747 A1 | 8/2012 | Kanao | |
| 2012/0231233 A1 | 9/2012 | Kanao | |
| 2013/0075051 A1 | 3/2013 | Thomisch et al. | |
| 2013/0186989 A1 | 7/2013 | Lucas et al. | |
| 2013/0337251 A1 | 12/2013 | Grassl | |
| 2014/0231560 A1 | 8/2014 | Lucas et al. | |
| 2014/0239105 A1 | 8/2014 | Lucas et al. | |
| 2014/0272404 A1 | 9/2014 | Shake et al. | |
| 2018/0036693 A1 * | 2/2018 | Dubey | B01F 7/085 |
| 2018/0036909 A1 | 2/2018 | Dubey et al. | |
| 2018/0036911 A1 * | 2/2018 | Dubey | B01F 7/04 |

(56) References Cited

U.S. PATENT DOCUMENTS

| | | | | |
|---|---|---|---|---|
| 2018/0036912 A1* | 2/2018 | Dubey | ............... | B28B 1/526 |
| 2019/0217259 A1* | 7/2019 | Dubey | ............... | B01F 7/06 |

FOREIGN PATENT DOCUMENTS

| | | |
|---|---|---|
| CN | 1205264 A | 1/1999 |
| CN | 2344149 Y | 10/1999 |
| CN | 1235729 C | 1/2006 |
| CN | 204093355 U | 1/2015 |
| DE | 1007684 B | 5/1957 |
| DE | 2312436 A1 | 10/1973 |
| DE | 3309007 A1 | 9/1984 |
| DE | 10060328 C1 | 12/2001 |
| DE | 102008058222 A1 | 5/2010 |
| EP | 0003705 A2 | 8/1979 |
| EP | 0003705 B1 | 9/1982 |
| EP | 1653000 A1 | 5/2006 |
| GB | 1085592 A | 10/1967 |
| GB | 2048446 A | 12/1980 |
| GB | 2166660 A | 5/1986 |
| JP | S506633 A | 1/1975 |
| JP | S5743805 A | 3/1982 |
| JP | S63-502975 A | 11/1988 |
| JP | H04189104 A | 7/1992 |
| JP | H08118330 A | 5/1996 |
| JP | 2763059 A | 6/1998 |
| JP | 20031616 A | 1/2003 |
| JP | 2003127129 A | 5/2003 |
| JP | 2003516880 A | 5/2003 |
| JP | 2010508179 A | 3/2010 |
| JP | 4454715 B2 | 4/2010 |
| JP | 201454583 A | 3/2014 |
| WO | 2009085981 A2 | 7/2009 |
| WO | 2009142791 A2 | 11/2009 |
| WO | 2009152615 A1 | 12/2009 |
| WO | 2018027090 A1 | 2/2018 |

OTHER PUBLICATIONS

Office Action dated May 27, 2020 from Chinese Patent Application No. 201780047253.6 to United States Gypsum Company with machine translation.

USG Building Envelope Solutions, USG Securock® Brand Glass-Mat Sheathing Regular and Firecode® X, USG Corporation, 2015.
Application of PID neural network in headbox multivariable decoupling control (only Abstract), IEEE, pp. 2427-2430, ISBN 978-1-4577-1414-6, 2012.
Tucker et al., Production of Glass Fibers for Reinforcement of Lunar Concrete, Conference: 44th AIAA Aerospace Sciences Meeting and Exhibit, Jan. 2006), DOI: 10.2514/6.2006-523, URL: <https://www.researchgate.net/publication/268564326_Production_of_Glass_Fibers_for_Reinforcement_of_Lunar_Concrete>, Retrieved from the Internet Jun. 22, 2017.
O'Connell, Development of a New High Performance Synthetic Fiber for Concrete Reinforcement, Master's Thesis, Dalhousie University, Jul. 5, 2011.
Technical Guidelines, Pictorial Atlas of Concrete Repair Equipment, International Concrete Repair Institute, (ICRI) Guideline No. 320.5R-2014, May 2014.
Naaman, Engineered Steel Fibers with Optimal Properties for Reinforcement of Cement Composites, Journal of Advanced Concrete Technology vol. 1, No. 3, 241-252, Nov. 2003, Japan Concrete Institute.
Bentur et al., Fibre Reinforced Cementitious Composites, Modern Concrete Technology Series, Taylor & Francis Group, 2007.
Martin Christopher Trub, Numerical Modeling of High Performance Fiber Reinforced Cementitious Composites, ETH No. 19437, ETH Zurich, 2011.
Pan Mixers, Pan Mixers from Steelfields, URL: <http://steelfields.com/mixers/pan-mixers/>, Retrieved from the Internet Jun. 21, 2016.
Paddle Mixers, Paddle Mixers from Steelfields, URL:<http://steelfields.com/mixers/paddle-mixers/>, Retrieved from the Internet Jun. 21, 2016.
Majumdar et al., Glass fibre reinforced cement, Material Science and Engineering, vol. 15, Issue 2-3, Aug.-Sep. 1974, pp. 107-127 (Abstract only), URL : < http://www.sciencedirect.com/science/article/pii/0025541674900433> , retrieved from the Internet Jun. 22, 2016.
Office Action dated May 27, 2020 from Chinese Patent Application No. 201780045714.6 to United States Gypsum Company.
Office Action dated Oct. 28, 2020 from U.S. Appl. No. 15/662,932 to United States Gypsum Company.
Office Action dated Aug. 3, 2021 from Japanese Patent Application No. 2019-504886 to United States Gypsum Company.

* cited by examiner

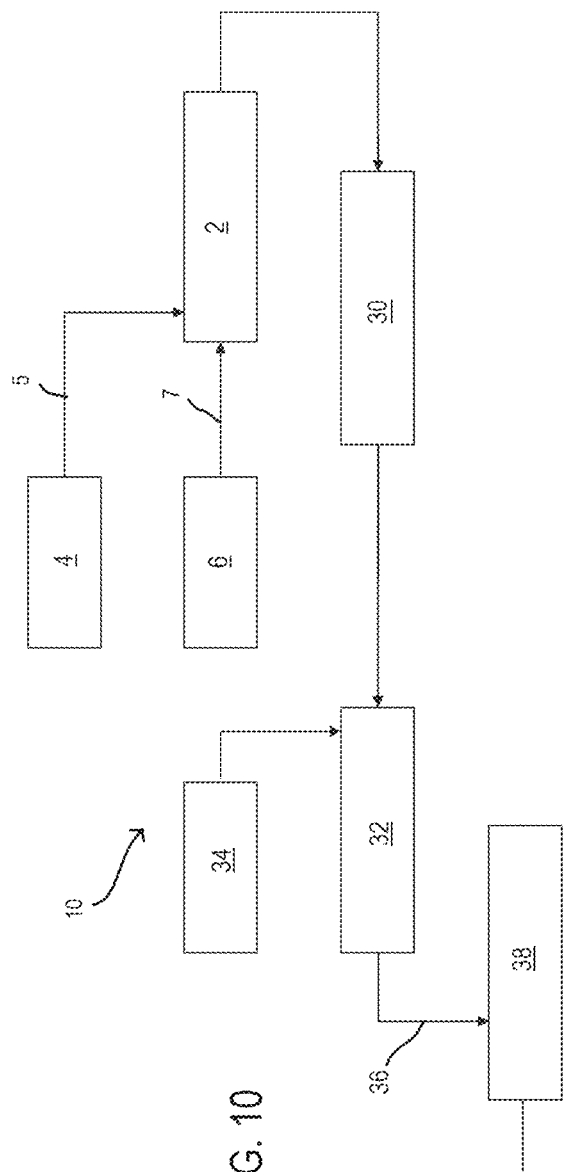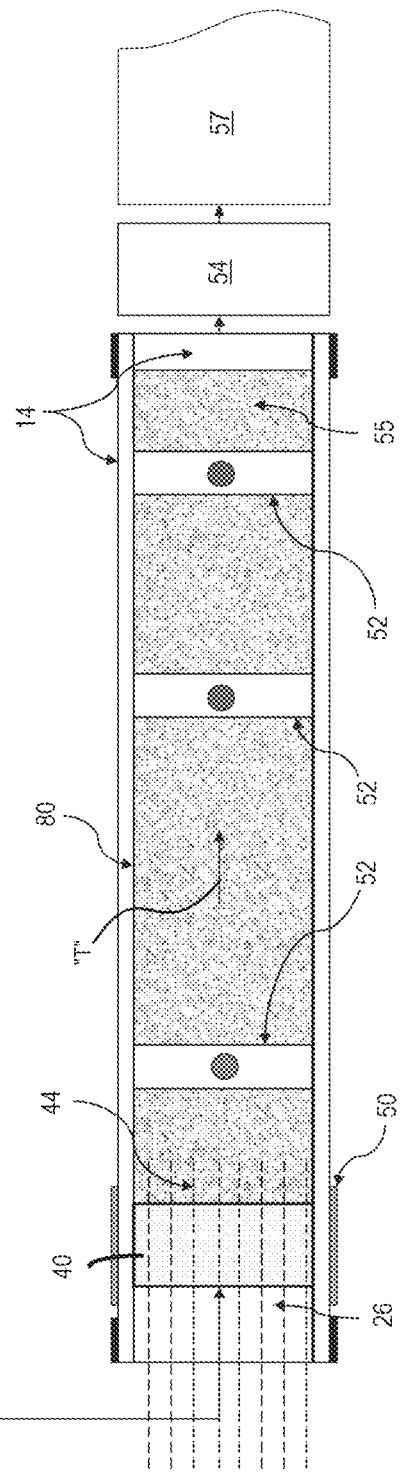
FIG. 10

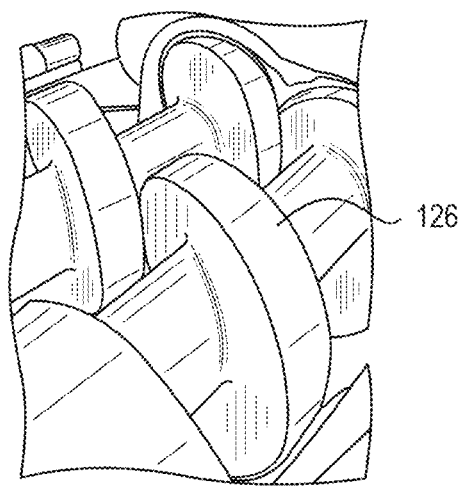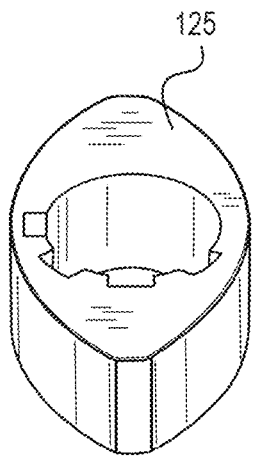
FIG. 12 B      FIG. 12C
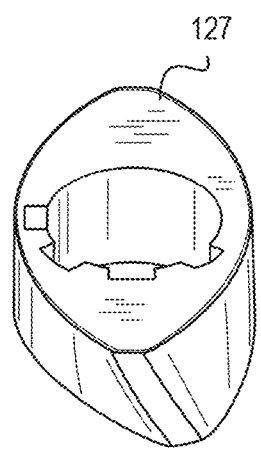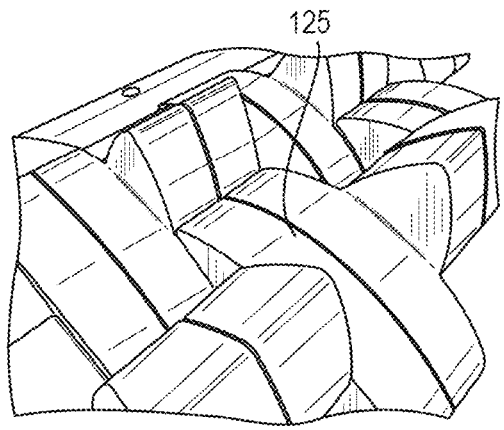
FIG. 12D      FIG. 12E FIG. 24A
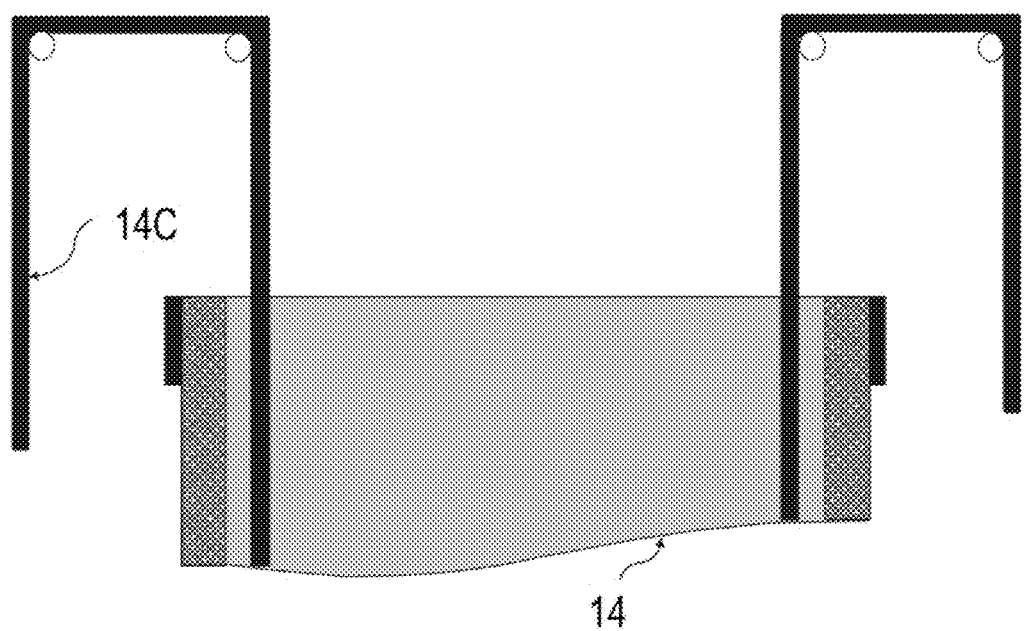
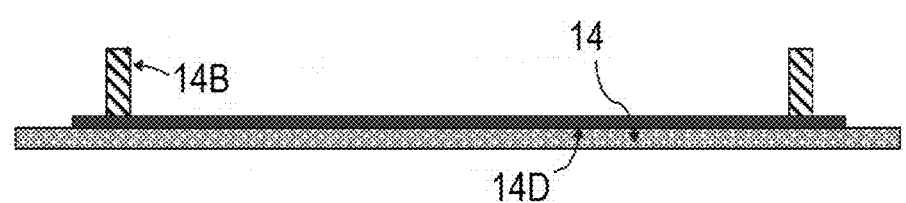
FIG. 24B
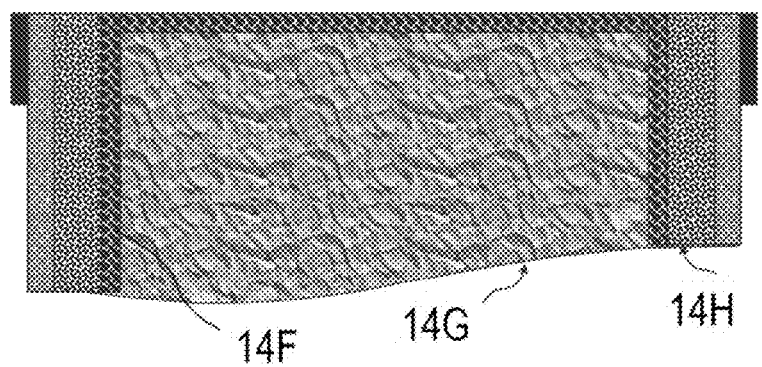
FIG. 25A
FIG. 25B
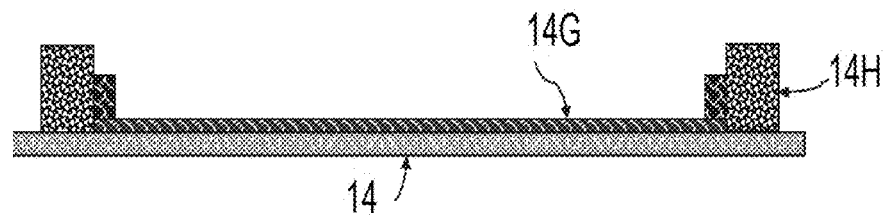

FIG. 31
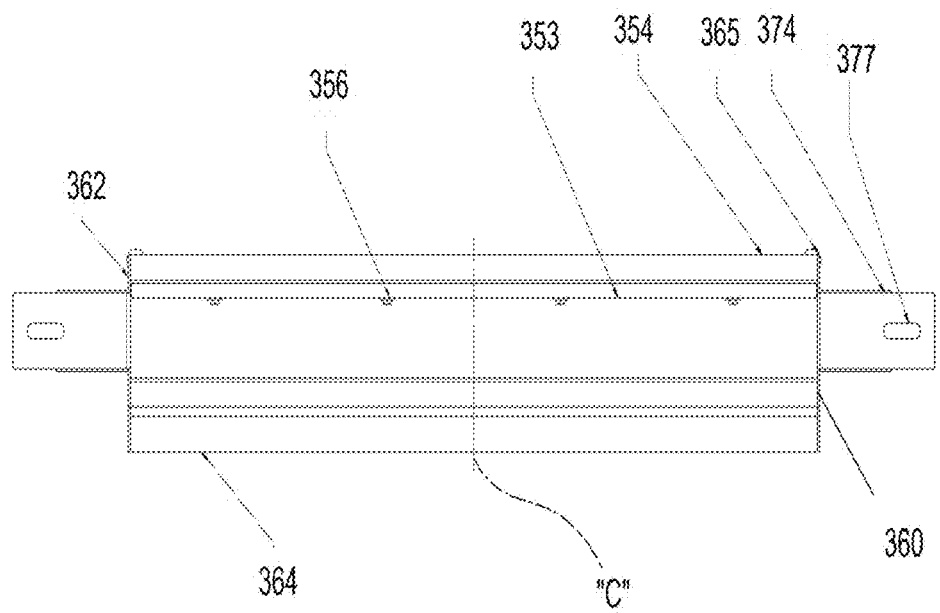
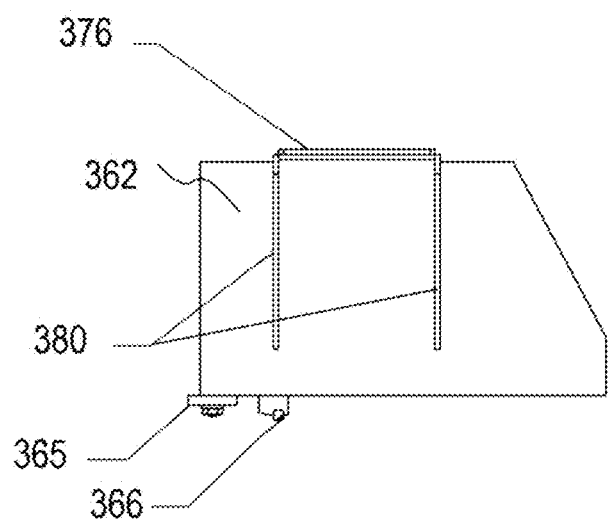
FIG. 32

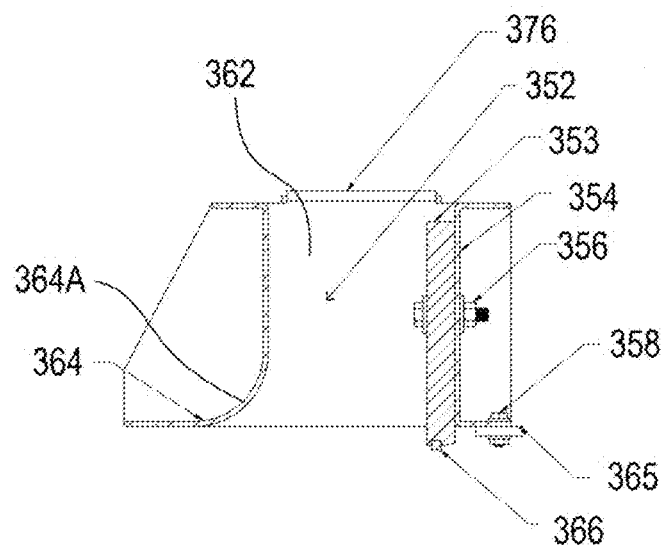
FIG. 33
FIG. 34
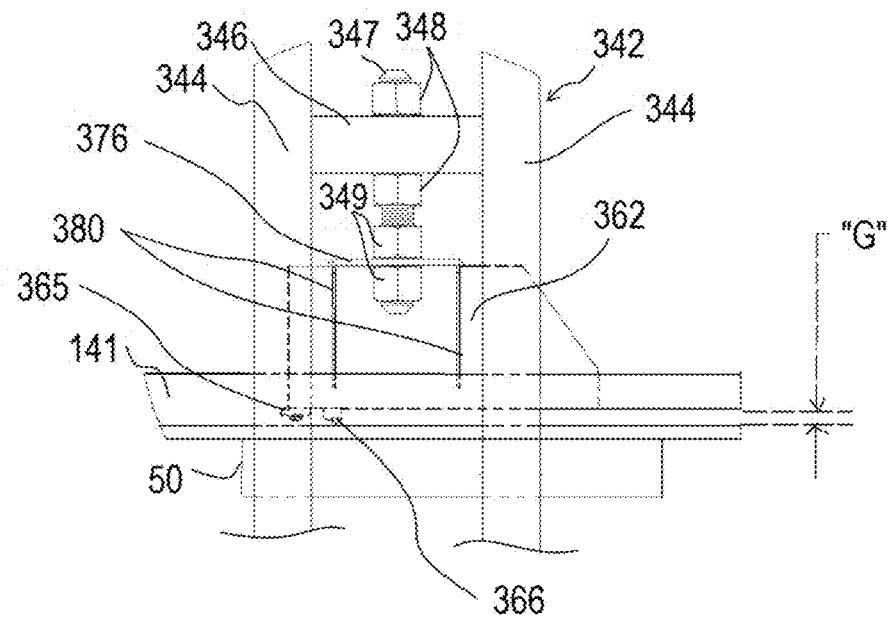

ns of fiber reinforced cementitous slurry typically involves use of industry standard batch mixers into which all raw
CONTINUOUS METHODS OF MAKING FIBER REINFORCED CONCRETE PANELS

CROSS REFERENCE TO RELATED APPLICATIONS

This application is related to:

U.S. Provisional Patent Application No. 62/371,578, entitled CONTINUOUS MIXER AND METHOD OF MIXING REINFORCED FIBERS WITH CEMENTITOUS MATERIALS, filed Aug. 5, 2016;

U.S. Provisional Patent Application No. 62/371,569, entitled HEADBOX AND FORMING STATION FOR FIBER REINFORCED CEMENTITOUS PANEL PRODUCTION, filed Aug. 5, 2016;

U.S. Provisional Patent Application No. 62/371,590, entitled A METHOD FOR PRODUCING FIBER REINFORCED CEMENTITIOUS SLURRY USING A MULTI-STAGE CONTINUOUS MIXER, filed Aug. 5, 2016;

all herein incorporated by reference in their entirety.

This application claims the benefit of U.S. Provisional Patent Application No. 62/371,554 entitled CONTINUOUS METHODS OF MAKING FIBER REINFORCED CONCRETE PANELS, filed Aug. 5, 2016 incorporated by reference in its entirety.

FIELD OF THE INVENTION

This invention discloses a method of producing fiber reinforced cementitous materials in a continuous process.

BACKGROUND OF THE INVENTION

U.S. Pat. No. 6,986,812 to Dubey et al., incorporated herein by reference in its entirety, features a slurry feed apparatus for use in a structural cement panel (SCP) production line or the like application where settable slurries are used in the production of building panels or board. The apparatus includes a main metering roll and a companion roll placed in close, generally parallel relationship to each other to form a nip in which a supply of slurry is retained. Both rolls preferably rotate in the same direction so that slurry is drawn from the nip over the metering roll to be deposited upon a moving web of the SCP panel production line. A thickness control roll is provided in close operational proximity to the main metering roll for maintaining a desired thickness of the slurry.

U.S. Pat. No. 7,524,386 B2 to George et al., incorporated herein by reference in its entirety, discloses a process employing a wet mixer having a vertical mixing chamber for forming a wet slurry of a cementitous powder and liquid. The vertical mixing chamber is designed to provide the required amount of mixing to provide thoroughly mixed, uniformly thin slurry within a mixing residence time that allows for adequate supply of slurry to ensure continuous operation of an associated cement panel production line. Gravity feed means for supply of cementitous powder and water to the slurry mixing area of the chamber is also disclosed. In preparing the SCP panels, an important step is mixing cementitous powder to form slurry. The slurry is then withdrawn from the bottom of the chamber and pumped through a cavity pump to the slurry feeding apparatus. A typical conventional continuous cement mixer is the DUO MIX2000 continuous cement mixer from M-TEC GmbH, Neuenburg, Germany used in the construction industry to mix and pump concrete slurry.

U.S. Pat. No. 7,513,963 B2 to George et al., incorporated herein by reference in its entirety, discloses a wet mixer apparatus and method for its use, the mixer having a vertical mixing chamber for forming a wet slurry of a cementitous slurry and water. The vertical mixing chamber is designed to provide the required amount of mixing to provide thoroughly mixed, uniformly thin slurry within a mixing residence time that allows for adequate supply of slurry to ensure continuous operation of an associated cement panel production line. Gravity feeding for separate supply of cementitous powder and water to the slurry mixing area of the chamber without pre-mixing of the powder and water is also disclosed.

U.S. Pat. No. 8,038,790 to Dubey et al., incorporated herein by reference in its entirety, discloses structural cement panel for resisting transverse and shear loads equal to transverse and shear loads provided by plywood and oriented strain board, when fastened to framing for use in shear walls, flooring and roofing systems. The panels provide reduced thermal transmission compared to other structural cement panels. The panels employ one or more layers of a continuous phase resulting from curing an aqueous mixture of calcium sulfate alpha hemihydrate, hydraulic cement, coated expanded perlite particles filler, optional additional fillers, active pozzolan and lime. The coated perlite has a particle size of 1-500 microns, a median diameter of 20-150 microns, and an effective particle density (specific gravity) of less than 0.50 g/cc. The panels are reinforced with fibers, for example alkali-resistant glass fibers.

US Patent Application Publication No. 2005/0064164 to Dubey et al., incorporated herein by reference in its entirety, discloses a multi-layer process for producing structural cementitous panel which includes: (a) providing a moving web; (b) one of (i) depositing a first layer of individual, loose fibers upon the web, followed by depositing a layer of settable slurry upon the web and (ii) depositing a layer of settable slurry upon the web; (c) depositing a second layer of individual, loose fibers upon the slurry; (d) actively embedding said second layer of individual, loose fibers into the slurry to distribute said fibers throughout the slurry; and (e) repeating steps (ii) through (d) until the desired number of layers of settable fiber-enhanced slurry is obtained and so that the fibers are distributed throughout the panel. Also provided are a structural panel produced by the process, an apparatus suitable for producing structural cementitous panels according to the process, and a structural cementitous panel having multiple layers, each layer created by depositing a layer of settable slurry upon a moving web, depositing fibers upon the slurry and embedding the fibers into the slurry such that each layer is integrally formed with the adjacent layers.

US Patent Application Publication No. 2006/0061007 to Chen et al. discloses a method and apparatus for extruding cementitous articles. The extruder includes a casing with a pair of inter-meshing self-wiping screws rotatably mounted therein. The screws continuously mix and knead the components of the fiber cement provided through various feed means to form a substantially homogeneous paste and force the paste through a die to form a green cementitous extrudate suitable for casting. Cementitous mixtures for extruding are very viscous and not suitable for uses such as shotcrete or deposition through a forming assembly on a cementitous panel production line.

The current state-of-the-art mixing technology for producing fiber reinforced cementitous slurry typically involves use of industry standard batch mixers into which all raw materials including reinforcing fibers are first added and then mixed for several minutes to yield a slurry mixture with randomly dispersed fibers. Rotating drum and rotating pan mixers are examples of concrete mixers that are commonly used for preparing fiber reinforced cementitious slurry mixtures. Some major limitations and drawbacks of the current state-of-the art concrete mixers and mixing technologies for producing fiber reinforced cementitious slurry mixtures include:

The mixing operation in a batch mixer is not continuous thus making their use more difficult in applications where a continuous supply of slurry is needed such as in the case of a continuous panel production line.

The mixing time in a batch mixer is typically very long, in the order of several minutes, to obtain a well-blended, homogeneous slurry mixture.

Since a large amount of fibers are added at a time in a batch mixer, that leads to fiber lumping and balling during the mixing operation.

Longer mixing times involved with the batch mixing process tend to damage and break the reinforcing fibers.

Batch mixers are not very useful and practical with respect to handling rapid setting cementitious materials.

There is a need for a single-layer process for producing slurry for cementitious panels having high reinforcing fiber concentrations. Thus, there is a need for an improved wet mixing apparatus that ensures supply of sufficient mixed fluid cementitious slurry which contains reinforcing fibers such as glass fibers or polymeric fibers to supply a continuous panel production line. It is desired to provide a degree of mixing of the cementitous reactive powder, reinforcing fibers, and water in the mixer to result in a slurry of proper rheology and sufficient fluidity to provide a slurry for use in the continuous cementitious panel manufacturing line.

SUMMARY OF THE INVENTION

The present invention features methods for preparing a fiber reinforced concrete (FRC) panel, also termed by this specification as a fiber reinforced cement panel, or a fiber reinforced cementitious panel. Considering the limitations and drawbacks of the current state-of-the-art some objectives of the present invention are as follows:

Develop a manufacturing process that facilitates formation of fiber reinforced concrete panel products which is a continuous method.

Develop a manufacturing process that facilitates formation of fiber reinforced concrete panel products in a single homogenous layer.

Develop a manufacturing process that facilitates formation of fiber reinforced concrete panel products to correct thickness and surface tolerance, thus eliminating the need for time consuming and expensive panel finishing operations.

Develop a manufacturing process that facilitates formation of fiber reinforced concrete panel products in which the discrete reinforcing fibers are randomly and uniformly distributed throughout the panel.

Develop a manufacturing process that facilitates formation of fiber reinforced concrete panel products at much faster line speeds.

Develop a manufacturing process that facilitates formation of fiber reinforced concrete panel products having different and unique composite designs and reinforcing options including the ability to add surface reinforcements such as scrims, fabrics, and structural laminates.

Develop a manufacturing process that facilitates formation of fiber reinforced concrete panel products at significantly lower cost compared to the current state-of-the-art manufacturing processes.

The invention provides a continuous method for preparing a fiber reinforced cement panel comprising:

mixing water and cementitous powder to form a cementitous slurry;

mixing the cementitous slurry and reinforcement fibers in a single pass horizontal continuous mixer to form a fiber-slurry mixture, the horizontal continuous mixer comprising an elongated mixing chamber defined by a horizontal (typically cylindrical) housing having an interior side wall, at least one fiber inlet port to introduce the reinforcement fibers into the mixing chamber, and upstream of the at least one fiber inlet port is (a) at least one inlet port to introduce water and cementitous powder together as one stream or (b) at least two inlet ports to introduce water and dry cementitous powder separately as separate streams into the chamber, a fiber-slurry mixture outlet port at a second discharge end section of the horizontal housing to discharge the fiber reinforced cementitious slurry mixture produced by the mixer, and a venting port to remove any air introduced into the mixing chamber from raw material feed, a rotating horizontally oriented shaft mounted within the elongated mixing chamber traversing from one end of the horizontal continuous mixer to another end of the horizontal continuous mixer, wherein the cementitious slurry and reinforcement fibers are mixed in a part of the mixing chamber for mixing the reinforcement fibers and cementitious slurry and moving the cementitious slurry and reinforcement fibers being mixed to the fiber-slurry mixture outlet;

wherein the shaft in the part of the mixing chamber for mixing the reinforcement fibers and cementitious slurry and moving the cementitious slurry and reinforcement fibers being mixed to the fiber-slurry mixture outlet comprises at least one mixing element selected from the group consisting of (1) an auger and (2) a plurality of mixing paddles mounted on the shaft at regular intervals and different circumferential locations to extend from the shaft, wherein the at least one mixing element rotates about the shaft within the housing;

wherein the cementitious slurry and fibers are mixed in the mixing chamber of the horizontal fiber-slurry mixer for an average mixing residence time of about 5 to about 240 seconds, preferably 10 to 180 seconds, more preferably 10 to 120 seconds, most preferably 10 to 60 seconds while the at least mixing element applies shear force, wherein the central rotating shaft rotates at 30 to 450 RPM, more preferably 40 to 300 RPM, and most preferably 50 to 250 RPM during mixing;

discharging the fiber-slurry mixture from the horizontal mixer;

wherein fresh water, cementitous powder, and fibers are fed to the mixer simultaneous with the discharging of the mixture of water, cementitous powder, and fibers in the fiber-slurry mixture from the mixer;

feeding the fiber-slurry mixture to a forming assembly (preferably a "headbox") which deposits the fiber-slurry mixture on a moving surface of a panel production line uniformly as a layer 0.25 to 2 inches thick, preferably 0.25 to 1 inches thick, more preferably 0.4 to 0.8 inches thick, typically 0.40 to 0.75 inches thick;

leveling the fiber-slurry mixture on the moving surface;

allowing the fiber-slurry mixture to set on the moving surface;

cutting the set fiber-slurry mixture into panels and removing the panels from the moving surface, wherein an additional layer of fiber-slurry mixture is not deposited on the deposited layer of fiber-slurry mixture.

The horizontal continuous mixer shaft is connected to a drive mechanism and a drive motor to accomplish shaft rotation when the horizontal continuous mixer is in operation, wherein the horizontally oriented shaft is externally connected to the drive mechanism and the drive motor The method disclosed herein is a continuous method as opposed to a batch method. In a continuous method the raw materials required to make the end product are metered and fed continuously at a rate that equals the rate (mass balance) at which the end product is being produced, that is, the raw material feed flows in the process and the end product flows out of the process simultaneously. In a batch method, the raw materials required to make the end product are first combined in large amounts to prepare a large batch of mixture for storage in appropriate vessel/s; this batch of mixture is then subsequently drawn from the storage vessel/s to produce multiple pieces of the end product.

The method of the present invention continuously produces a cementitous panel having at most a single layer of fiber reinforced cementitous composition on a conveyor-type frame supporting a moving web. The horizontal mixer is in operational relationship to the frame and configured for discharging the fiber-slurry mixture to a first slurry feed station (preferably a headbox) which is in operational relationship to the frame and configured for depositing the layer of settable fiber-containing cementitous slurry upon the moving web. Preferably the moving surface (moving web) moves at a speed of 1 to 100 feet per minute, more preferably 5 to 50 feet per minute. This is substantially faster than the conventional cement extrusion processes utilizing viscous cementitious mixtures. Typically the fiber-slurry mixture is deposited at a rate of about 0.10-25 cubic feet per minute for a panel 4 to 8 feet wide. This method of producing cementitious products is also much faster than the typical extrusion manufacturing processes employed in the industry. The fiber-slurry mixture levels and sets as it travels on the moving web. Downstream is an apparatus for cutting the set fiber-slurry mixture into cement boards.

The fiber-slurry mixture discharged from the horizontal mixer has a slump of 4 to 11 inches as measured according to a slump test using a 4 inch tall and 2 inch diameter pipe. The fiber-slurry mixture discharged from the horizontal mixer also has a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. Typically the resulting fiber-slurry mixtures have a viscosity of at least 1500 centipoise.

The fiber-slurry mixtures typically also include plasticizers and superplasticizers. Plasticizers are commonly manufactured from lignosulfonates, a by-product from the paper industry. Superplasticizers have generally been manufactured from sulfonated naphthalene condensate or sulfonated melamine formaldehyde, caseins, or based on polycarboxylic ethers. The present fiber-slurry mixtures preferably lack thickeners or other additives that substantially increase material viscosity.

The resulting fiber-slurry mixtures of the present invention distinguish over cementitous mixtures used in extrusion processes. Such extrusion mixtures have a slump of 0 to 2 inches as measured according to the slump test using a 4 inch tall and 2 inch diameter pipe and have a viscosity greater than 50000 centipoise, more typically greater than 100000 centipoise, and most typically greater than 200000 centipoise. The extrusion mixtures also generally do not include water reducers and superplasticizers which are present in fiber-slurry mixtures of the present invention. As mentioned above, plasticizers are commonly manufactured from lignosulfonates, a by-product from the paper industry. Superplasticizers have generally been manufactured from sulfonated naphthalene condensate or sulfonated melamine formaldehyde, or based on polycarboxylic ethers.

In the method the mixing of water and cementitous material may occur in a first mixer which forms cementitous slurry. Then the mixing of the cementitous slurry and the fibers occurs in a second fiber-slurry mixer.

Alternatively, the mixing of water and cementitous material and fibers may be combined in a single unit operation using a combination continuous mixer where the first section of the mixer produces a cementitous slurry mixture by combining all dry powders, chemical additives, and water; and the second section of mixer produces a fiber reinforced cementitous slurry mixture by introducing and combining the reinforcing fibers with the incoming cementitous slurry mixture produced in the first section of the combined mixer.

In particular the method which mixes water and cementitous material in a first mixer to form cementitous slurry and then mixes the cementitous slurry and the fibers in a second fiber-slurry mixer comprises the following steps:

feeding a liquid stream comprising water, into a continuous slurry mixer through a liquid stream inlet and feeding a stream of a dry cementitous powder into the continuous slurry mixer to form a cementitous slurry, said continuous slurry mixer having a horizontally or vertically mounted impeller;

passing the cementitous slurry from the continuous slurry mixer into a single pass horizontal fiber-slurry continuous mixer and passing a stream of reinforcement fibers into the horizontal fiber-slurry continuous mixer and mixing the cementitous slurry and the reinforcement fibers to form a fiber-slurry mixture, the horizontal fiber-slurry continuous mixer comprising an elongated mixing chamber defined by a horizontal (typically cylindrical) housing having an interior side wall, at least one fiber inlet port to introduce reinforcement fibers into the mixing chamber in a first feed section of the horizontal housing, and at least one cementitous slurry inlet port to introduce cementitous slurry mixture into the chamber in a second feed section of the horizontal housing, a fiber-slurry mixture outlet port at a second discharge end section of the horizontal housing to discharge the fiber reinforced cementitous slurry mixture produced by the mixer, and a venting port to remove any air introduced into the mixing chamber from raw material feed, a rotating horizontally oriented shaft mounted within the elongated mixing chamber traversing from one end of the fiber-slurry mixer to another end of the fiber-slurry mixer, a plurality of mixing and conveying paddles mounted on the horizontally oriented shaft of the mixer at regular intervals and different circumferential locations, the paddles rotated about the horizontally oriented shaft within the horizontal housing, the paddle assemblies extending radially from a location on the shaft, the paddle assemblies comprising a pin engaged to a paddle head, the pin pivotally engaged to the horizontally oriented shaft and/or the paddle head to permit pivotal rotation of the paddle head relative to the respective location on the horizontally oriented shaft, wherein the plurality of paddles are arranged to mix the reinforcement fibers and cementitous slurry and move the cementitous slurry and reinforcement fibers being mixed to the fiber-slurry mixture outlet;

wherein the horizontally oriented shaft is externally connected to a drive mechanism and a drive motor, for example, powered by electricity, fuel gas, gasoline, or other hydrocarbon, to accomplish shaft rotation when the mixer is in operation;

wherein the cementitous slurry and fibers are mixed in the mixing chamber of the horizontal fiber-slurry mixer for an average mixing residence time of about 5 to about 240 seconds, preferably 10 to 180 seconds, more preferably 10 to 120 seconds, most preferably 10 to 60 seconds while the rotating paddles apply shear force, wherein the central rotating shaft rotates at 30 to 450 RPM, more preferably 40 to 300 RPM, and most preferably 50 to 250 RPM during mixing, to produce a uniform fiber-slurry mixture having a consistency that will allow the fiber-slurry mixture to be discharged from the fiber-slurry mixer;

discharging the fiber-slurry mixture from the fiber-slurry mixer.

In particular the method which mixes water and cementitous material and the fibers in a single unit operation comprises the following steps:

feeding a dry cementitous powder into a horizontal continuous mixer through at least one dry cementitous powder inlet port;

the horizontal continuous mixer comprising an elongated mixing chamber, the elongated mixing chamber defined by a horizontal (typically cylindrical) housing having an interior side wall, the elongated mixing chamber having an upstream end feed section, a first mixing section, and a second downstream end mixing section, wherein the first mixing section is between the upstream end feed section and the second downstream end mixing section, at least a pair of horizontally oriented intermeshing self-wiping impellers traversing from an upstream end of the elongated mixing chamber to a downstream end of the elongated mixing chamber and rotating within the elongated mixing chamber, wherein each horizontally mounted impeller within the upstream end feed section of the elongated mixing chamber comprises an auger, wherein the dry cementitous powder is fed into the upstream end feed section of the elongated mixing chamber and conveyed by the auger to the first mixing section, feeding a liquid stream comprising water into the elongated mixing chamber of the continuous slurry mixer through at least one liquid stream inlet port downstream of the at least one dry cementitous powder inlet port and mixing the dry cementitous powder and the liquid stream in the first mixing section to form a cementitous slurry;

wherein each horizontally mounted impeller within the first mixing section comprises a first plurality of mixing paddles mounted on a horizontally oriented shaft of the impeller at regular intervals and different circumferential locations, the paddles rotated about the horizontally oriented shaft within the horizontal, preferably cylindrical housing, the paddles extending radially from the shaft, feeding a stream of reinforcement fibers through at least one reinforcement fiber inlet port into the second mixing section, and mixing the cementitous slurry and the reinforcement fibers in the second mixing section to form a fiber-slurry mixture, wherein at least a portion of each horizontally mounted impeller within the second mixing section of the elongated mixing chamber comprises at least one member selected from the group consisting of:

an auger, and a second plurality of mixing paddles mounted on the horizontally oriented shaft of the mixer at regular intervals and different circumferential locations, the paddles rotated about each respective horizontally oriented shaft within the horizontal (preferably cylindrical) housing, the paddles extending radially from the respective shaft, discharging the fiber-slurry mixture from the mixer through a fiber-slurry mixture outlet port at a downstream end portion of the second mixing section, wherein the cementitous slurry and fibers are mixed in the mixing chamber of the horizontal continuous mixer for an average mixing residence time of about 5 to about 240 seconds, preferably 10 to 180 seconds, more preferably 10 to 120 seconds, most preferably 10 to 60 seconds, while the rotating paddles apply shear force, wherein the central rotating shaft rotates at 30 to 450 RPM, more preferably 40 to 300 RPM, and most preferably 50 to 250 RPM during mixing, to the fiber-slurry mixture to produce a uniform fiber-slurry mixture.

In both alternatives the fiber-slurry mixture discharged from the horizontal mixer has a slump of 4 to 11 inches as measured according to a slump test using a 4 inch tall and 2 inch diameter pipe. The fiber-slurry mixture discharged from the horizontal mixer also has a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. Typically the resulting fiber-slurry mixtures have a viscosity of at least 1500 centipoise.

A distinctive feature of the mixer and mixing method of the present invention disclosed herein is the ability of this mixer to blend reinforcing fibers with the rest of the cementitous components in a continuous operation without unduly damaging the added fibers. Furthermore, the mixer and mixing method of this invention allow production of a fiber reinforced cementitous slurry mixture having a desirable working consistency. The slurries with favorable rheological properties produced by this mixer can beneficially be utilized for producing products using a variety of manufacturing processes. For instance, a workable slurry consistency facilitates further processing and formation of panel products on a continuous forming line running at high line speeds.

The present invention also provides an apparatus for preparing the above-described composite fiber-slurry mixtures comprising:

a slurry mixer for having a liquid stream inlet and a dry cementitous powder stream inlet for mixing a liquid stream comprising water and a stream of a dry cementitous powder comprising cement, gypsum and aggregate, said slurry mixer having a horizontally or vertically mounted impeller;

a single pass horizontal fiber-slurry continuous mixer;

a conduit for passing the cementitious slurry from the slurry mixer into the single pass horizontal fiber-slurry continuous mixer and a conduit for passing a stream of reinforcement fibers into the horizontal fiber-slurry continuous mixer, a single pass horizontal fiber-slurry continuous mixer for mixing the cementitous slurry and the reinforcement fibers to form a fiber-slurry mixture, the horizontal fiber-slurry continuous mixer comprising an elongated mixing chamber defined by a horizontal (typically cylindrical) housing having an interior side wall, at least one fiber inlet port to introduce reinforcement fibers into the chamber in a first feed section of the horizontal housing, and at least one cementitous slurry inlet port to introduce cementitous slurry mixture into the chamber in a second feed section of the horizontal housing, a fiber-slurry mixture outlet port at a second discharge end section of the horizontal cylindrical housing to discharge the fiber reinforced cementitous slurry mixture produced by the mixer, and a venting port to remove any air introduced into the mixing chamber from raw material feed, a horizontally oriented shaft mounted for rotating in the elongated mixing chamber, the horizontally oriented shaft traversing from one end of the mixer to another, a plurality of mixing and conveying paddles mounted on the horizontally oriented shaft of the mixer at regular intervals and different circumferential locations, the paddles extending radially from a location on the shaft, the paddles comprising a pin engaged to a paddle head, the pin pivotally engaged to the horizontally oriented shaft and/or the paddle head to permit pivotal rotation of the paddle head relative to the respective location on the horizontally oriented shaft, wherein the plurality of paddles are arranged to mix the reinforcement fibers and cementitous slurry and move the cementitous slurry and reinforcement fibers being mixed to the fiber-slurry mixture outlet.

The term paddles means any structure extending radially from the shaft for rotating about the shaft. Paddles may have any of a variety of shapes. For example, preferred paddles are flat paddles, helical paddles, or paddles made of a pin having opposed ends, one end for attaching to the shaft and the other end for attachment to a broad paddle head. The pins used without the paddle head are also considered paddles within the scope of the invention.

One distinctive feature of the novel manufacturing process disclosed herein is that it permits blending of reinforcing fibers with the rest of the cementitous components in a continuous operation to produce a fiber reinforced cementitous slurry mixture. Furthermore, the manufacturing process disclosed herein allows production of a fiber reinforced cementitous slurry having a workable and flowable consistency using continuous mixing processes. A workable slurry consistency facilitates further processing and formation of the product on the forming line. One key aspect of this manufacturing process innovation is the novel unit operation that combines the reinforcing fibers with the rest of the cementitous components in a continuous process to produce a fiber reinforced cementitous slurry mixture that is easily workable and formable on a continuous production line. Another key aspect of this manufacturing innovation is a method of extruding a layer of slurry that has a uniform profile (thickness).

The fiber reinforced cementitious products formed using this manufacturing process have various uses including:

Structural Subfloor Panels

Structural Roof Sheathing Panels

Structural Wall Sheathing Panels

Structural Foundation Wall Panels

Permanent Formwork Panels

Roof Cover Board

Impact and Blast Resistant Panels

Exterior Siding Panels and Trims

Exterior Façade & Architectural Panels

Architectural Ceiling Panels

Roofing Tiles

Tile Backerboard

Synthetic Stone, Bricks and Tiles

Countertops

Furniture

Prefabricated Wall Assemblies, Floor and Floor-Ceiling Assemblies, and Roof Assemblies An Alternative Product to Plywood, Oriented-Strand Board, and Low-, Medium- and High-Density Fiber Boards in Various Applications Access floor panels Other Uses The fiber-slurry mixture produced by the methods and apparatus of the present invention is fed to a forming assembly (preferably a "headbox") which deposits the fiber-slurry mixture on a moving surface of a panel production line uniformly as a layer 0.25 to 2 inches thick, preferably 0.25 to 1 inches thick, more preferably 0.4 to 0.8 inches thick, typically 0.40 to 0.75 inches thick;

leveling the fiber-slurry mixture on the moving surface;

allowing the fiber-slurry mixture to set on the moving surface;

cutting the set fiber-slurry mixture into panels and removing the panels from the moving surface, wherein an additional layer of fiber-slurry mixture is not deposited on the deposited layer of fiber-slurry mixture.

The invention also provides methods and apparatus for making its fiber reinforced concrete (FRC) panels with edges wrapped in a surface reinforcing web such as a nonwoven fiber mat, on the panel production line. Typically the nonwoven fiber mat is a polypropylene mat or a fiber-glass mat. This includes depositing the fiber-slurry mixture of the invention on a layer of nonwoven fiber mat on the moving surface of the panel production line and applying another layer of nonwoven fiber mat over the setting board. The layer of nonwoven fiber mat on the moving surface of the panel production line extends from the right and left sides of the setting board so it can be wrapped around the board to wrap the right and left edges when the board is not entirely set so it is still sufficiently tacky to hold the flipped web in place. Then the edges are flipped to wrap around the right and left edges and then the invention applies a top web of nonwoven fiber material and glues the top web to the setting panel and then the setting panel is run under a forming plate. These webs are applied to provide a smooth surface and help with the stacking of the panels of the invention. Rather than having to be in a rack separately during curing, if they are sufficiently set the wrapped fiber reinforced concrete (FRC) panels can be put directly on one another while curing. These webs also help to provide structural strengthening to the fiber reinforced concrete panels of the invention. The nonwoven fiber mat can be permeable, semi-impermeable or non-impermeable to liquids. Preferably, the nonwoven fiber mat does not completely embed into the fiber reinforced cementitious material slurry material. Preferably the mat is not permeable to the slurry or it is at most slightly permeable to the slurry. Thus, it is sufficiently impermeable that the slurry does not bleed through the mat. Thus, the mat provides sufficient impermeability to not let fiber-slurry mixture of the invention seep through to the exposed surface even when the fiber-slurry mixture of the invention is vibrated and/or goes under forming plates on the production line. The surface reinforcing web is preferably applied on both major faces of the panel but alternatively it can be applied only on one major face of the panel depending upon the product application and desired surface aesthetics.

BRIEF DESCRIPTION OF THE DRAWINGS

FIG. 10 shows the cementitous panel production line of FIG. 1A as a composite view of a process flow chart for the portion of the cementitous panel production line upstream of the forming assembly (headbox) and a top view of the cementitous panel production line downstream of the forming assembly (headbox).

FIG. 12B shows a portion of the auger section at the mixer dry powder inlet in a horizontal dual shaft multi-stage continuous fiber-slurry mixer embodiment of the present fiber-slurry mixing device.

FIG. 12C shows a flat mixing paddle of the horizontal dual shaft multi-stage continuous fiber-slurry mixer embodiment of the present fiber-slurry mixing device.

FIG. 12D shows a helical mixing paddle suitable for use in the horizontal dual shaft multi-stage continuous fiber-slurry mixer embodiment of the present fiber-slurry mixing device.

FIG. 12E shows flat paddles mounted on the two shafts in the first mixing section of the horizontal dual shaft multi-stage continuous fiber-slurry mixer embodiment of the present fiber-slurry mixing device.

FIG. 14J shows the preferred arrangement in this configuration having flat paddles and/or helical paddles in the first mixing section and paddles with a pin and a head and/or only pins in the second mixing section.

FIG. 24A shows a top view of a sixth embodiment of an edge forming belt with an edge-forming belt and an optional slip sheet or release paper on the forming belt.

FIG. 24B shows a front view of the sixth embodiment of the edge belt with the edge-forming belt and the optional slip sheet or release paper or a surface reinforcing web or an architectural decorative web on the forming belt.

FIG. 25A shows a top view of a seventh embodiment of an edge forming belt with an edge-forming belt and an optional slip sheet or release paper or a surface reinforcing web or a structural reinforcing laminate or an architectural decorative laminate on the forming belt.

FIG. 25B shows a front view of the seventh embodiment of the edge belt with the edge-forming belt and the optional slip sheet or release paper on the forming belt.

FIG. 31 shows a top view of the headbox.

FIG. 32 shows a side view of the headbox.

FIG. 33 shows a cross-section XXXIII-XXXIII of the headbox.

FIG. 34 shows the headbox rigidly mounted on a frame.

In the figures, like reference numerals indicate like elements unless otherwise indicated.

DETAILED DESCRIPTION OF THE INVENTION

The basic steps and key features of the manufacturing process of this invention for producing fiber reinforced concrete (FRC) panel (also termed a fiber reinforced cementitous panel) products are shown in FIGS. 9, 10, and 15-18. These manufacturing steps and various unique aspects of this invention can be briefly summarized as follows:

Step 1: Accurately meter raw materials including cementitous materials, fillers, chemical additives, and water using continuous feeders and convey these raw materials to a continuous slurry mixer.

Step 2: Mix raw materials including cementitous materials, fillers, chemical additives, and water using a continuous slurry mixer to form a cementitous slurry mixture.

Step 3: Convey the cementitous slurry mixture to a continuous fiber-slurry mixer.

Figure 2:
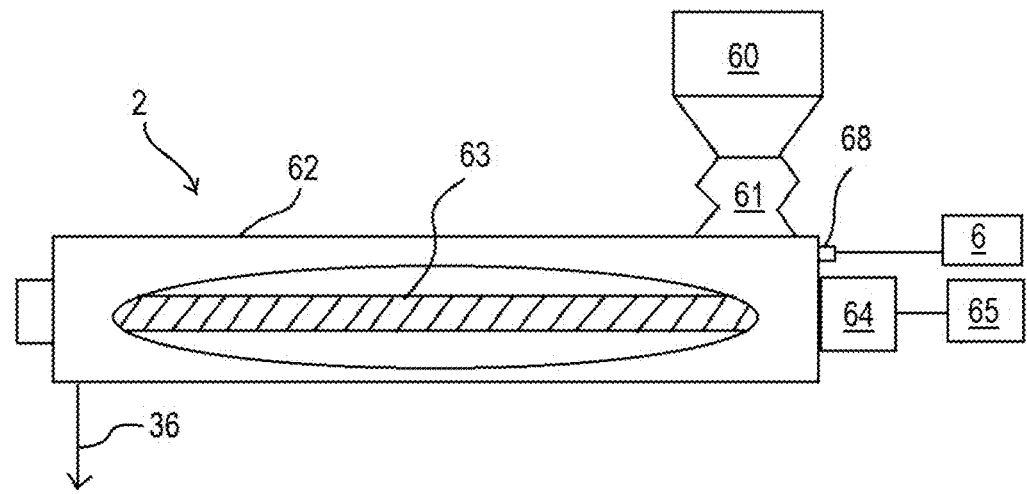
FIG. 2 is a cementious slurry mixer.
Figure 4:
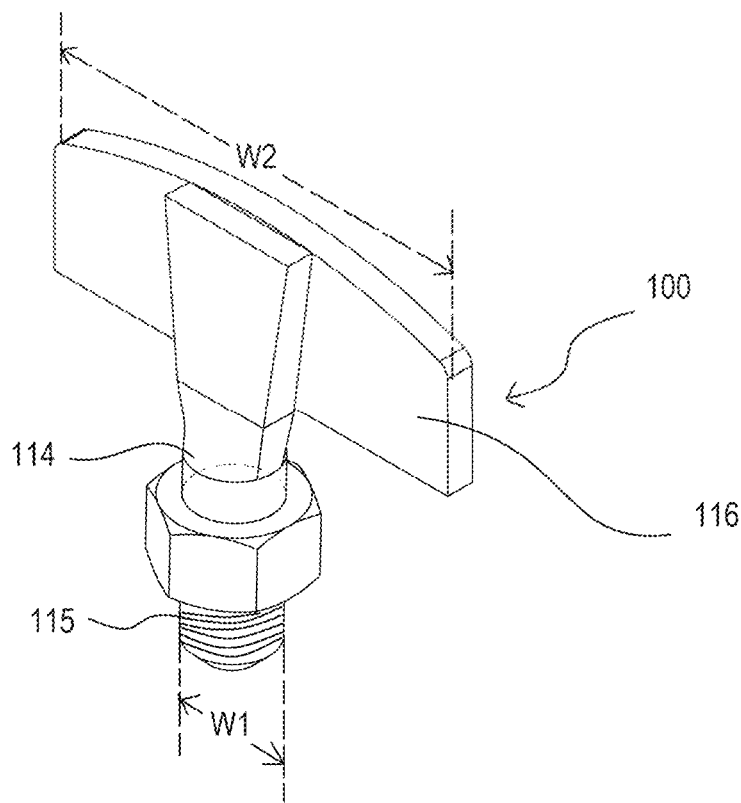
FIG. 4 shows a perspective view of a paddle of the horizontal single shaft continuous fiber-slurry mixer embodiment of the present fiber-slurry mixing device of FIG. 3.

The conveying of the cementitous slurry mixture to the continuous fiber-slurry mixer can be carried out using a suitable positive displacement pump such as a progressive cavity pump or a peristaltic pump, or alternatively, the cementitous slurry mixture can be dropped (gravity drop) directly from the mouth of the continuous slurry mixer into the continuous fiber-slurry mixer. FIGS. 2 and 4 show the process flow diagrams of some alternate embodiments of the manufacturing process of this invention where the cementitous slurry mixture is dropped directly from the mouth of the continuous slurry mixer into the continuous fiber-slurry mixer.

Step 4: Accurately meter reinforcing fibers using suitable continuous fiber feeders and convey to the fiber-slurry mixer.

The conveying of the reinforcing fibers to the continuous fiber-slurry mixer can be carried out using a suitable conveying mechanism such as air-veying, or alternatively, the reinforcing fibers can be dropped (example, gravity drop) directly from the mouth of the fiber feeder/s into the continuous fiber-slurry mixer. Fibers may be sprayed with water or other additives (accelerators or dispersants) in this step.

Step 5: Add reinforcing fibers to the prepared cementitous slurry mixture in a continuous fiber-slurry mixer and mix the ingredients to form a fiber reinforced cementitious slurry mixture having a workable consistency.

Step 6: Convey the fiber reinforced cementitious slurry mixture to a panel forming assembly such as a headbox assembly (or a forming screed roll assembly or a vibrating plate assembly) located on a conveying line. The conveying of the fiber reinforced cementitious slurry mixture to the forming assembly can be carried out using a suitable positive displacement pump such as a peristaltic pump or a piston pump, or alternatively, the fiber reinforced cementitous slurry mixture can be dropped (gravity drop) directly from the mouth of the continuous fiber-slurry mixer in to the forming assembly located on the conveying/forming line.

Step 7: Add secondary composite reinforcements (if desired) such as continuous scrims, continuous rovings, continuously chopped fibers from rovings, structural composite reinforcing laminates as part of the panel formation process on the conveying and forming line.

FIG. 10 shows the method used with a slurry accumulator and positive displacement pump 30 after the slurry mixer 2 (single shaft or dual shaft slurry mixer). It also shows a slurry accumulator and positive displacement pump 38 after the fiber-slurry mixer 32. However, in the alternative, the method is performed without one or both of a slurry accumulator and positive displacement pump 30 and slurry accumulator and positive displacement pump 38.

The operations carried out in Steps 2, 3, 5 and 6 may alternatively be combined in a unit operation using a combination continuous mixer where the first section of the mixer produces a cementitious slurry mixture by combining all dry powders, chemical additives, and water; and the second section of mixer produces a fiber reinforced cementitious slurry mixture by introducing and combining the reinforcing fibers with the incoming cementitious slurry mixture produced in the first section of the combined mixer.

The combination continuous mixer can either be a single shaft continuous mixer or a dual-shaft continuous mixer. The fiber reinforced cementitious slurry mixture so produced using the combination continuous mixer can then be conveyed to the forming assembly using a suitable positive displacement pump such as a peristaltic pump or a piston pump, or alternatively, the fiber reinforced cementitious slurry mixture can be dropped (gravity drop) directly from the mouth of the combination continuous mixer in to the forming assembly located on the conveying/forming line.

FIGS. 15 through 18 show embodiments of the present invention where a multi-stage combination continuous mixer is utilized to produce a fiber reinforced cementitious slurry mixture.

Figure 15:
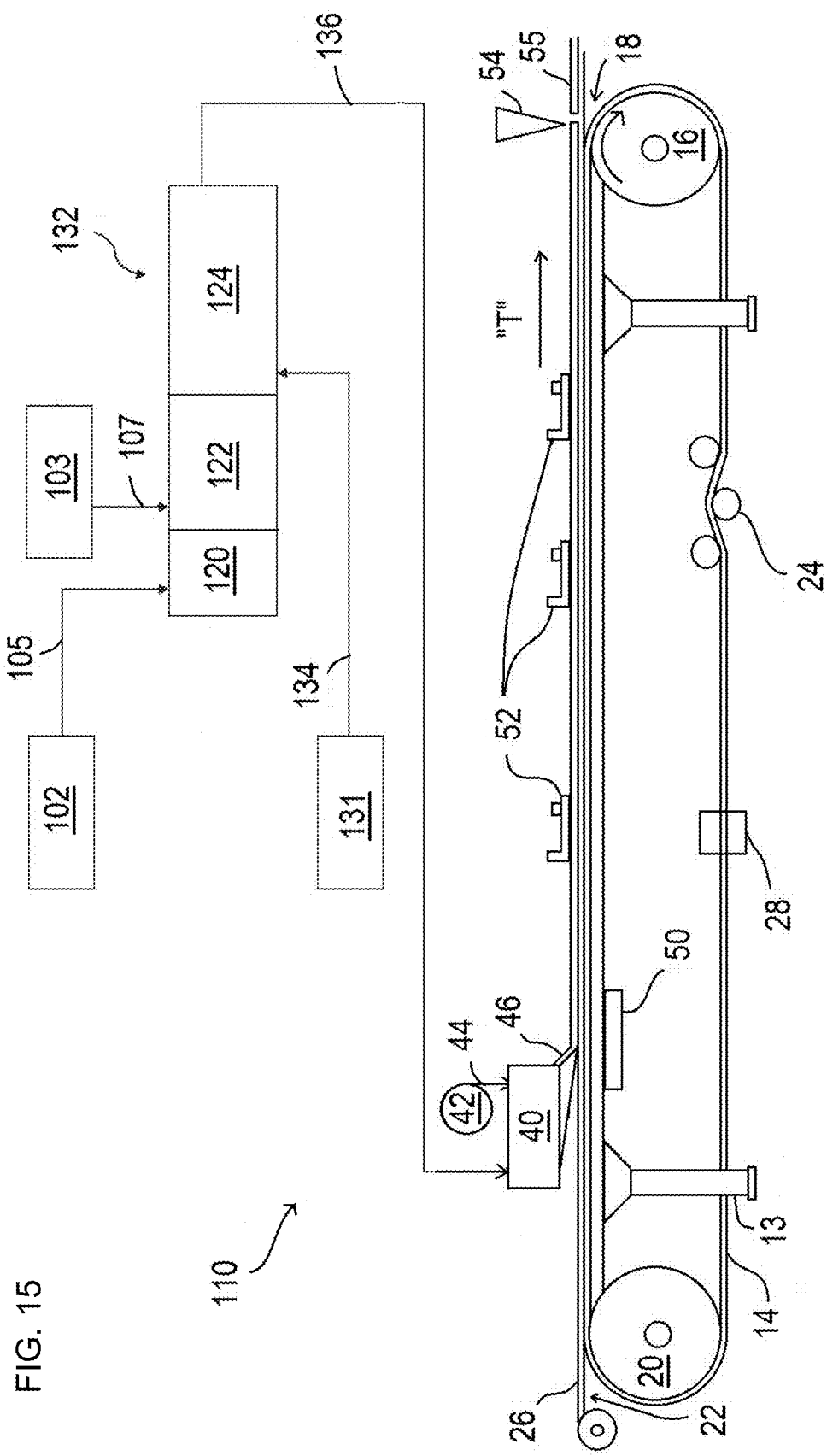
FIG. 15 is a diagrammatic elevational view of a cementitious panel production line suitable for use with the present fiber-slurry mixing device.
Figure 16:
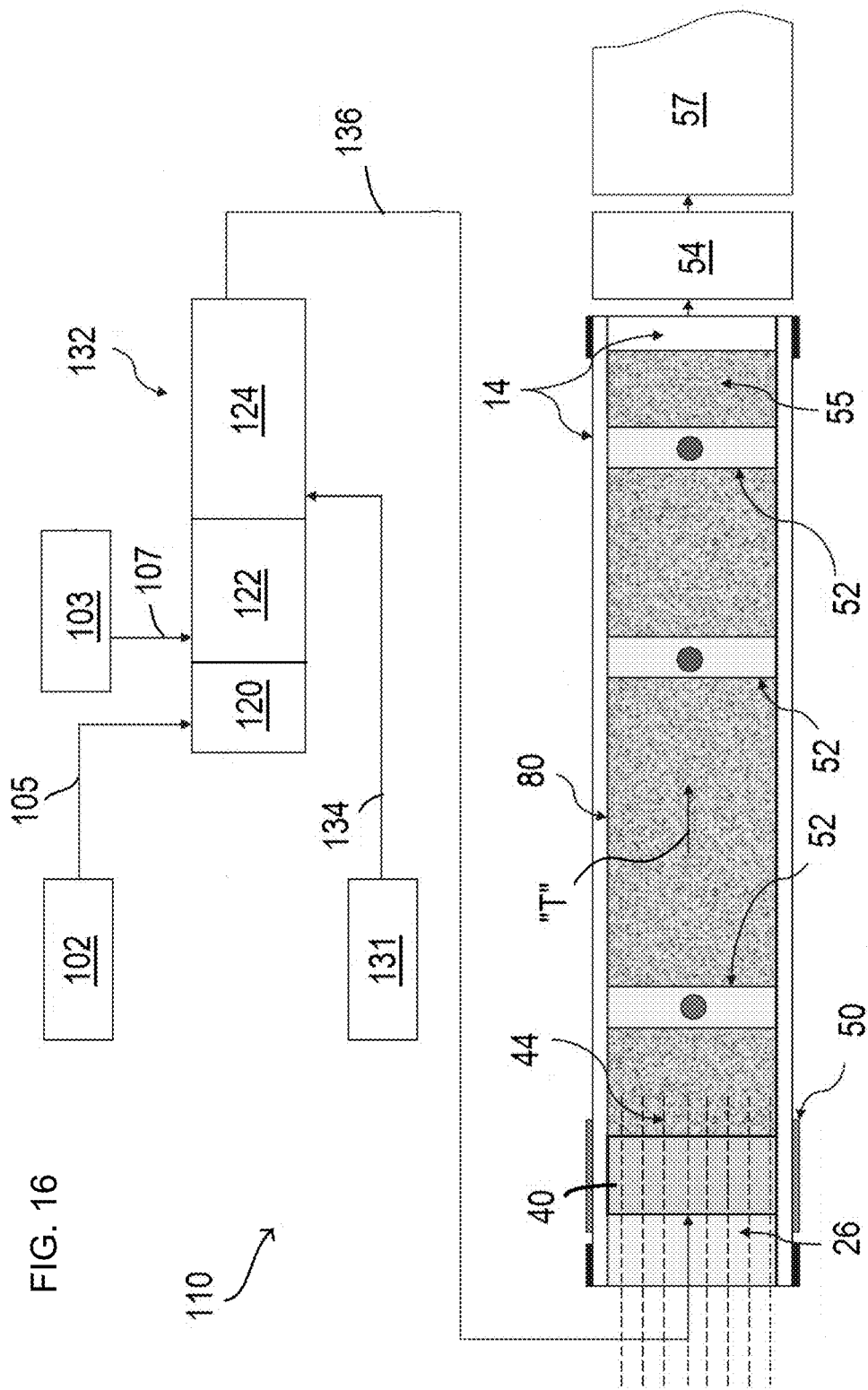
FIG. 16 shows the cementitious panel production line of FIG. 15 as a composite view of a process flow chart for the portion of the cementitious panel production line upstream of the forming assembly and a top view of the cementitious panel production line downstream of the forming assembly.

FIGS. 15 and 16 represent an embodiment where the fiber reinforced cementitous slurry mixture 136 so produced by a combination multi-stage continuous mixer 132 is dropped directly into the forming assembly 40 located on the forming line. In such embodiments, the combination continuous mixer is physically located right above the conveying line to facilitate transfer of the slurry to the forming assembly.

Figure 17:
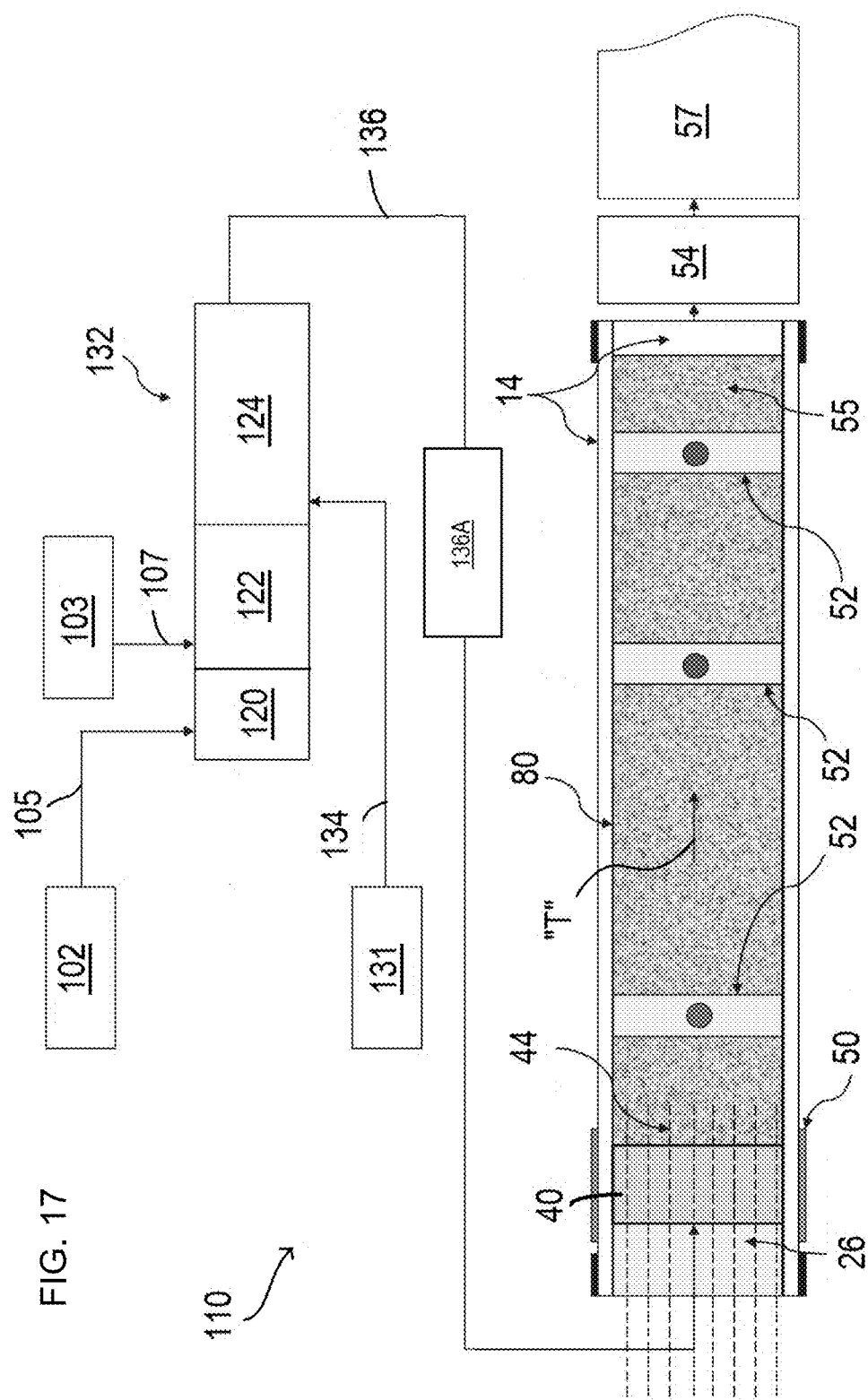
FIG. 17 shows a first variation of a composite view of a process flow chart for the portion of the cementitious panel production line suitable for use with the present fiber-slurry mixing device of FIG. 16 upstream of the forming assembly and a top view of the production line downstream of the forming assembly.

FIG. 17 represents another embodiment of the present invention utilizing an appropriate slurry accumulator and pump 36A to transfer the fiber reinforced cementitous slurry mixture into the forming assembly 40. In such embodiments, the continuous fiber-slurry mixer need not be physically located right above the conveying line.

FIGS. 9, 10, and 15-17 show embodiments of the present invention where secondary composite reinforcements such as scrims or continuous fiber rovings or nonwoven fiber mats or structural reinforcing composites laminates are optionally utilized as part of the manufacturing process.

Figure 18:
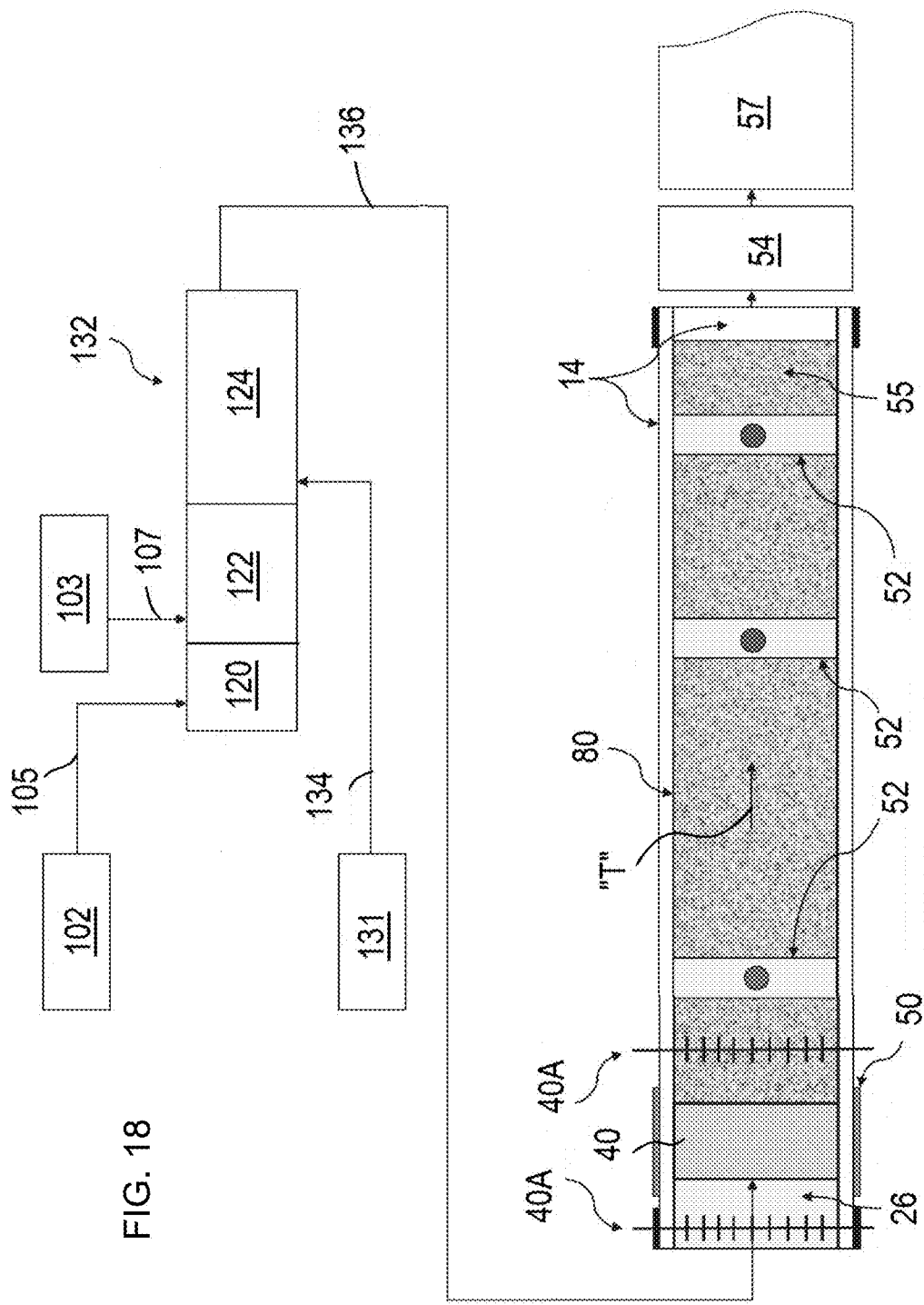
FIG. 18 shows a second variation of a composite view of a process flow chart for the portion of the cementitious panel production line suitable for use with the present fiber-slurry mixing device of FIG. 11 upstream of the forming assembly and a top view of the production line downstream of the forming assembly.
Figure 19A:
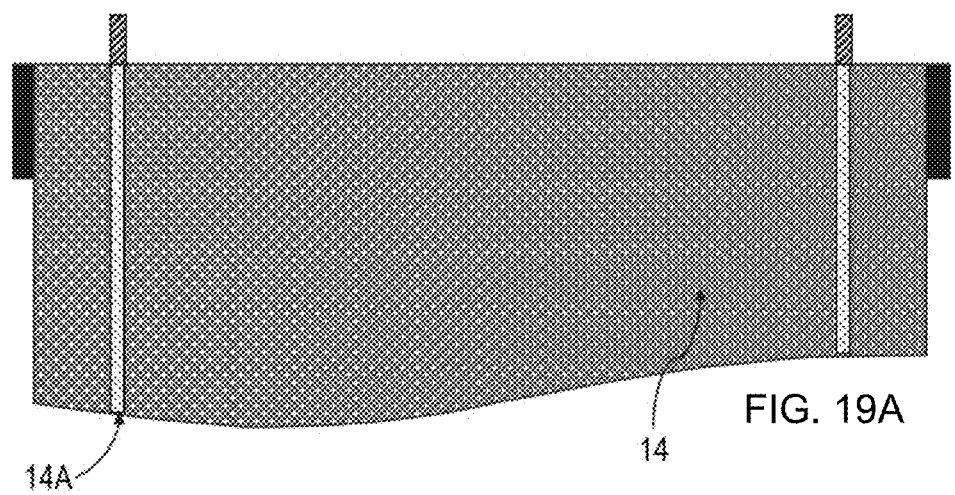
FIG. 19A shows a top view of a forming belt with belt bonded slit formers and leakage suppressers.
Figure 19B:
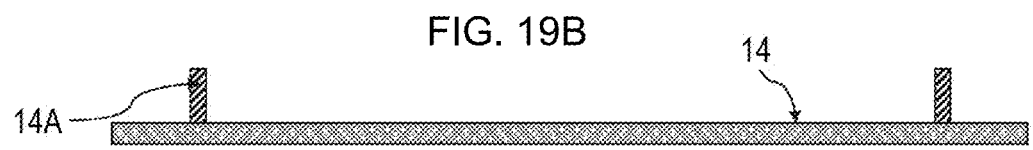
FIG. 19B shows a front view of the forming belt with belt bonded slit formers and leakage suppressers.
Figure 20A:
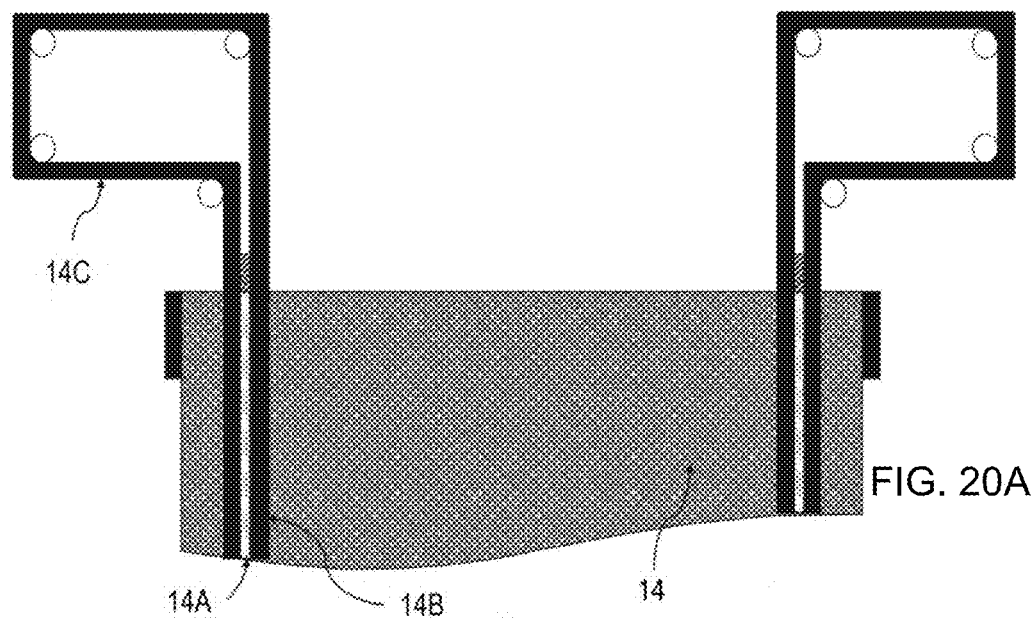
FIG. 20A shows a top view of a second embodiment of an edge forming belt with belt bonded slit formers and leakage suppressers.
Figure 20B:
FIG. 20B shows a front view of the second embodiment of the edge belt with belt bonded slit formers and leakage suppressers.
Figure 21A:
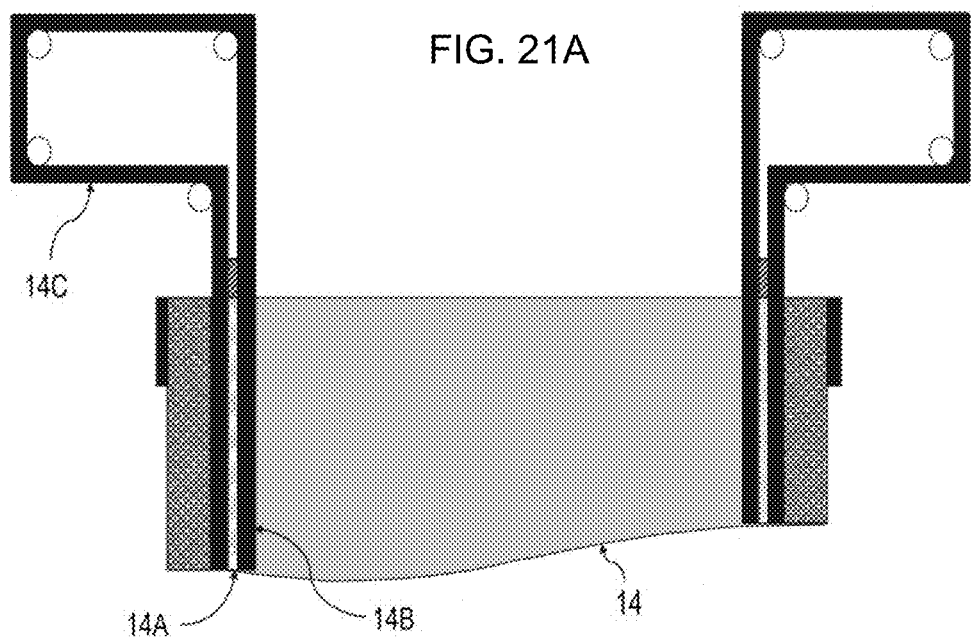
FIG. 21A shows a top view of a third embodiment of an edge forming belt with belt bonded slit formers and leakage suppressers and a slip sheet or release paper on the edge forming belt.
Figure 21B:
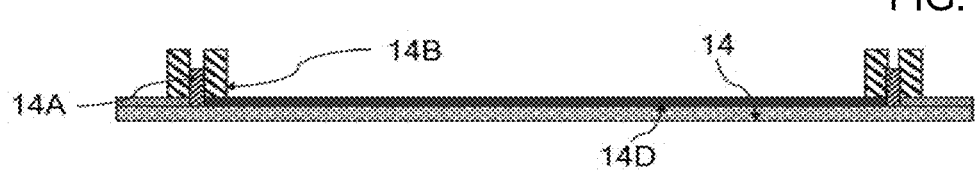
FIG. 21B shows a front view of the third embodiment of the edge belt with belt bonded slit formers and leakage suppressers and a slip sheet or release paper on the edge forming belt.

FIG. 18 shows an example of an embodiment of the present invention where continuous fiber choppers are utilized on the production line for continuously chopping fibers from continuous fiber rovings and introducing them strategically at the panel bottom and/or top faces. The chopped fibers so introduced typically have a random two-dimensional orientation and are instrumental in increasing the panel tensile and flexural strengths. Other suitable means of introducing discrete/chopped fibers at one or both panel faces are also possible and may be utilized for the purposes of this invention.

Vibrations produced by a vibrating table located right under the forming assembly 40 (below the forming belt) is typically used to facilitate embedment of the laid bottom layer of chopped fibers into the layer of fiber reinforced cementitous slurry deposited by the forming assembly. If a layer of chopped fibers is introduced on top of the deposited layer of fiber reinforced cementitous slurry after the forming assembly, the embedment of this laid layer of fibers can be achieved, for example, by utilizing one or more vibrating screed plates located on the top surface of the formed panels on the conveying line.

Step 8: Deposit a continuous layer of fiber reinforced cementitous slurry mixture having desired thickness from the forming assembly. A screed forming roll may be utilized alternatively instead of the forming assembly to deposit a continuous layer of fiber reinforced cementitous slurry mixture. A forming plate (table) located right under the forming assembly and forming belt is typically used to achieve a true and flat casting surface that facilitates extrusion of an even layer of fiber reinforced cementitous layer that has a uniform thickness and surface profile across the width of the cast panel. The forming table may also be optionally combined with a vibration assembly that further helps to deposit of an even layer of fiber reinforced cementitous layer having a uniform thickness and surface profile across the width of the cast panel. The importance of vibration introduced by the vibrating plate assembly increases with increasing viscosity of the slurry. In other words, the use of a vibrating plate assembly as described above facilitates use of fiber reinforced cementations slurry mixtures that are more viscous with diminished flow properties.

Step 9: Form panels and panel edges using suitable substrates, molds, and edge formation device/s.

Step 10: Screed the top surface of the panel, if required, to achieve desired panel surface finish.

The top surface of the formed panel may optionally be touched and finished with one or more vibrating screeds located at various places along the continuous forming line. A vibrating finish screed installed right after the forming assembly is useful for embedding visible fibers and occasional fiber-slurry lumps thus creating a more homogeneous panel surface. Vibrating screeds installed at locations where the panel has achieved partial set are useful in further homogenizing panel surface and improving panel appearance. These latter vibrating screeds are also useful in knocking down the raised slurry meniscus typically observed at the panel edges when the edge is formed against a surface. If required, the vibrating screeds may also be accompanied with vacuum air suction to remove dislodged particles and lumps accumulating at the back end of the screed plate. The location of the screed along the length of the forming line may be adjusted depending upon the material set characteristics and environmental conditions. The importance of the use of top vibrating screed on the production line to achieve a more uniform surface profile increases with increase in viscosity of the fiber reinforced cementitous slurry.

Step 11: Cut the continuous formed panel ribbon to correct panel length. Different methods for cutting panels on the line may be employed. These include, circular cutting saws, water-jet cutters, rotating knife cutters, etc.

Step 12: Stack and cure formed panels.

Special curing methods such as high humidity-high temperature curing chambers may be employed to accelerate the curing process thus facilitating rapid strength development and release of the panels for sale.

Step 13: The panels formed on the forming line after curing may optionally be coated with special coatings and/or paints to impart desirable properties required for specific product applications.

FIGS. 9, 10, and 15-18 will be discussed in more detail elsewhere in this specification.

Method Employing a Separate Slurry Mixer and Fiber-Slurry Mixer

Figure 1:
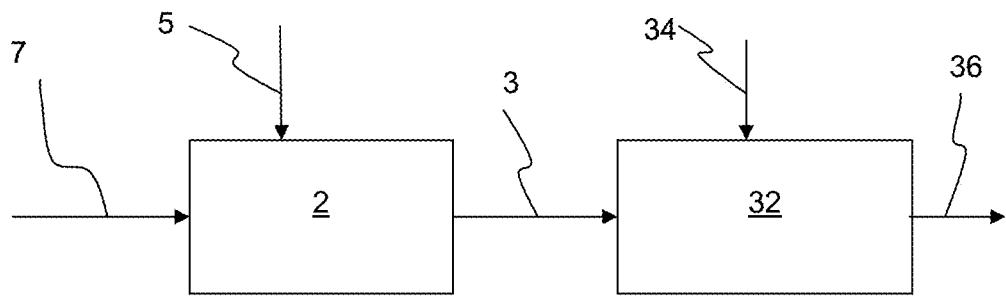
FIG. 1 shows a block flow diagram of the mixing portion of the method of the present invention employing a slurry mixer followed by a fiber-slurry mixer.

FIG. 1 shows a block flow diagram of the mixing portion of the method of the present invention employing a separate slurry mixer and fiber-slurry mixer. In the method a stream 5 of dry cementitious powder passes through a first conduit and aqueous medium stream 7 passes through a second conduit to feed a slurry mixer 2 to make cementitious slurry 3. The cementitious slurry 3 passes through a third conduit and a reinforcement fiber stream 34 passes through a fourth conduit to feed a fiber-slurry mixer 32 to make the stream of fiber-slurry mixture 36.

The resulting fiber-slurry mixture is suitable for a variety of uses. For example, the resulting slurry is suitable for being deposited and used as statuary, shotcrete, consolidation of loose rock, soil stabilization, pre-cast concrete products, pavement, repair application, or as a layer on a moving surface of a panel production line uniformly as a layer 0.125 to 2 inches thick, preferably 0.25 to 1 inches thick, typically 0.40 to 0.75 inches thick on the moving surface of the panel production line to produce a fiber reinforced concrete (FRC) panel. The resulting fiber-slurry mixture has a viscosity less than 45000 centipoise, more preferably less than 30000 centipoise, and most preferably less than 15000 centipoise. The resulting fiber-slurry mixture also has a slump according to the slump test using a 4 inch tall 2 inch diameter pipe is from 4 to 11 inches. The resulting fiber-slurry mixture is not suitable for extrusion manufacturing processes that typically rely on slurry mixture compositions have extremely high viscosity.

The slump test characterizes the slump and flow behavior of the cementitious compositions produced by the method and apparatus of this invention. The slump test used herein utilizes a hollow cylinder about 5.08 cm. (2 in.) diameter and about 10.16 cm. (4 in.) length held vertically with one open end resting on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. As used herein, compositions with good flow behavior yield a larger slump value.

Slurry Mixer

Any of a variety of continuous or batch mixers may be employed as the slurry mixer 2. For example, the mortar mixers described in ICRI Guideline No. 320.5R-2014, Technical Guidelines, Pictorial Atlas of Concrete Repair Equipment, International Concrete Repair Institute, May 2014, incorporated by reference, can be used in this invention for preparing cementitious slurry 3. These include horizontal shaft mixers, tumble mortar mixers, rotating-drum stationary mixers, pan-type mixers, rotating-tub rotating paddle mixers, planetary paddle mixers, horizontal shaft mixer-pump combinations, and vertical shaft mixer-pump combinations. The horizontal shaft mixer-pump combinations and vertical shaft mixer-pump combinations are continuous mixers. In addition, continuous slurry mixers disclosed in U.S. Pat. No. 7,513,963 B2 to George et al, incorporated by reference, may also be used in the present invention. Continuous slurry mixers disclosed in U.S. Pat. No. 7,347,895 to Dubey (column 6, lines 36 to 56), incorporated by reference, may also be used to prepare slurry in a continuous manner.

For example, the continuous slurry mixer 2 may be a single shaft or dual shaft horizontal mixer. FIG. 2 schematically shows a single shaft horizontal mixer 2.

The term horizontal when used with mixers means generally horizontal. Thus, a mixer oriented with a variation of plus or minus 20 degrees from horizontal would still be considered a horizontal mixer.

Volumetric feeding systems would discharge powder from the storage hopper bin 60 at a constant rate (volume per unit time, e.g., cubic feet per minute). Gravimetric feeding systems generally use a volumetric feeder associated with a weighing system to control the discharge of powder from the storage hopper bin 60 at a constant weight per unit of time, e.g., pounds per minute. The weight signal is used via a feedback control system to constantly monitor the actual feed rate and compensate for variations in bulk density, porosity, etc.

FIG. 2 shows a powder mixture of cementitious materials such as Portland cement, aggregate, fillers, etc. is fed from the dry powder feeder (not shown) which is typically an overhead hopper bin 60 through a bellows 61 to a horizontal chamber 62 which contains a shaft 63. At least part of the shaft 63 is an auger screw. FIG. 2 shows the entire shaft 63 provided with an auger. However, preferably only a part of shaft 63 is an auger to move the cementitious powder. The remainder of the shaft 63 is preferably provided with mechanical components (such as paddles, not shown) to mix dry powder with water and other additives to prepare cementitious slurry. Preferably an upstream portion of the shaft 63 (for example the upstream 20 to 60% of the shaft length) has the auger and the remainder downstream portion of the shaft has the paddles. Shaft 63 is driven by a side mounted motor 64 that is regulated by a speed controller 65. The solids may be fed from the hopper bin 60 to the auger screw of shaft 63 by a volumetric feeder or a gravimetric feeder (not shown). The amount of dry powder fed into the slurry mixer 2 is provided by a separate dry powder feeder, which may be operated volumetrically or gravimetrically.

Volumetric feeding systems discharge powder from the storage hopper bin 60 at a constant rate (volume per unit time, e.g., cubic feet per minute. Gravimetric feeding systems generally use a volumetric feeder associated with a weighing system to control the discharge of powder from the storage hopper bin 60 at a constant weight per unit of time, e.g., pounds per minute. The weight signal is used via a feedback control system to constantly monitor the actual feed rate and compensate for variations in bulk density, porosity, etc.

Aqueous medium, such as water, from liquid pump 6 feeds the horizontal chamber 62 through a nozzle 68. The powder and water slurry mixture is then discharged from the horizontal chamber 62 and then feeds the fiber-slurry mixer 32.

Horizontal Fiber-Slurry Continuous Mixer

The fiber-slurry continuous mixer of the present invention preferably achieves the following results:

Allows continuous blending of fibers with the rest of the cementitious components to produce a uniformly mixed fiber reinforced cementitious slurry mixture.

Reduces the required mixing time from several minutes to less than 60 seconds, preferably less than 30 seconds, to produce a uniformly blended fiber reinforced cementitious slurry mixture. Generally the chamber provides an average slurry residence time of about 5 to about 240 seconds, preferably 10 to 180 seconds, more preferably 10 to 120 seconds, most preferably 10 to 60 seconds, typically 20 to 60 seconds.

Does not cause fiber balling and lumping during the mixing operation.

Does not cause damage to the reinforcing fibers as a result of the mixing action.

Allows use of rapid setting cementitious materials useful in manufacturing and construction applications.

The horizontal fiber-slurry continuous mixer disclosed as part of this invention comprises:

an elongated mixing chamber defined by a horizontal (typically cylindrical) housing having an interior side wall, a central rotating shaft mounted in the elongated mixing chamber traversing from one end of the mixer to another, wherein the central shaft is externally connected to a drive mechanism and a drive motor, for example, powered by electricity, fuel gas, gasoline, or other hydrocarbon, to accomplish shaft rotation when the mixer is in operation;

a plurality of mixing and conveying paddles mounted on the central shaft of the mixer at regular intervals and different circumferential locations, the paddles extending radially from a location on the central shaft, the paddles comprising a pin having a paddle head, the pin pivotally engaged to the shaft and/or the paddle head pivotally engaged to the pin to permit pivotal rotation of the paddle relative to the respective location on the shaft, wherein the plurality of paddles are arranged to mix the cementitious slurry and move the cementitious slurry and reinforcement fibers being mixed to the fiber-slurry mixture outlet, at least one fiber inlet port to introduce reinforcement fibers into the chamber in a first feed section of the horizontal housing;

at least one cementitious slurry inlet port to introduce cementitious slurry mixture into the chamber in the feed section of the horizontal housing;

a fiber-slurry mixture outlet port at a second discharge end section of the horizontal cylindrical housing to discharge the fiber reinforced cementitious slurry mixture produced by the mixer, and a venting port to remove any air introduced into the mixing chamber from raw material feed.

The fiber-slurry mixer can have additional inlet ports to introduce other raw materials or other performance enhancing additives into the mixing chamber.

The cementitious slurry and fibers are mixed in the mixing chamber of the horizontal fiber-slurry mixer for an average mixing residence time of about 5 to about 240 seconds, preferably 10 to 180 seconds, more preferably 10 to 120 seconds, most preferably 10 to 60 seconds while the rotating paddles apply shear force, wherein the central rotating shaft rotates at 30 to 450 RPM, more preferably 40 to 300 RPM, and most preferably 50 to 250 RPM during mixing, to the fiber-slurry mixture, wherein the fiber-slurry mixture discharged from the mixer has a slump of 4 to 11 inches, preferably 6 to 10 inches, as measured according to a slump test using a 4 inch tall and 2 inch diameter pipe and a viscosity less than 45000 centipoise, preferably less than 30000 centipoise, and more preferably less than 15000 centipoise. The resulting fiber-slurry mixture also has a slump according to the slump test using a 4 inch tall 2 inch diameter pipe is from 4 to 11 inches. The resulting fiber-slurry mixture is not suitable for extrusion manufacturing processes that typically rely on slurry mixture compositions have extremely high viscosity. The resulting fiber-slurry mixture is a uniform fiber-slurry mixture that has a consistency that will allow the fiber-slurry mixture to be discharged from the horizontal fiber-slurry mixer and be suitable for being deposited as a continuous layer on a moving surface of a panel production line uniformly as a layer 0.25 to 2.00 inches thick, preferably 0.25 to 1 inches thick, more preferably 0.4 to 0.8 inches thick, typically 0.5 to 0.75 inches thick on the moving surface of the panel production line to produce a fiber reinforced concrete (FRC) panel. Typically the fiber-slurry mixture is deposited at a rate of about 0.10-25 cubic feet per minute for a panel 4 to 8 feet wide. This is faster than conventional extrusion manufacturing processes that utilize extremely viscous slurries to facilitate product formation as the viscous slurry is extruded through a die to for product shape. Extrusion manufacturing processes are typically used to form three-dimensional hollow-shaped thin-walled articles where the high slurry viscosity is useful in holding product shape during and after material extrusion.

The central shaft is externally connected to a drive mechanism and a drive motor, for example, powered by electricity, fuel gas, gasoline, or other hydrocarbon, to accomplish shaft rotation when the mixer is in operation. Typically an electrical motor and drive mechanism will drive the central shaft in the mixing chamber.

A distinctive feature of the mixer and mixing method disclosed herein is the ability of this mixer to blend reinforcing fibers with the rest of the cementitious components in a continuous operation without unduly damaging the added fibers. Furthermore, the mixer and mixing method of this invention allow production of a fiber reinforced cementitious slurry mixture having a desirable working consistency. The slurries with favorable rheological properties produced by this mixer can beneficially be utilized for producing products using a variety of manufacturing processes. For instance, a workable slurry consistency facilitates further processing and formation of panel products on a continuous forming line running at high line speeds.

Figure 3:
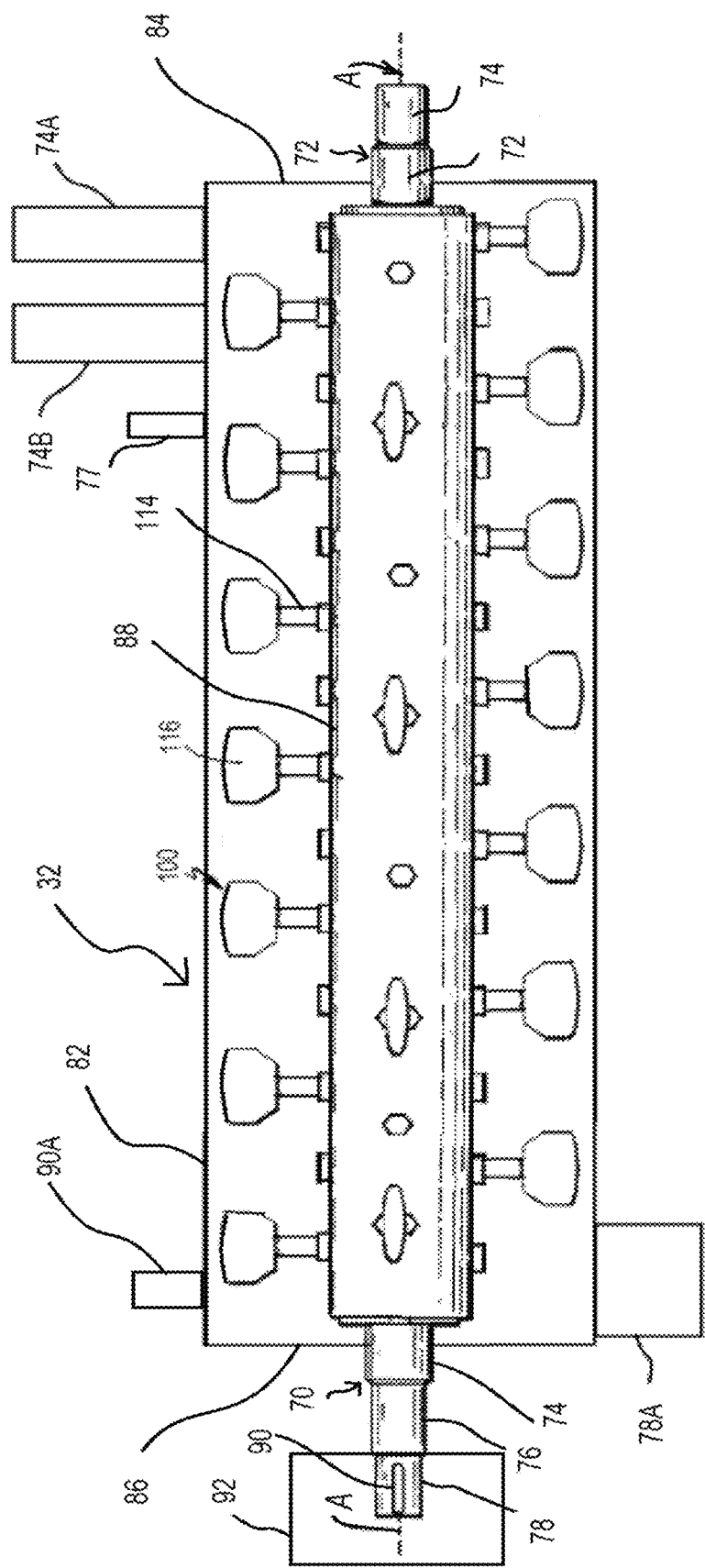
FIG. 3 shows a diagrammatic elevational view of a horizontal single shaft continuous fiber-slurry mixer embodiment of the present fiber-slurry mixing device.

FIG. 3 shows a schematic drawing of an embodiment of the fiber-slurry mixer 32. The shaft 88 and paddles 100. Each paddle 100 has a pin 114 and a broad paddle head 116 that extends transverse relative to the pin 114. Preferably the fiber-slurry mixer 2 is a single shaft mixer.

As depicted in FIG. 3, the embodiment of the horizontal fiber-cementitious slurry mixer 32 comprises an elongated mixing chamber comprising cylindrical horizontal sidewalls 82, a first end wall 84 of a feed section of the mixer 32, a second end wall 106 of a discharge section of the mixer 32. The horizontal fiber-cementitious slurry mixer 32 also comprises a central rotatable shaft 88, a cementitious slurry inlet 74A, a reinforcement fiber inlet 74B, and a fiber-slurry mixture discharge outlet 78A. Mixing and conveying paddles 100 extending from the central rotatable shaft 88. The horizontal fiber-cementitious slurry mixer 32 also comprises other inlet ports 77, one shown, to feed other raw materials and performance enhancing additives into the mixer. The horizontal fiber-cementitious slurry mixer 32 also comprises a venting port 90A to remove any air introduced into the mixing chamber from raw material feed. The horizontal fiber-cementitious slurry mixer 32 also comprises an electrical motor and drive mechanism 92 to drive the central shaft in the mixing chamber.

The rotatable shaft 88 rotates about its longitudinal axis "A" to mix the fed ingredients and convey them as fiber-slurry mixture to the discharge outlet 78A.

The reinforcement fibers and cementitious slurry and other ingredients will be fed to the mixer 32 at respective rates to leave an open space in the mixer above resulting mixture to facilitate mixing and conveying. If desired, a liquid level control sensor is used to measure the level of the slurry in the horizontal chamber of the mixer.

The rotatable shaft 88 may include a first end assembly 70 and a second end assembly 72. First end assembly 70 and second end assembly 72 may take any of a wide variety of forms known to one of skill in the art. For example, first end assembly 70 may include a first end engagement portion that operatively engages a first end of the rotatable shaft 88, a first cylindrical proportion 74 extending from the first end engagement portion, an intermediate cylindrical portion 76 extending from the first cylindrical portion 74, and an end cylindrical portion 78, extending from the intermediate cylindrical portion 76 and including a slot 90. The second end assembly 72 may include a second end engagement portion that operatively engages a second end of the rotatable shaft 88, a first cylindrical portion 72 extending from the second end engagement portion, and an end cylindrical portion 74 extending from the first cylindrical portion. In at least one embodiment, first end engagement portion of first end assembly 70 may be engaged to the rotatable shaft 88 proximate to first cylindrical proportion 74. In one or more embodiments, end cylindrical portion 78 may be operatively engaged to a motor or engine 92 capable of imparting rotation (e.g., high-speed rotation) to rotatable shaft 116 and the one or more paddle assemblies 100 engaged therewith to mix the reinforcement fibers and cementitious slurry. In at least one embodiment, second end engagement portion of second end assembly 72 may be engaged to a second end (e.g., an end opposing the first end) of rotatable shaft 88 proximate to first cylindrical portion 92. In one or more embodiments, end cylindrical portion 94 of second end assembly 72 may be preferably engaged to a bearing assembly, which may be integral to an exterior wall of the horizontal fiber-cementitious slurry mixer 32, to permit the rotation of rotatable shaft 88.

In one or more embodiments, as may be seen in FIG. 3, a plurality of paddle assemblies 100 may be permanently and/or removably engaged (e.g., affixed, adhered, connected, etc.) to rotatable shaft 88 and configured into, for example, aligned rows and/or columns (e.g., rows along the length of the rotatable shaft 116, columns around the circumference of the rotatable shaft 116). In one or more embodiments, paddle assemblies 100 may be permanently or releasably engaged to rotatable shaft 116 in offset rows or columns as desired. In addition, rotating shaft 116 may accommodate any arrangement or configuration of paddle assemblies 100 as desired, preferably but not limited to spiral and/or helical configurations.

The rotatable shaft 88, in one or more embodiments, may be constructed to rotate at a predetermined rate of 30 to 450 RPM, more preferably 40 to 300 RPM, and most preferably 50 to 150 RPM during mixing Paddle pin 114 has a width W1 which is less than a width W2 of paddle head 116 (See FIG. 4). Pin 114 of mixing and conveying paddle 100 may include a threaded end portion 115 (See FIG. 4) adapted for engagement into a threaded opening of the rotatable shaft 88, such that mixing and conveying paddle 100 may be rotated to achieve a desired or selected pitch (e.g., angle) relative to the rotatable shaft 88. In one or more embodiments, each mixing and conveying paddle 100 may be rotated a desired distance into the rotatable shaft 88, wherein the distance may be the same or different from one or more other paddle assemblies or sections of paddle assembes as engaged to the rotatable shaft 88.

The above mentioned features and parameters of the fiber-slurry continuous mixer of this invention are further described as follows:

Elongated Mixing Chamber

The elongated mixing chamber is typically cylindrical in shape.

The length of the mixing chamber typically ranges anywhere from about 2 to 8 feet. The preferred length of the mixing chamber is from about 3 to 5 feet.

The diameter of the mixing chamber typically ranges anywhere from about 4 to 24 inches. The preferred diameter of the mixing chamber ranges from about 6 to 12 inches.

Central Rotating Shaft

The central rotating shaft diameter is typically from about 1 to 8 inches. The preferred central shaft diameter ranges from about 2 to 6 inches.

The central rotating shaft rotates at a speed, preferably ranging from about 30 to 450 RPM, more preferably ranging from about 40 to 300 RPM, and most preferably ranging from about 50 and 150 RPM. It has been discovered that relatively lower mixer speeds are preferable to meet the objectives of the present invention. It has been surprisingly found that excellent fiber dispersion in the cementitious slurry mixture can be obtained even at relatively low mixer speeds. Furthermore, another important benefit of using lower mixing speeds is that it results in reduced fiber breakage and superior material working and flow properties useful in further processing of the fiber reinforced cementitious slurry mixture. A variable frequency drive is preferably used with the mixer for turning the central rotating shaft when the mixer is in the operational mode. The variable frequency drive is helpful for adjusting and fine-tuning the mixer speed for a given combination of raw materials involved in the production process.

The continuous mixers of the present invention can either be a single-shaft mixer, a dual-shaft mixer, or a multi-shaft mixer. This disclosure describes the single-shaft mixers of the present invention in greater detail. However, it is contemplated that dual-shaft or multiple-shaft mixers in accordance to the present invention can also be beneficially employed for producing fiber reinforced cementitious slurry mixtures possessing desirable properties that are useful in a variety of applications including continuous production processes.

Mixing and Conveying Paddles

The mixing and conveying paddles 100 mounted on the central shaft can have different shapes and dimensions to facilitate mixing and conveying of the added components in the mixer. The mixing and conveying paddles include paddles with a pin and a relatively wider head to help move the material forward. In addition to the paddles having one type of pin and head, the fiber-slurry mixer may include more than one type of paddle having a pin and a relatively wider head, or just pins, to achieve desirable characteristics for further processing of the material. However, as seen in FIG. 3 the invention may employ a single style paddle. The overall dimensions of the paddles are such that the clearance (space) between the inner circumference of the mixer chamber and the paddle's furthermost point from the central shaft is preferably less than ¼", more preferably less than ⅛", and most preferably less than 1/16". Too great a distance between the paddle tips and the inner walls of the chamber would result in slurry build-up. The paddles may be attached to the central shaft using different means including threaded attachment (as shown) and/or welding attachment (not shown).

The quality of mixing and conveying of the components in the mixer is also dictated by the orientation of the paddles in the mixer. A parallel or perpendicular paddle orientation with respect to the cross-section of the central shaft diminishes the conveying action of the paddles thus increasing the residence time of the material in the mixer. An increased residence time of the material in the mixer can lead to significant fiber damage and production of fiber reinforced cementitious slurry mixture having undesirable characteristics. The orientation of the longitudinal axis "LH" of the paddle head 116 with respect to the longitudinal axis "A" of the central shaft 88 is preferably at an angle "B" (FIG. 3C) from about 10° to 80°, more preferably from about 15° to 70°, and most preferably from about 20° to 60°. The use of preferred paddle orientation leads to a more efficient mixing and conveying action of the slurry mixture and causes minimal damage to the reinforcing fibers in the mixer.

The set of paddles in the mixer are typically configured in a spiral form on the central shaft from one end of the mixer to another. This arrangement of paddles further facilitates conveying action of the material inside the mixer. Other configurations of paddle arrangement in the mixer are possible and are contemplated as part of this invention.

The paddles can be made of variety of materials including metals, ceramics, plastics, rubber, or a combination thereof. Paddles with softer lining materials are also contemplated as they tend to minimize material and fiber breakage.

The paddles and/or inner walls of the elongated mixing chamber may be coated with a release material, to minimize buildup of the cementitious slurry on the paddles and/or shell.

Figure 6:
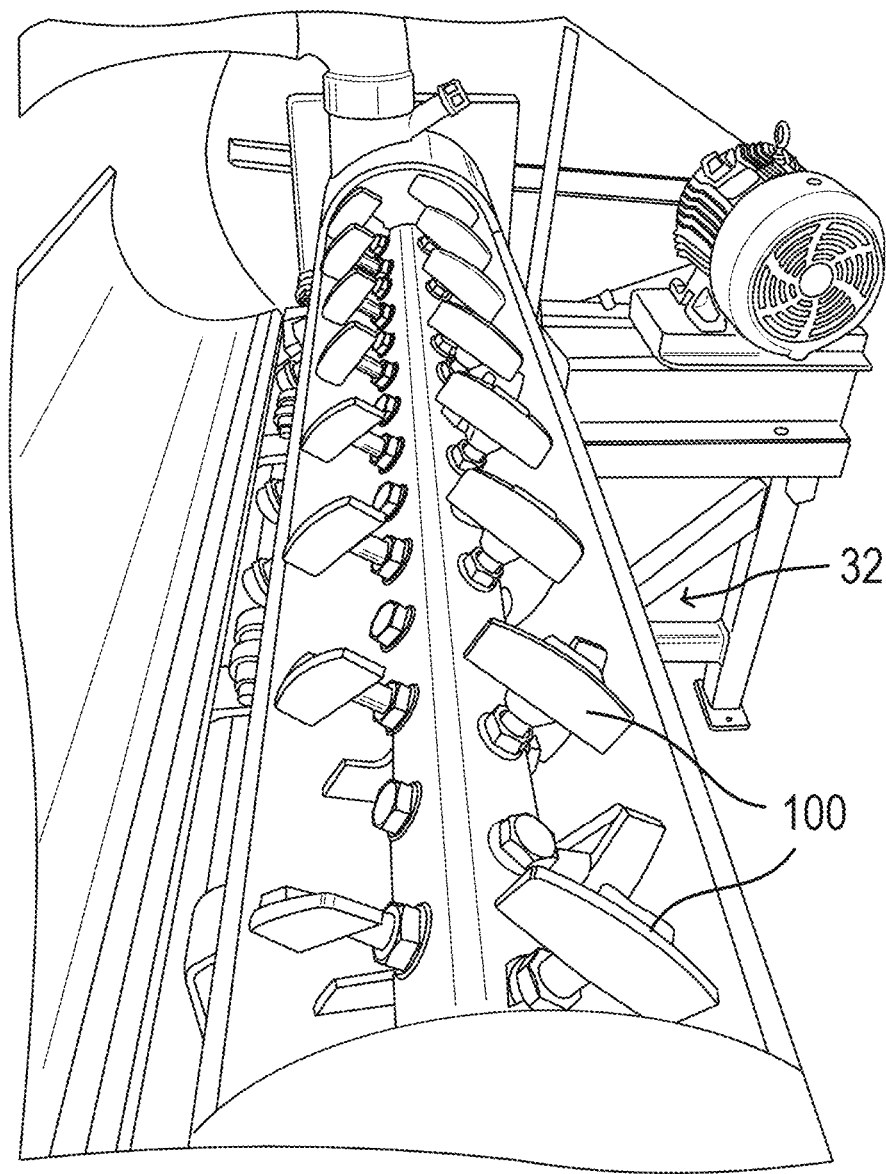
FIG. 6 shows the horizontal single shaft continuous fiber-slurry mixer embodiment of the present fiber-slurry mixing device in an open position.
Figure 7:
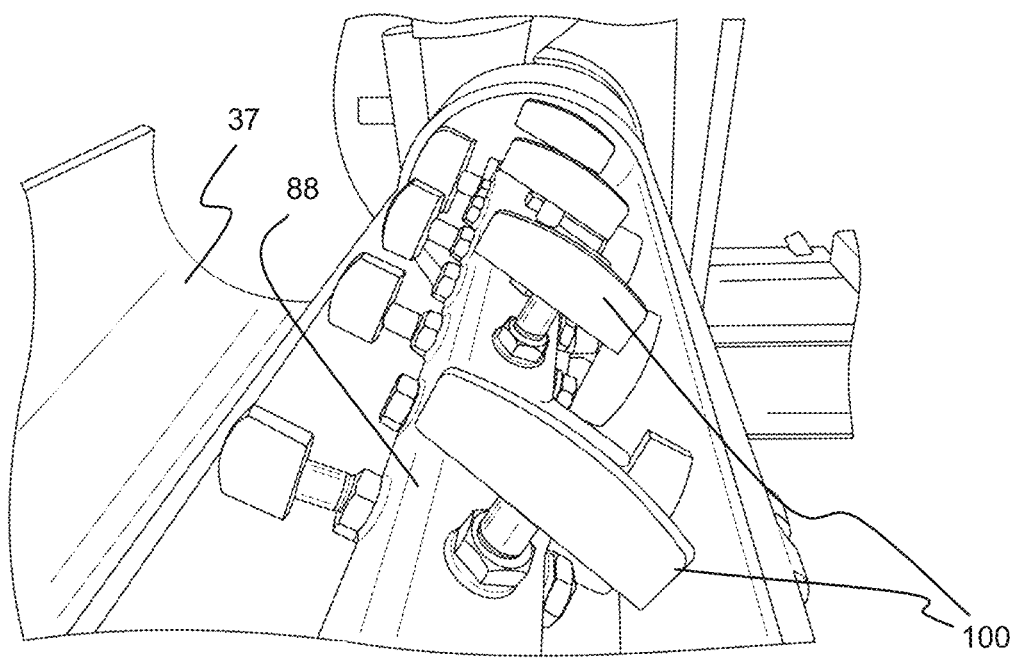
FIG. 7 shows a portion of the horizontal single shaft continuous fiber-slurry mixer embodiment of the present fiber-slurry mixing device of FIG. 4 in an open position.
Figure 8:
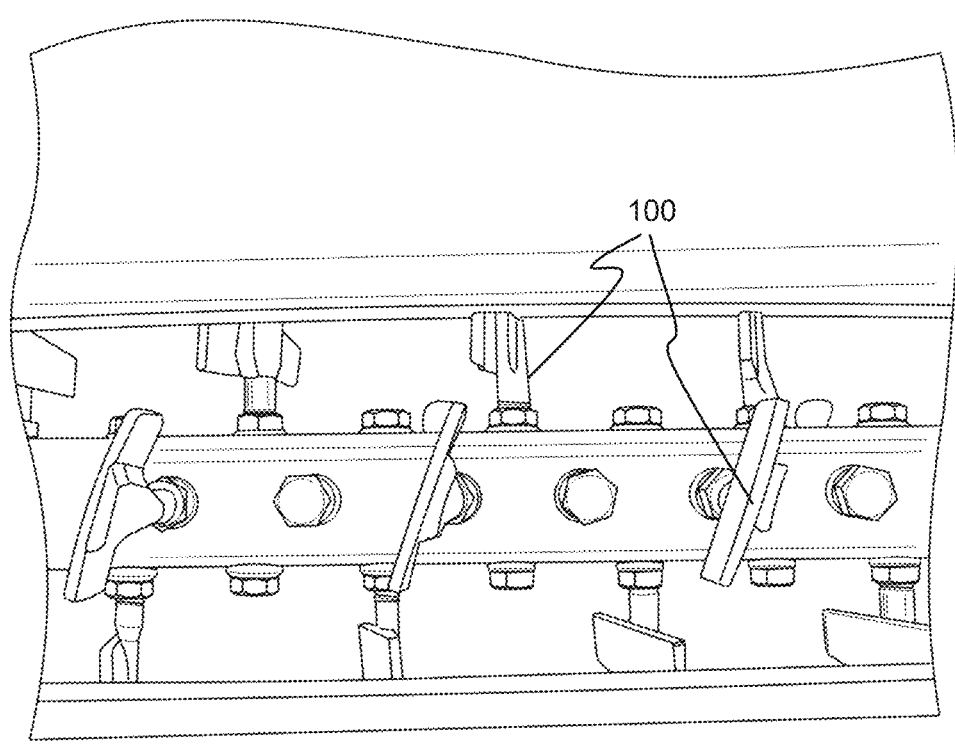
FIG. 8 shows a portion of the horizontal single shaft continuous fiber-slurry mixer embodiment of the present fiber-slurry mixing device of FIG. 4 in an open position.

FIGS. 6-8 show portions of the fiber-slurry mixer 32 with a door 37 of its mixing chamber in an open position to show views of the paddles 100 mounted on the shaft 88 by being threaded into the shaft 88.

Furthermore, FIG. 7 shows a shaft having four linear rows of paddles (three rows shown) in the mixer in this particular embodiment of mixer configuration.

FIG. 8 provides a close-up view of the mixer showing the orientation of the paddles 100 with respect to the central shaft 88. Placement of the paddles 100 on the central shaft 88 in the spiral form can also be observed.

Inlet Ports

The size, location, and orientation of raw material inlets ports (inlet conduits) of the fiber-slurry mixer are configured to ease introduction of the raw material into the fiber-slurry mixer and to minimize potential for blocking of ports from the slurry mixture in the mixer.

The cementitious slurry from the slurry mixer is preferably conveyed using a slurry hose to the fiber-slurry mixer and introduced into the fiber-slurry mixer through an inlet port setup to accept the slurry hose. Alternatively, the cementitious slurry from the slurry mixer may be gravity fed to the fiber-slurry mixer.

The fibers can be introduced into the fiber-slurry mixer gravimetrically or volumetrically using a variety of metering equipment such as screw feeders or vibratory feeders. Fibers can be conveyed from a fiber feeder to the fiber-slurry mixer by a variety of conveying devices. For example, fibers can be transferred using screws (augers), air conveying, or simple gravity deposition. Discrete or chopped fibers can be made of different reinforcing fiber materials including fiberglass; polymeric materials such as polypropylene, polyethylene, polyvinyl alcohol, etc; carbon; graphite; aramid; ceramic; steel; cellulosic or natural fibers such as jute or sisal; or a combination thereof. The fiber length is about 2 inches or lower, more preferably less than 1.5 inches or lower and most preferably less than 0.75 inches or lower.

Figure 9:
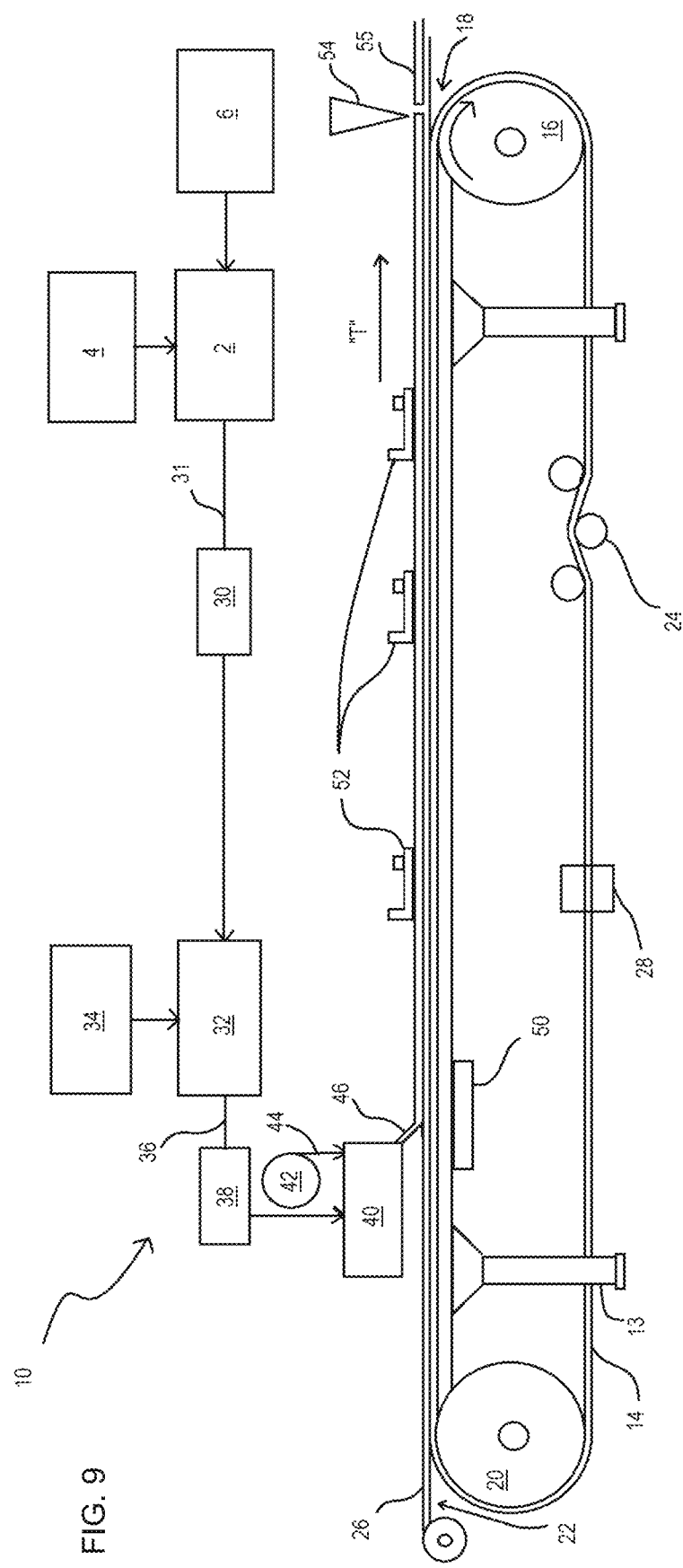
FIG. 9 is a diagrammatic elevational view of a cementitous panel production line suitable for use with the present fiber-slurry mixing device.

Panel Production Using the Fiber-Slurry Mixture from the Slurry Mixer and Fiber-Slurry Mixer System FIGS. 9 and 10 show the fiber-slurry mixture from fiber-slurry mixer 32 used in panel production. A cementitious panel production line is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the cementitious panels are produced continuously as the moving carrier proceeds in a direction "T" from the proximal end 22 to the distal end 18.

In this embodiment, a web 26 of release paper, polymer film or a plastic carrier, slip sheet or forming mold, for supporting a slurry prior to setting, may be provided and laid upon the carrier 14 to protect it and/or keep it clean. However, it is also contemplated that, rather than the continuous web 26, individual sheets (not shown) of a relatively rigid material, e.g., sheets of polymer plastic, may be placed on the carrier 14. These carrier films or sheets may be removed from the produced panels at the end of the line or they may be incorporated as a permanent feature in the panel as part of the overall composite design. When these films or sheets are incorporated as a permanent feature in the panel they may provide enhanced attributes to the panel including improved aesthetics, enhanced tensile and flexural strengths, enhanced impact and blast resistance, enhanced environmental durability such as resistance to water and water vapor transmission, freeze-thaw resistance, salt-scaling resistance, and chemical resistance.

Continuous reinforcement 44 such as a roving or a web of reinforcing scrim such as fiberglass scrim may be provided for embedding in the slurry prior to setting and reinforcing the resulting cementitious panels. The continuous rovings and/or reinforcing scrim roll 42 are fed through the headbox 40 to be laid upon the carrier 14. However, it is also contemplated to not employ continuous reinforcement 44. The continuous scrim or rovings can be made of different reinforcing fiber materials including fiberglass; polymeric materials such as polypropylene, polyethylene, polyvinyl alcohol, etc; carbon; graphite; aramid; ceramic; steel; cellulosic, paper, or natural fibers such as jute or sisal; or a combination thereof. A roving is an assemblage of continuous reinforcing monofilaments. Scrim is a web of continuous fibers running in the machine direction and the cross-direction. Reinforcement may also be provided as a nonwoven fiber web made of discrete reinforcement fibers. The nonwoven fiber web may be made of organic fibers such as polyolefin fibers or inorganic fibers such or fiberglass or a combination thereof. Fibrous webs made of metal fibers are also contemplated as part of the present invention.

It is also contemplated to form the cementitious panels produced by the present line 10 directly upon the carrier 14. In this situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 (forming belt) of the forming line may vary to suit the product being made. The fiber-slurry mixture travels in direction "T".

The present production line 10 includes a continuous slurry mixer 2. The slurry mixer may be a single shaft or dual shaft mixer. Dry powder feeder 4 (one or more may be employed) feeds dry components of the cementitious composition, except for reinforcing fibers, to the slurry mixer 2. Liquid pump 6 (one or more may be employed) feeds to the slurry mixer 2 aqueous medium, such as water, with liquid or water soluble additives. The slurry mixer mixes the dry components and the aqueous medium to form a cementitious slurry 8. The cementitious slurry 31 feeds a first slurry accumulator and positive displacement pump 30 which pumps the slurry to a fiber-slurry mixer 32. A fiber feeder 34 (one or more may be employed) feeds fibers to the fiber-slurry mixer 32. Thus, in the fiber-slurry mixer 32 the fibers and slurry are mixed to form a fiber-slurry mixture 36. Fiber-slurry mixture 36 feeds a second slurry accumulator and positive displacement pump 38 which pumps the fiber-slurry mixture 36 to a forming assembly 40 (forming headbox).

Forming assembly 40 deposits the fiber-slurry mixture on the web 26 of release paper, continuous reinforcement, rovings, and/or reinforcing scrim, and/or nonwoven fiber web (if present) on the moving carrier. If present, continuous reinforcement 44 provided by rovings and/or scrim roll and/or nonwoven fiber web 42 may be deposited on the fiber-slurry mixture traveling on the moving carrier 14. To assist in leveling the fiber-slurry mixture 46 a forming vibrating plate 50 may be provided under or slightly downstream on the location where the forming assembly 40 deposits the fiber-slurry mixture 46.

The slurry 46 sets as it travels along the moving carrier 14. To assist in leveling the fiber-slurry mixture 46 as the slurry 46 is setting the slurry 46 passes under one or more vibrating screed plates 52. At the distal end 18 of the support frame 12 a cutter 54 (panel cutting device) cuts the set slurry into boards 55. The boards (panels) 55 are then placed on an unloading and curing rack 57 (See FIG. 10) and allowed to cure. Thus, the panel 55 is formed directly on the forming belt 14 or optional release paper/slip sheets/forming molds/nonwoven fiber webs 26.

FIG. 9 further shows edge formation and leakage prevention devices 80. These are edge belts, edge rails or other suitable edge formation and leakage prevention devices as explained elsewhere in this specification, for example belt-bonded slit formers, used singly or in combination.

The fiber-cement mixtures produced by the method and apparatus of this invention contain cement, water, and other cement additives. However, to achieve the desired viscosity the cementitious compositions preferably avoid thickeners or other high viscosity processing aids at high dosage rates as commonly used with conventional fiber cement extrusion processes. For example, the present slurries avoid high viscosity cellulose ethers addition at high dosage rates. Examples of high viscosity cellulose ethers which the present slurries avoid are methyl cellulose, hydroxypropyl methyl cellulose, and hydroxyethyl methylcellulose.

The fiber-cement mixtures produced by the method and apparatus of this invention are aqueous slurries which may be from a variety of settable cementitious slurries. For example, compositions based on hydraulic cements. ASTM defines "hydraulic cement" as follows: a cement that sets and hardens by chemical interaction with water and is capable of doing so under water. Examples of suitable hydraulic cements are Portland cement, calcium aluminate cements (CAC), calcium sulfoaluminate cements (CSA), geopolymers, magnesium oxychloride cements (sorel cements), and magnesium phosphate cements. A preferred geopolymer is based on chemical activation of Class C fly ash.

While calcium sulfate hemihydrate sets and hardens by chemical interaction with water, it is not included within the broad definition of hydraulic cements in the context of this invention. However, calcium sulfate hemihydrate may be included in fiber-cement mixtures produced by the method and apparatus of this invention. Thus, also such aqueous slurries may be based on calcium sulfate cements such as gypsum cements or plaster of Paris. Gypsum cements are primarily calcined gypsum (calcium sulfate hemihydrate). It is customary in the industry to term calcined gypsum cements as gypsum cements.

The fiber-cement mixtures contain sufficient water to achieve the desired slump test value and viscosity in combination with the other ingredients of the fiber-cement mixtures. If desired the composition may have a weight ratio of water-to-reactive powder of 0.20/1 to 0.90/1, preferably 0.20/1 to 0.70/1.

The fiber-cement mixtures may contain pozzolanic material such as silica fume, a finely divided amorphous silica which is the product of silicon metal and ferro-silicon alloy manufacture. Characteristically, it has very high silica content and low alumina content. Various other natural and man-made materials have been referred to as having pozzolanic properties, including pumice, perlite, diatomaceous earth, tuff, trass, metakaolin, microsilica, and ground granulated blast furnace slag. Fly ash also has pozzolanic properties. The fiber-cement mixtures may contain Ceramic microspheres and/or Polymer microspheres.

However, one use of the fiber-cement slurries made by the present method is to produce structural cement panels (SCP panels) having reinforcing fibers such as fiberglass, particularly alkali resistant glass fibers. As such, the cementitious slurry 31 is preferably comprised of varying amounts of Portland cement, gypsum, aggregate, water, accelerators, plasticizers, superplasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

Water reducing admixture additives optionally can be included in the fiber-cement mixture, such as, for example, superplasticizer, to improve the fluidity of a hydraulic slurry. Such additives disperse the molecules in solution so they move more easily relative to each other, thereby improving the flowability of the entire slurry. Sulfonated melamines and sulfonated naphthalenes, and polycarboxylate based superplasticizers can be used as superplasticizers. Water reducing admixture additive can be present in an amount from 0% to 5%, preferably 0.5 to 5%, by weight of the wet finish fiber-slurry mixture.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

If desired the composition may have a weight ratio of water-to-reactive powder of 0.20/1 to 0.90/1, preferably 0.20/1 to 0.70/1.

Various formulations for the composite slurry used in the current process are also shown in published US applications US2006/0185267, US2006/0174572; US2006/0168906 and US 2006/0144005, all of which are incorporated herein by reference in their entirety. A typical formulation would comprise as the reactive powder, on a dry basis, 35 to 75 wt. % (typically 45-65 or 55 to 65 wt. %) calcium sulfate alpha hemihydrate, 20 to 55 wt. % (typically 25-40 wt. %) hydraulic cement such as Portland cement, 0.2 to 3.5 wt. % lime, and 5 to 25 wt. % (typically 10-15 wt. %) of an active pozzolan. The continuous phase of the panel would be uniformly reinforced with alkali-resistant glass fibers and would contain 2-50%, for example 20-50%, by weight of uniformly distributed lightweight filler particles selected from the group consisting of ceramic microspheres, glass microspheres, plastic microspheres, fly ash cenospheres and perlite. An example of a formulation for the composite slurry includes from 42 to 68 wt. % reactive powders, 23 to 43 wt. % ceramic microspheres, 0.2 to 1.0 wt. % polymer microspheres, and 5 to 15 wt. % alkali-resistant glass fibers, based on the total dry ingredients.

U.S. Pat. No. 8,038,790 to Dubey et al provides another example of a preferred formulation for the composite slurry which includes an aqueous mixture of a cementitious composition comprising, on a dry basis, 50 to 95 wt % reactive powder, 1 to 20 wt % of coated hydrophobic expanded perlite particles uniformly distributed as lightweight filler therein, the coated hydrophobic perlite particles having a diameter in the range of about 1 to 500 microns (micrometers), a median diameter of 20 to 150 microns (micrometers) and an effective particle density (specific gravity) of less than about 0.50 g/cc, 0 to 25 wt % hollow ceramic microspheres, and 3 to 16 wt. % alkali-resistant glass fibers for uniformly distributed for reinforcement; wherein the reactive powder comprises: 25 to 75 wt. % calcium sulfate alpha hemihydrate, 10 to 75 wt. % hydraulic cement comprising Portland cement, 0 to 3.5 wt. % lime, and 5 to 30 wt. % of an active pozzolan; and the panel having a density of 50 to 100 pounds per cubic foot.

Although the above compositions for the composite fiber-slurry mixture are preferred, the relative amounts of these ingredients, including the elimination of some of the above or the addition of others, may vary to suit the intended use of the final product.

Method with the Horizontal Multi-Stage Fiber-Slurry Continuous Mixer

As an alternative to using the separate slurry mixer 2 and fiber-slurry mixer 32 to make the fiber-slurry mixture, the mixing of water and cementitious material and fibers may be combined in a single unit operation to make the fiber-slurry mixture using a combination continuous mixer where the first section of the horizontal mixer produces a cementitous slurry mixture by combining all dry powders, chemical additives, and water; and the second section of mixer produces a fiber reinforced cementitous slurry mixture by introducing and combining the reinforcing fibers with the incoming cementitous slurry mixture produced in the first section of the combined mixer.

Figure 11:
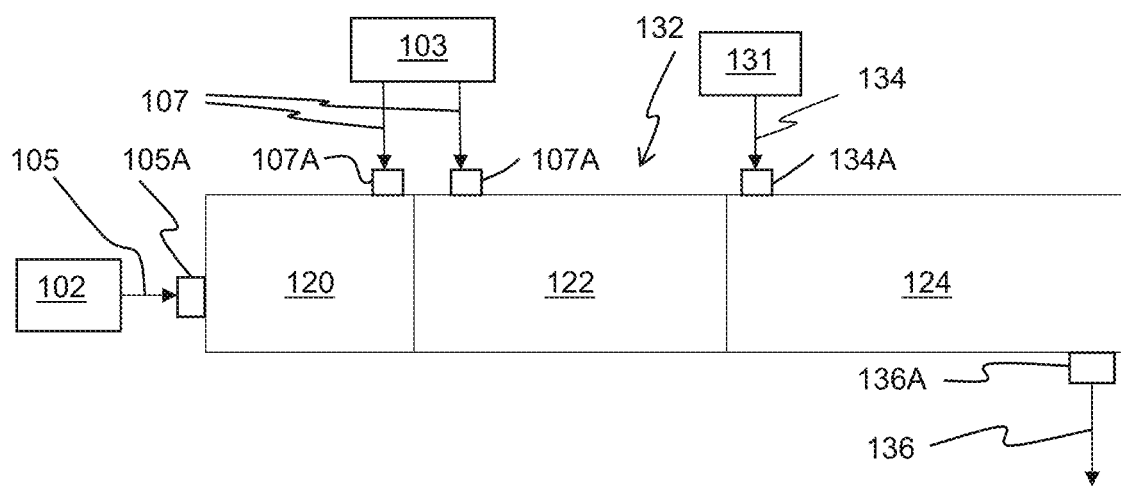
FIG. 11 shows a block flow diagram of the mixing portion of the method of the present invention employing a multi-stage mixer.

FIG. 11 shows a block flow diagram of the mixing portion of the method of the present invention employing a fiber-slurry multi-stage mixer 132. In the mixing portion of the method a stream 105 of dry cementitious powder from a dry powder feeder 102 passes through a dry cementitious powder inlet conduit 105A to feed a first feed section 120 of the fiber-slurry mixer 132. An aqueous medium stream 107 from one or more pumps 103 passes through at least one aqueous medium stream conduit 107A (two shown) to feed a first mixing section 122 and optionally also the first feed section 120 of the fiber-slurry mixer 132. A stream 134 of reinforcing fibers passes from a fiber feeder 131 through a reinforcing fibers stream conduit 134A to feed a second mixing section 124 of the fiber-slurry mixer 132. The stream 105 of dry cementitious powder, aqueous medium stream 107, and stream 134 of reinforcing fibers combine in the fiber-slurry mixer 132 to make a stream of fiber-cement mixture 136 which discharges through a discharge conduit 136A at a downstream end of the mixer 132.

Horizontal Multi-Stage Fiber-Slurry Continuous Mixer

The multi-stage fiber-slurry continuous mixer of the present invention preferably achieves the following results:

Allows continuous blending of fibers with the rest of the cementitious components to produce a uniformly mixed fiber reinforced cementitious slurry mixture.

Reduces the required mixing time from several minutes to less than 60 seconds, preferably less than 30 seconds, to produce a uniformly blended fiber reinforced cementitious slurry mixture. Generally the chamber provides an average slurry residence time of about 5 to about 240 seconds, preferably 10 to 180 seconds, more preferably 10 to 120 seconds, most preferably 10 to 60 seconds.

Does not cause fiber balling and lumping during the mixing operation.

Does not cause damage to the reinforcing fibers as a result of the mixing action.

Allows use of rapid setting cementitious materials useful in manufacturing and construction applications.

The method of using the horizontal fiber-slurry continuous mixer disclosed as part of this invention comprising the steps of:

feeding a dry cementitious powder into a horizontal continuous slurry mixer through at least one dry cementitious powder inlet port;

the horizontal continuous mixer comprising
an elongated mixing chamber, the elongated mixing chamber defined by a horizontal (typically cylindrical) housing having an interior side wall, the elongated mixing chamber having an upstream end feed section, a first mixing section, and a second downstream end mixing section, wherein the first mixing section is between the upstream end feed section and the second downstream end mixing section,
at least a pair of horizontally oriented intermeshing self-wiping impellers traversing from an upstream end of the elongated mixing chamber to a downstream end of the elongated mixing chamber and rotating within the elongated mixing chamber, wherein each horizontally mounted impeller within the upstream end feed section of the elongated mixing chamber comprises an auger, wherein the dry cementitious powder is fed into the upstream end feed section of the elongated mixing chamber and conveyed by the auger to the first mixing section, feeding a liquid stream comprising water into the elongated mixing chamber of the continuous slurry mixer through at least one liquid stream inlet port downstream of the at least one dry cementitious powder inlet port and mixing the dry cementitious powder and the liquid stream in the first mixing section to form a cementitious slurry;

wherein each horizontally mounted impeller within the first mixing section comprises a first plurality of mixing and conveying paddles mounted on a horizontally oriented shaft of the impeller at regular intervals and different circumferential locations, the paddles rotated about the horizontally oriented shaft within the horizontal, preferably cylindrical, housing, the paddles extending radially from the shaft, feeding a stream of reinforcement fibers through at least one reinforcement fiber inlet port into the second mixing section, and mixing the cementitious slurry and the reinforcement fibers in the second mixing section to form a fiber-slurry mixture, wherein at least a portion of each horizontally mounted impeller within the second mixing section of the elongated mixing chamber comprises at least one member selected from the group consisting of:

an auger, and a second plurality of mixing and conveying paddles mounted on the horizontally oriented shaft of the mixer at regular intervals and different circumferential locations, the paddles rotated about each respective horizontally oriented shaft within the horizontal (preferably cylindrical) housing, the paddles extending radially from the respective shaft, discharging the fiber-slurry mixture from the mixer through a fiber-slurry mixture outlet port at a downstream end portion of the second mixing section, wherein the cementitious slurry and fibers are mixed in the mixing chamber of the horizontal continuous mixer for an average mixing residence time of about 5 to about 240 seconds, preferably 10 to 180 seconds, more preferably 10 to 120 seconds, most preferably 10 to 60 seconds while the rotating paddles apply shear force, wherein the central rotating shaft rotates at 30 to 450 RPM, more preferably 40 to 300 RPM, and most preferably 50 to 250 RPM during mixing, to the fiber-slurry mixture to produce a uniform fiber-slurry mixture, wherein the fiber-slurry mixture discharged from the mixer has a slump of 4 to 11 inches, preferably 6 to 10 inches, as measured according to a slump test using a 4 inch tall and 2 inch diameter pipe and a viscosity less than 45000 centipoise, preferably less than 30000 centipoise, and more preferably less than 15000 centipoise. As with the method employing the separate slurry mixer and fiber-slurry mixer the resulting fiber-slurry mixture is not suitable for extrusion manufacturing processes that typically rely on slurry mixture compositions have extremely high viscosity.

Each horizontally oriented shaft is externally connected to a drive mechanism and a drive motor, for example, powered by electricity, fuel gas, gasoline, or other hydrocarbon, to accomplish shaft rotation when the mixer is in operation.

The paddles of the first and/or second mixing sections may be flat paddles or helical paddles. Flat paddles and helical paddles are unitary paddles having a central opening fitted to the shaft such that the paddle encircles a portion of the shaft. Also, the flat paddles and helical paddles have opposed ends extending in opposite directions from the shaft. Preferably if the flat paddles or helical paddles are employed in the second mixing section they are employed in a paddle portion of the second mixing section and an auger is also employed in the second mixing section before and/or after the paddle section.

However, in the alternative the paddle of the first and/or second mixing sections comprises a pin engaged to a broad paddle head, the pin pivotally engaged to the horizontally oriented shaft and/or the paddle head to permit pivotal rotation of the paddle head relative to the respective location on the horizontally oriented shaft, wherein the paddles are arranged to mix the reinforcement fibers and cementitious slurry and move the cementitious slurry and reinforcement fibers being mixed to the fiber-slurry mixture outlet. Preferably if the paddles of the first and second mixing section each comprise the pin engaged to the paddle head then the second mixing section has an absence of an auger. The second mixing section can optionally have only pins (without paddle head) to mix fibers with the slurry. The cross-sectional shape of the pin can either be round, flat (i.e., square or rectangular), triangular, oval or any other shape. When pins with elongated cross-section are employed (example, rectangular or oval cross-section), the pins are preferably oriented such that they not only help to mix the material but also provide the function of moving the material forward toward the mixer outlet.

The central shaft is externally connected to a drive mechanism and a drive motor, for example, powered by electricity, fuel gas, gasoline, or other hydrocarbon, to accomplish shaft rotation when the mixer is in operation. Typically an electrical motor and drive mechanism will drive the central shaft in the mixing chamber.

A distinctive feature of the mixer and mixing method disclosed herein is the ability of this mixer to blend reinforcing fibers with the rest of the cementitious components in a continuous operation without unduly damaging the added fibers. Furthermore, the mixer and mixing method of this invention allow production of a fiber reinforced cementitious slurry mixture having a desirable working consistency. The fiber-slurry mixtures discharged from the multi-stage fiber-slurry mixer are suitable for a variety of uses, for example statuary, shotcrete, consolidation of loose rock, soil stabilization, pre-cast concrete products, pavement, repair application, or to make a fiber reinforced concrete (FRC) building panel or board. For instance, a workable slurry consistency facilitates further processing and formation of panel products on a continuous forming line running at high line speeds.

The uniform fiber-slurry mixture produced has a consistency that will allow the fiber-slurry mixture to be discharged from the horizontal fiber-slurry mixer and be suitable for being deposited as a continuous layer on a moving surface of a panel production line uniformly as a layer 0.25 to 2.00 inches thick, preferably 0.25 to 1 inches thick, typically 0.5 to 0.75 inches thick on the moving surface of the panel production line to produce a fiber reinforced concrete (FRC) panel.

The multi-stage continuous mixer of this invention can either be a dual-shaft mixer or a multi-shaft mixer. Preferably, the multi-stage continuous mixer of this invention is a dual-shaft mixer.

The multi-stage continuous mixer of this invention has an initial auger section and at least two mixing sections. The dry powders are introduced into the mixer through an inlet port located at one end of the mixer. The augers located in the auger section move the dry powders forward into the first mixing section. The first mixing section is intended for mixing the dry powders with the liquid additives including water to produce a uniform blend of cementitious slurry mixture. The cementitious slurry mixture so produced in the first section of the mixer is conveyed to the second mixer section. The second mixing section is where fibers are blended with cementitious slurry produced and conveyed from the first mixer section. The resultant fiber reinforced slurry mixture exits the mixer through an outlet port located at the end of the second mixer section.

The various key components and features of a multi-stage, dual-shaft (or multi-shaft) continuous mixer disclosed as part of this invention can be highlighted as follows:

An Elongated Mixing Chamber

The elongated double barrel mixing chamber houses the dual rotating shafts (or multi rotating shafts) of the continuous mixer.

The total length of the mixing chamber typically ranges from about 2 to 8 feet. The preferred length of the mixing chamber is typically from about 3 to 6 feet.

The diameter of the mixing chamber typically ranges anywhere from about 3 to 24 inches. The diameter of the mixing chamber preferably ranges from about 5 to 12 inches.

Dual rotating shafts (or multi rotating shafts) mounted in the elongated mixing chamber traversing from one end of the mixer to another. The shafts are externally connected to a drive mechanism and an electrical motor to accomplish shaft rotation when the mixer is in operation. The shafts rotate at a speed, ranging from 30 to 450 RPM, more preferably 40 to 300 RPM, and most preferably 50 to 250 RPM. As part of the mixer development and optimization work, it has been discovered that relatively lower mixer speeds are preferable and provide excellent dispersion of fibers in the cementitious slurry mixture. Furthermore, another important benefit of using lower mixing speeds for the purposes of this invention is that it results in reduced fiber breakage and superior material working properties useful in further processing of the fiber reinforced cementitious slurry mixture. A variable frequency drive along with gearing, chain or a belt arrangement is typically used with the mixer for turning the rotating shaft when the mixer is in operation. The variable frequency drive is helpful for adjusting and fine-tuning the mixer speed for a given combination of raw materials involved in the production process.

An auger section to convey the dry powders from the mixer inlet port to the first mixing section of the continuous mixer. The initial length of the mixer shafts is in the form of an auger that accomplishes movement of the dry powder forward. When dual-shafts (or multi-shafts) are used in the mixer, the individual shafts are positioned in the mixer such that the flights from one auger section are in overlapping position to the flights from the second auger section. This overlapping placement of the two auger sections in the mixer provides self-cleaning action to the auger section of the mixer. The initial auger section (located near the dry powder mixer inlet) in a dual-shaft mixer configuration are shown in FIGS. 2A and 2B.

Figure 12A:
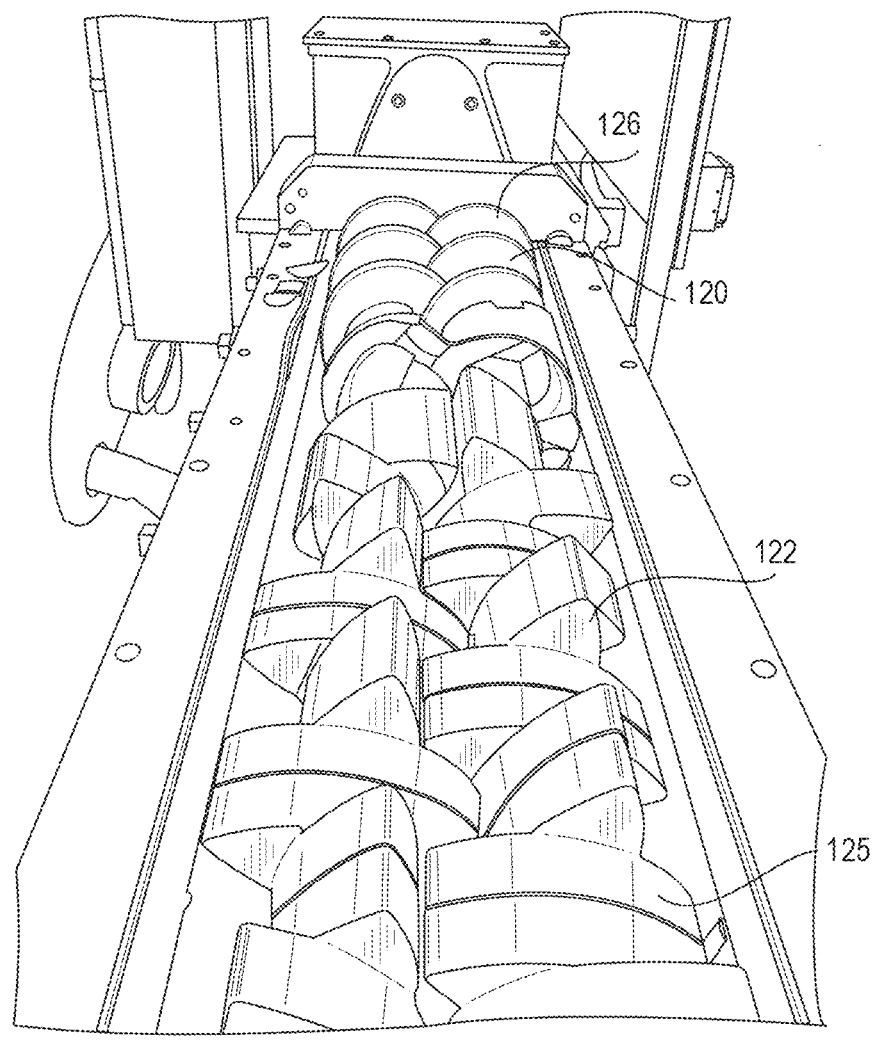
FIG. 12A shows an auger section at the mixer inlet and flat paddles mounted on the two shafts in the first mixing section of the horizontal dual shaft multi-stage continuous fiber-slurry mixer embodiment of the present fiber-slurry mixing device.

FIG. 12A shows a portion of the horizontal dual shaft multi-stage continuous fiber-slurry mixer embodiment of the present fiber-slurry mixing device. In particular, FIG. 12A shows a first feed section 120 (also known as an auger section) having an auger 126 at the mixer inlet. FIG. 2A also shows a first mixing section 123 having flat paddles 125 mounted on the two shafts.

FIG. 12B shows another view of the augers 126 in the first feed section 120 (also known as an auger section) of the present fiber-slurry mixer 132. The length of first feed section 120 is typically from about 1 to 3 feet. The auger flight pitch may be varied depending upon the raw materials used, raw material feed rates desired, and the design configuration of the two mixing sections of the mixer.

The first mixing section 120 comprises mixing paddles 125 mounted on the individual rotating shafts of the mixer. There are two types of paddles that are typically used in the first mixing section—flat or helical. FIG. 2C shows a flat mixing paddle 125 as used in FIG. 2A. FIG. 2D shows a helical mixing paddle 127 that can be used in the first mixing section of this mixer. The flat paddles 125 provide a high shear mixing action with negligible conveying action to the material in the mixer. On the other hand, the helical paddles 127 provide both the mixing and (limited) conveying actions to the material in the mixer.

Flat paddles 125 and helical paddles 127 are unitary (one piece) paddles having a central opening fitted to the shaft such that the paddle encircles a portion of the shaft. Also, the flat paddles and helical paddles have opposed ends extending in opposite directions from the shaft. Flat paddles 125 and helical paddles 127 have a central hole with key slots cut into them to allow the paddles to slide and mount onto a keyed shaft. The paddles are concentrically mounted and keyed on to the shaft. The orientation of the adjacent paddles mounted on the two shafts of the dual shaft mixer is such that they provide wiping action without any rotational interference, Other paddle shapes and geometries can also be used in the first mixing section of the mixer. For example, of mixing and conveying paddles which each comprise a pin engaged to a paddle head can be employed in the first and/or second mixing sections as explained in more detail below regarding FIG. 5.

The paddles mounted on the individual shafts are in over-lapping but non-interfering orientation when the mixer shafts are in rotational mode during the mixer operation. FIGS. 12A and 12E show flat paddles 125 mounted on the two shafts (in the first mixing section) of a dual-shaft mixer. In particular, FIG. 12E shows an enlarged view of flat paddles 125 mounted on the two shafts in the first mixing section of the horizontal dual shaft multi-stage continuous fiber-slurry mixer embodiment of the present fiber-slurry mixing device. However, helical paddles 127 can be substituted for some or all flat paddles 125.

The primary purpose of the paddles situated in the first mixing section 122 of the mixer 32 is to blend the dry powder with the water and other liquid additives (if any) to produce a uniform cementitious slurry mixture. Due to the over-lapping but non-interfering orientation of the paddles, the rotation of the paddles 125 mounted on the individual shafts provides a self-cleaning action to the first mixing section 122 of the mixer 132. The flat 125 or helical 127 mixing paddles mounted on the two shafts are particularly useful in this regard. This provides excellent self-cleaning action due to the scraping action of the paddles against each other and against the barrel (shell) of the mixer. Flat paddles are the most preferred paddles, as opposed to helical paddles, for use in the first mixing section 122 for the purposes of this invention. The length of the first mixing section 122 is typically from about 1 to 4 feet. More typically, the length of the first mixing section is about 3 feet or less. The width of the individual flat or helical mixing paddles ranges from about 0.25" to 4". More typically, the width of the mixing flat or helical paddles is from 1" to 3". The clearance of the mixing paddles, regardless of whether flat, or helical or another shape, from the mixer shell is preferably less than ¼", more preferably less than ⅛", and most preferably less than 1/16".

The second mixing section 124 of the mixer 132 is where the reinforcing fibers are typically introduced into the mixer and blended with the cementitious slurry. The second mixing section 124 is essentially a continuation of the first mixing section 122 and utilizes one or more means to blend fibers into the cementitious slurry. The reinforcing fibers through conduit 134 are introduced into the continuous mixer 132 at the beginning of the second mixing section 124. The reinforcing fibers are blended with the cementitious slurry produced in the first mixing section 122 using either mixing paddles or augers or a combination thereof. The mixing paddles and/or augers are mounted on the dual rotating shafts of the mixer and help to blend the reinforcing fibers with the cementitious slurry mixture conveyed from the first mixing section. The mixing paddles (flat paddles 125 and/or helical paddles 127) as described and used in the first mixing section 122 may be used in the second mixing section 124 as well. However, use of such paddles has been found to cause significant fiber damage due to the high shear action provided by these paddles. Therefore, use of such paddles alone in the second mixing section is not preferred, particularly when a large number of such paddles are used. Helical paddles are better suited than the flat paddles in the second mixing section to meet the objectives of this invention.

Augers can also be used for blending of fibers with the cementitious slurry in the second mixing section 124. Augers used on their own provide a rapid conveying action and a relatively less mixing action than that provided by the paddles alone. The augers mounted on the two parallel shafts in overlapping configuration further help with the self-cleaning aspect of the mixer.

Preferably if the flat paddles 125 or helical paddles 127 are employed in the second mixing section 124 they are employed in a paddle portion of the second mixing section 124 and an auger is also employed in the second mixing section 124 before and/or after the paddle section. A combination of augers and a limited number of helical paddles (or less preferably flat paddles) may also be used in the second mixing section 24. Such combination is in fact preferred and recommended for achieving best mixing results for blending of fibers with the cementitious slurry. The use of a limited numbers of helical (or flat) paddles after the augers in the second mixing section 24 causes a resistance to the material flow through the mixer. This resistance to material flow provides for a better mixing and wet-out of fibers with the cementitious slurry in the second mixing section of the mixer.

To summarize, the second mixing section 124 can be configured in one or more ways as highlighted below to facilitate mixing of fibers with the cementitious slurry mixture.

Figure 13A:
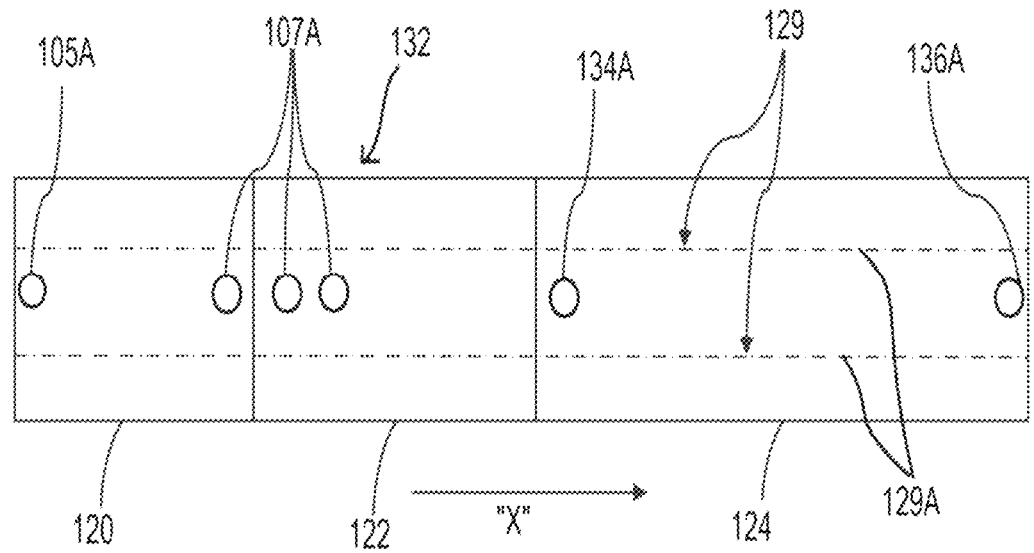
FIG. 13A shows a first configuration of a dual-shaft multi-stage continuous fiber-slurry mixer of the present invention in which the first section has mixing paddles and the second mixing section has only augers on both shafts.

FIG. 13A shows a first configuration of a dual-shaft multi-stage continuous fiber-slurry mixer 132 of the present invention with material flow in the mixer in direction "X". The mixer 132 has a dry powder inlet port 105A, liquid inlet ports 107A, Fiber inlet port 134A, dual mixer shafts 129, and material exit port 136A. Material flow is in direction "X". It has an auger section 120 at the mixer inlet, a first mixing section 122 provided with mixing paddles and a second mixing section 124 with augers 129A on both shafts 129. In the first configuration augers 129A are mounted on both impeller shafts 129 in the first feed section 120, mixing paddles are mounted on both impeller shafts 129 in the first mixing section 122, and augers 129A are only mounted on both impeller shafts 129 in the second mixing section 124. The auger parameters (example, auger pitch, auger length) are selected to maximize material retention and promote a more intimate contact between the fibers and the cementitious slurry in the mixer 132. The total length of the second mixing section and augers ranges from about 1 to 5 feet, more preferably from about 2 to 4 feet. In this and other drawings of the specification like reference numbers in the drawings are intended to identify like elements unless otherwise indicated.

Figure 13B:
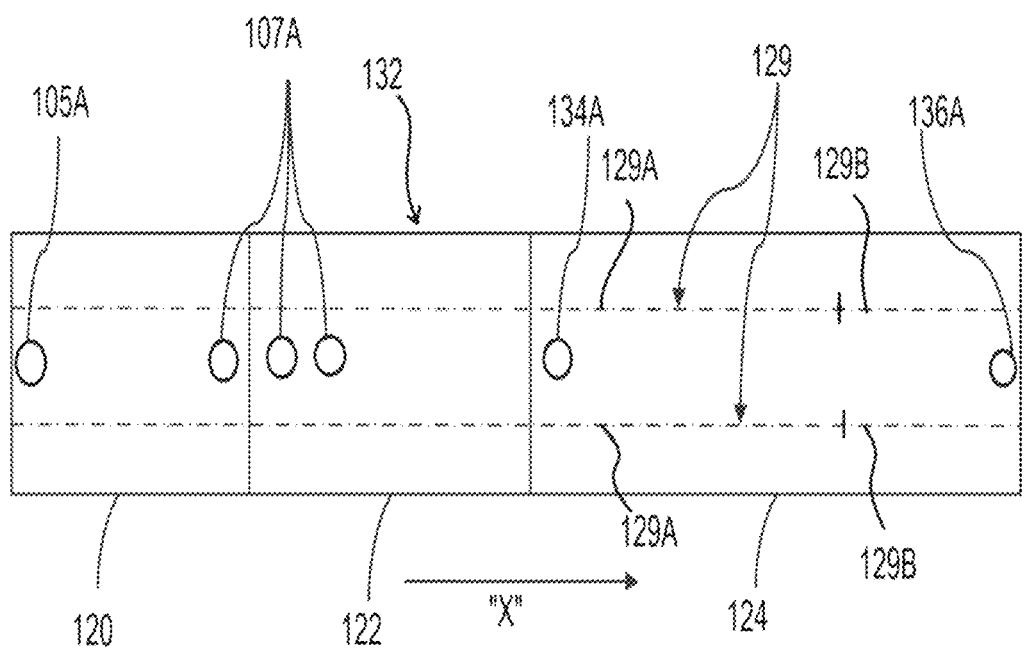
FIG. 13B shows a second configuration of a dual-shaft multi-stage continuous fiber-slurry mixer of the present invention in which the first mixing section has paddles and the second mixing section has augers followed by paddles on both shafts.

FIG. 13B shows a second configuration of a dual-shaft multi-stage continuous fiber-slurry mixer 132 of the present invention with material flow in the mixer in direction "X". It has an auger section 120 at the mixer inlet, a first mixing section 122 provided with mixing paddles and a second mixing section 124 with augers followed by paddles on both shafts 129. Thus, in the second configuration augers 129A are followed by mixing/conveying paddles 129B mounted on both shafts 129 in the second mixing section. Flat paddles 125 and/or helical paddles 127 may be used as mixing/conveying paddles 129B. The use of helical paddles 127 is preferred in the second mixing section. The adjacent flat or helical paddles mounted to a singular shaft in the second mixing section can have the same orientation with respect to each other or alternatively they may be rotated with respect to each other.

When the adjacent paddles on a shaft are rotated with respect to each other, the angle of rotation of the adjacent paddles may range from 0° to 90°, typically 20° to 90°. A greater number of paddles can be used in the second mixing section when the adjacent paddles have a zero degree rotation with respect to each other. Some of the helical paddles 127 used may also be placed in the reverse direction if desired to increase the resistance to material flow and fiber-slurry mixing action taking place in the augers 129A. When flat or helical paddles are used, the number of paddle sets (paddles per shaft) in the second mixing section 124 preferably ranges from 1 to 20, more preferably 1 to 10. The paddle parameters (type, dimensions, orientation, number, and configuration) are selected to minimize the shearing action the material is subjected to in the mixer 132. The paddles can be made of variety of materials including metals, ceramics, plastics, rubber, or a combination thereof. Paddles with softer lining materials are also contemplated for use in the second mixing section as they tend to minimize material and fiber damage. Paddles with a pin and a head or only pins may alternatively be used in the second mixing section after the auger.

The auger parameters (example, auger pitch, auger length) are selected to maximize material retention and promote a more intimate contact between the fibers and the cementitious slurry in the mixer 132. The total length of the second mixing section ranges from about 1 to 5 feet, more preferably from about 2 to 4 feet. Only a small portion of this length is taken up by the paddles 129B and a majority of the second mixing section 24 is covered by the augers 129A.

Figure 13C:
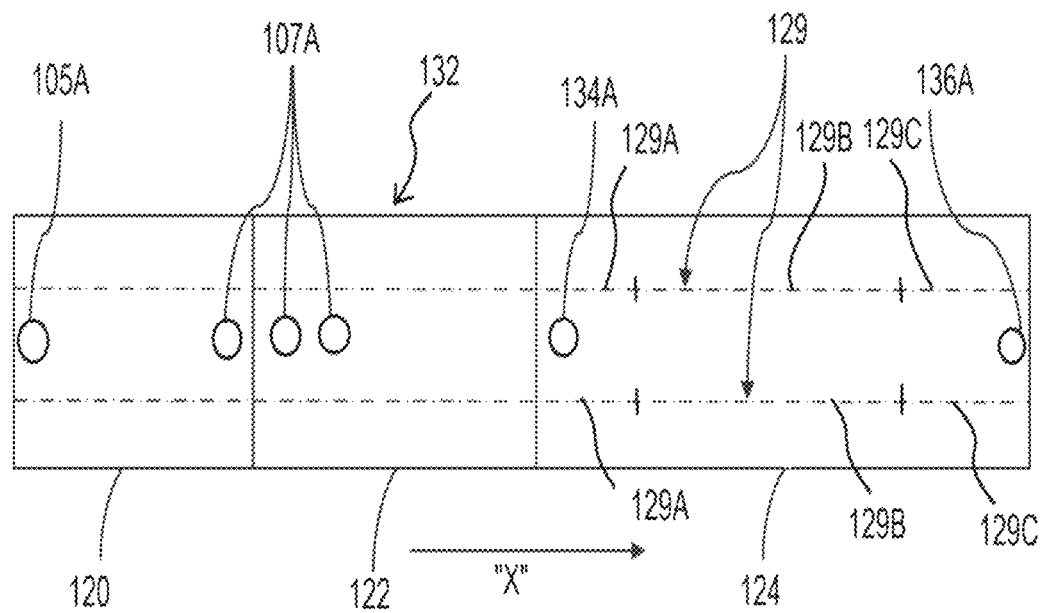
FIG. 13C shows a third configuration of a dual-shaft multi-stage continuous fiber-slurry mixer of the present invention in which the first mixing section has paddles and the second mixing section has an auger followed by paddle/s followed by an auger on both shafts.

FIG. 13C shows a third configuration of a dual-shaft multi-stage continuous fiber-slurry mixer 132 of the present invention with material flow in the mixer in direction "X". It has an auger section 120 at the mixer inlet, a first mixing section 122 provided with mixing paddles and a second mixing section 124 with augers followed by paddles followed by augers on both shafts 129. Thus, the third configuration has augers 129A followed by mixing/conveying paddles 129B followed by augers 129C mounted on both shafts 129 in the second mixing section. Flat paddles 125 and/or helical paddles 127 may be used as mixing/conveying paddles 129B but the use of helical paddles 127 is preferred. Some of the helical paddles 127 used may also be placed in the reverse direction if desired to increase the residence time and improve fiber-slurry mixing in the previous auger section. The adjacent flat or helical paddles mounted to a singular shaft in the second mixing section can have the same orientation with respect to each other or alternatively they may be rotated with respect to each other. When the adjacent paddles on a shaft are rotated with respect to each other, the angle of rotation of the adjacent paddles may range from 0° to 90°, typically 20° to 90°. When flat or helical paddles are used, the number of paddle sets in the second mixing section 124 preferably ranges from 1 to 20, more preferably 1 to 10. A greater number of paddles can be used in the second mixing section when the adjacent paddles have a zero degree rotation with respect to each other. The paddle parameters (type, dimensions, orientation, number, and configuration) are selected to minimize the shearing action the material is subjected to in the mixer 132. Paddles with a pin and a head or only pins may alternatively be used in the second mixing section after the auger. The auger parameters (example, auger pitch, auger length) are selected to maximize material retention and promote a more intimate contact between the fibers and the cementitious slurry in the mixer. The total length of the second mixing section ranges from about 1 to 5 feet, more preferably from about 2 to 4 feet. Only a small portion of this length is taken up by the paddles and a majority of the second mixing section is covered by the augers.

Figure 13D:
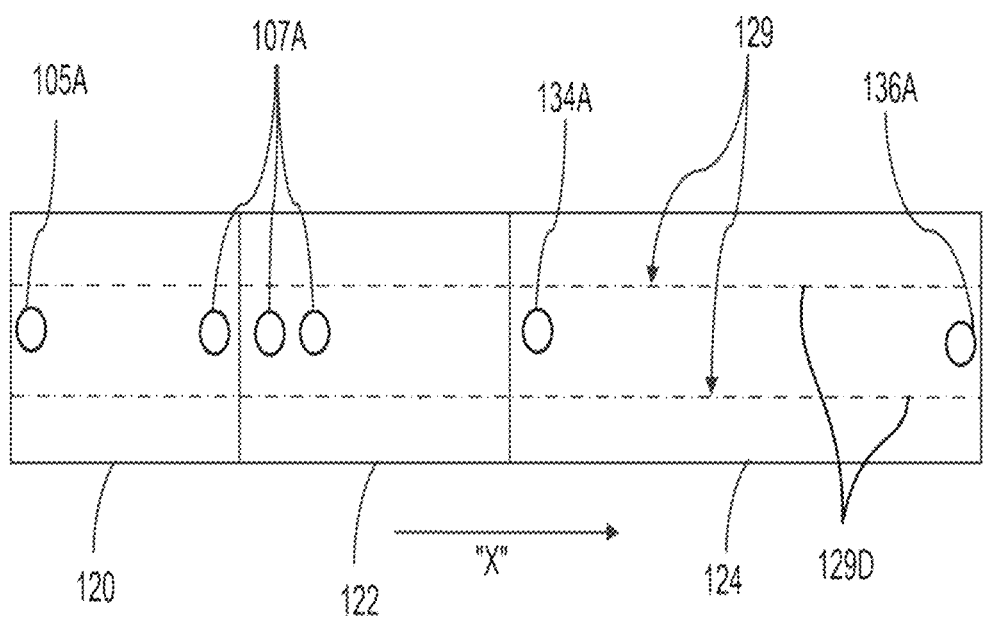
FIG. 13D shows a fourth configuration of a dual-shaft multi-stage continuous fiber-slurry mixer of the present invention in which the first mixing section has paddles and the second mixing section has only paddles or pins on both shafts.

FIG. 13D shows a fourth configuration of a dual-shaft multi-stage continuous fiber-slurry mixer 132 of the present invention with material flow in the mixer in direction "X". It has an auger section 120 at the mixer inlet, a first mixing section 122 provided with mixing paddles and a second mixing section 124 with only paddles 129D on both shafts 129. Thus, the fourth configuration has mixing/conveying paddles 129D only mounted on both shafts in the second mixing section 124 of the mixer 132. The use of flat and helical paddles in the second mixing section is not preferred in this configuration since their use results in very high shear and causes significant fiber damage. Mixing and conveying paddles that cause low mixing shear are preferred when this mixer configuration is utilized in the second mixing section. Use of paddles with a pin and a head or only pins is preferred in the second mixing section of this mixer configuration. However, in this embodiment, it is acceptable to use any type of paddles, for example flat and/or helical paddles, in the first mixing section.

The following described FIGS. 14A-J are side views of various versions of the fiber-slurry mixer.

Figure 14A:
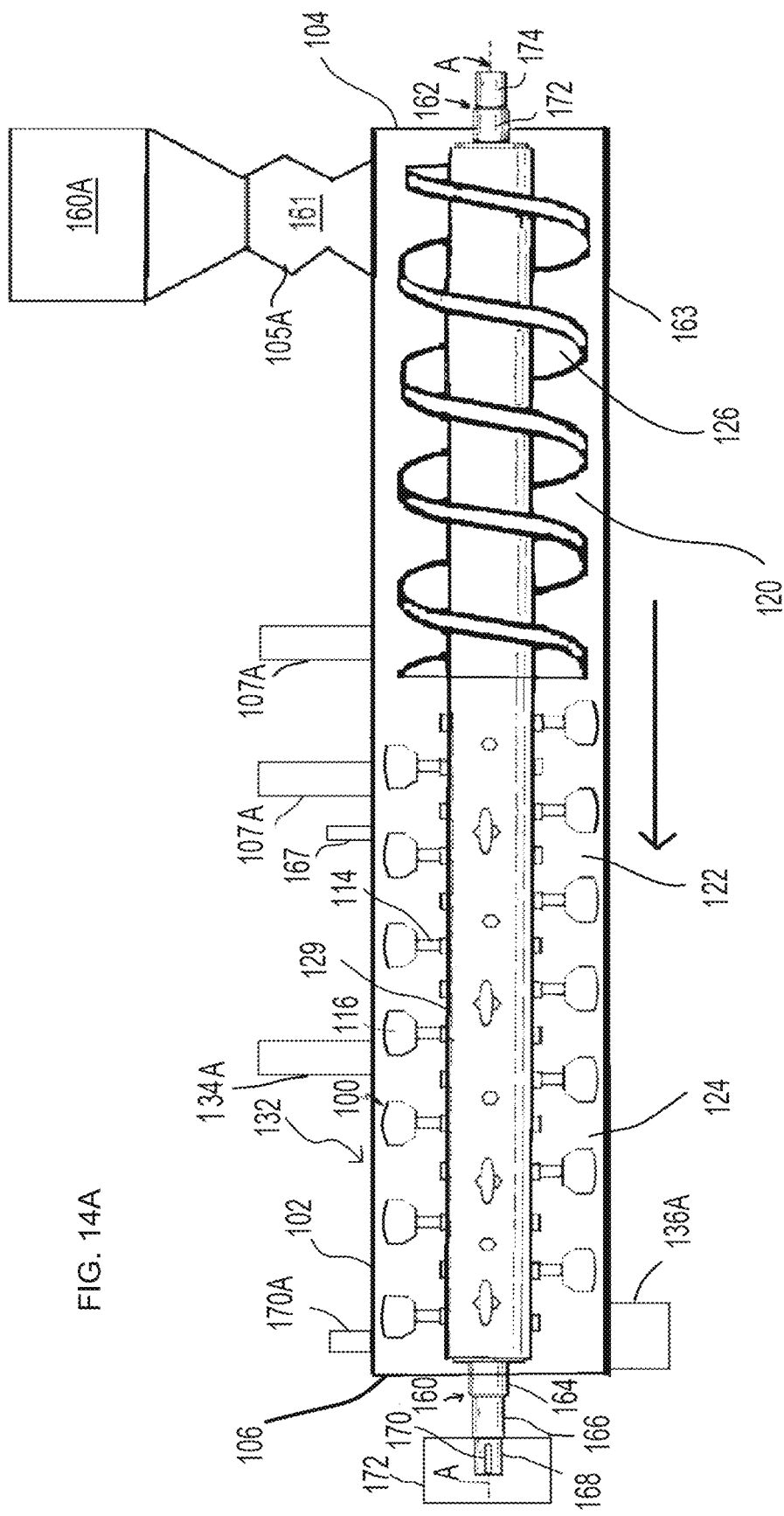
FIG. 14A shows a diagrammatic elevational side view of a configuration (schematically shown in FIG. 13D) of the horizontal dual-shaft (one shaft shown) multi-stage continuous fiber-slurry mixer of the present invention in which the first mixing section has paddles and the second mixing section has only paddles (one shaft shown for clarity).

FIG. 14A shows a drawing of an embodiment of the configuration (schematically shown in FIG. 13D) of the dual shaft (one shaft shown) fiber-slurry mixer 132 using such paddles 100 that cause low mixing shear in both the first mixing zone 122 and the second mixing zone 124. This mixer 132 can be a dual shaft or multi-shaft mixer but only one shaft is shown for clarity. FIG. 14A shows the first feed section 120 having an auger 126, the shaft 129, and paddles 100. The paddles 100 having a pin 114 and a broad paddle head 116 that extends transverse relative to the pin 114.

Paddle 100 for this mixer has the same structure and is employed with the same orientation as in the slurry-fiber mixer of FIG. 3 described above in FIGS. 4 and 5.

FIG. 14A shows a powder mixture of, for example, Portland cement, gypsum, aggregate, fillers, etc. is fed from the dry powder feeder which is typically an overhead hopper bin 160 through a dry powder conduit 105A, which is a bellows 161, to an elongated horizontal mixing chamber 163 of mixer 132. The impeller shaft 129 is driven by a side mounted impeller motor 172 that is regulated by a speed controller (not shown). The powder mixture solids may be fed from the hopper bin 160A to the auger screw 163 by a volumetric feeder or a gravimetric feeder (not shown).

Volumetric feeding systems would use an auger screw conveyor (not shown) running at a constant speed to discharge powder from the storage hopper bin 160A at a constant rate (volume per unit time, e.g., cubic feet per minute. Gravimetric feeding systems generally use a volumetric feeder associated with a weighing system to control the discharge of powder from the storage hopper bin 160 at a constant weight per unit of time, e.g., pounds per minute. The weight signal is used via a feedback control system to constantly monitor the actual feed rate and compensate for variations in bulk density, porosity, etc. by adjusting the speed (RPM) of the auger screw of the auger screw feeder. Such volumetric feeding systems can also be used for any other embodiments of the mixer 132.

Aqueous medium, such as water, from a liquid pump (not shown) feeds the horizontal chamber 163 through a nozzle of at least one aqueous medium stream conduit 107A.

FIG. 14A shows the elongated horizontal mixing chamber 163 comprises cylindrical horizontal sidewalls 102, a first end wall 104, and a second end wall 106. Material flow is in a direction X from the first end wall 104 to the second end wall 106. Shaft 129 extends from first end wall 104 to second end wall 106. The horizontal fiber-cementitious slurry mixer 132 also comprises at least one rotatable shaft 129 (preferably two rotatable shafts, wherein the second shaft is not shown for clarity), a aqueous liquid medium conduit 107A for feeding liquid comprising water into the chamber 163, a reinforcement fiber conduit 134A for feeding reinforcement fiber into the chamber 163, and a fiber-slurry mixture discharge outlet 136A for discharging fiber-slurry mixture. Mixing and conveying paddles 100 extend from the central rotatable shaft 129. The horizontal fiber-cementitious slurry mixer 132 also comprises other inlet ports 167, one shown, to feed other raw materials and performance enhancing additives into the mixer 132. The horizontal fiber-cementitious slurry mixer 132 also comprises a venting port 170A to remove any air introduced into the mixing chamber 163 from raw material feed. The horizontal fiber-cementitious slurry mixer 132 also comprises an electrical motor and drive mechanism 172 to drive the central shaft 129 in the mixing chamber 163.

The rotatable shaft 129 rotates about its longitudinal axis "A" to mix the fed ingredients and convey them as fiber-slurry mixture to the discharge outlet 168. The rotatable shaft has an auger in the chamber first feed portion 120, and paddles 100 in both the first mixing section 122 and the second mixing section 124.

The reinforcement fibers and cementitious slurry and other ingredients will be feed to the mixer 132 at respective rates to leave an open space in the mixer above resulting mixture to facilitate mixing and conveying. If desired, a liquid level control sensor is used to measure the level of the slurry in the horizontal chamber of the mixer.

The rotatable shaft 129 may include a first end assembly 160 and a second end assembly 162. First end assembly 160 and second end assembly 162 may take any of a wide variety of forms known to one of skill in the art. For example, first end assembly 160 may include a first end engagement portion that operatively engages a first end of the rotatable shaft 129, a first cylindrical proportion 164 extending from the first end engagement portion, an intermediate cylindrical portion 166 extending from the first cylindrical portion 164, and an end cylindrical portion 168, extending from the intermediate cylindrical portion 166 and including a slot 170. The second end assembly 162 may include a second end engagement portion that operatively engages a second end of the rotatable shaft 29, a first cylindrical portion 172 extending from the second end engagement portion, and an end cylindrical portion 174 extending from the first cylindrical portion. In at least one embodiment, first end engagement portion of first end assembly 160 may be engaged to the rotatable shaft 129 proximate to first cylindrical proportion 164. In one or more embodiments, end cylindrical portion 168 may be operatively engaged to a motor 172 or engine capable of imparting rotation (e.g., high-speed rotation) to rotatable shaft 129 and the one or more paddle assemblies 100 engaged therewith to mix the reinforcement fibers and cementitious slurry. In at least one embodiment, second end engagement portion of second end assembly 162 may be engaged to a second end (e.g., an end opposing the first end) of rotatable shaft 129 proximate to first cylindrical portion 172. In one or more embodiments, end cylindrical portion 174 of second end assembly 162 may be preferably engaged to a bearing assembly, which may be integral to an exterior wall of the horizontal fiber-cementitious slurry mixer 132, to permit the rotation of rotatable shaft 129.

As seen in FIG. 14A, a plurality of paddle assemblies 100 may be permanently and/or removably engaged (e.g., affixed, adhered, connected, etc.) to rotatable shaft 129 and configured into, for example, aligned rows and/or columns (e.g., rows along the length of the rotatable shaft 129, columns around the circumference of the rotatable shaft 129. In one or more embodiments, paddle assemblies 100 may be permanently or releasably engaged to rotatable shaft 129 in offset rows or columns as desired. In addition, rotating shaft 129 may accommodate any arrangement or configuration of paddle assemblies 100 as desired, preferably but not limited to spiral and/or helical configurations.

The rotatable shaft 129, in one or more embodiments, may be constructed to rotate at a predetermined rate 30 to 450 RPM, more preferably 40 to 300 RPM, and most preferably 50 to 250 RPM during mixing Paddle pin 114 has a width W1 which is less than a width W2 of paddle head 116 (See FIG. 4). Pin 114 of mixing and conveying paddle 100 may include a threaded end portion 115 (See FIG. 4) adapted for engagement into a threaded opening of the rotatable shaft 129, such that mixing and conveying paddle 100 may be rotated to achieve a desired or selected pitch (e.g., angle) relative to the rotatable shaft 129. In one or more embodiments, each mixing and conveying paddle 100 may be rotated a desired distance into the rotatable shaft 129, wherein the distance may be the same or different from one or more other paddle assemblies or sections of paddle assembles as engaged to the rotatable shaft 129. The paddles may be attached to the central shaft using different means including threaded attachment (as shown) and/or welding attachment (not shown). They may be oriented at angle B of FIG. 5 in the range of angle B described above.

Figure 14B:
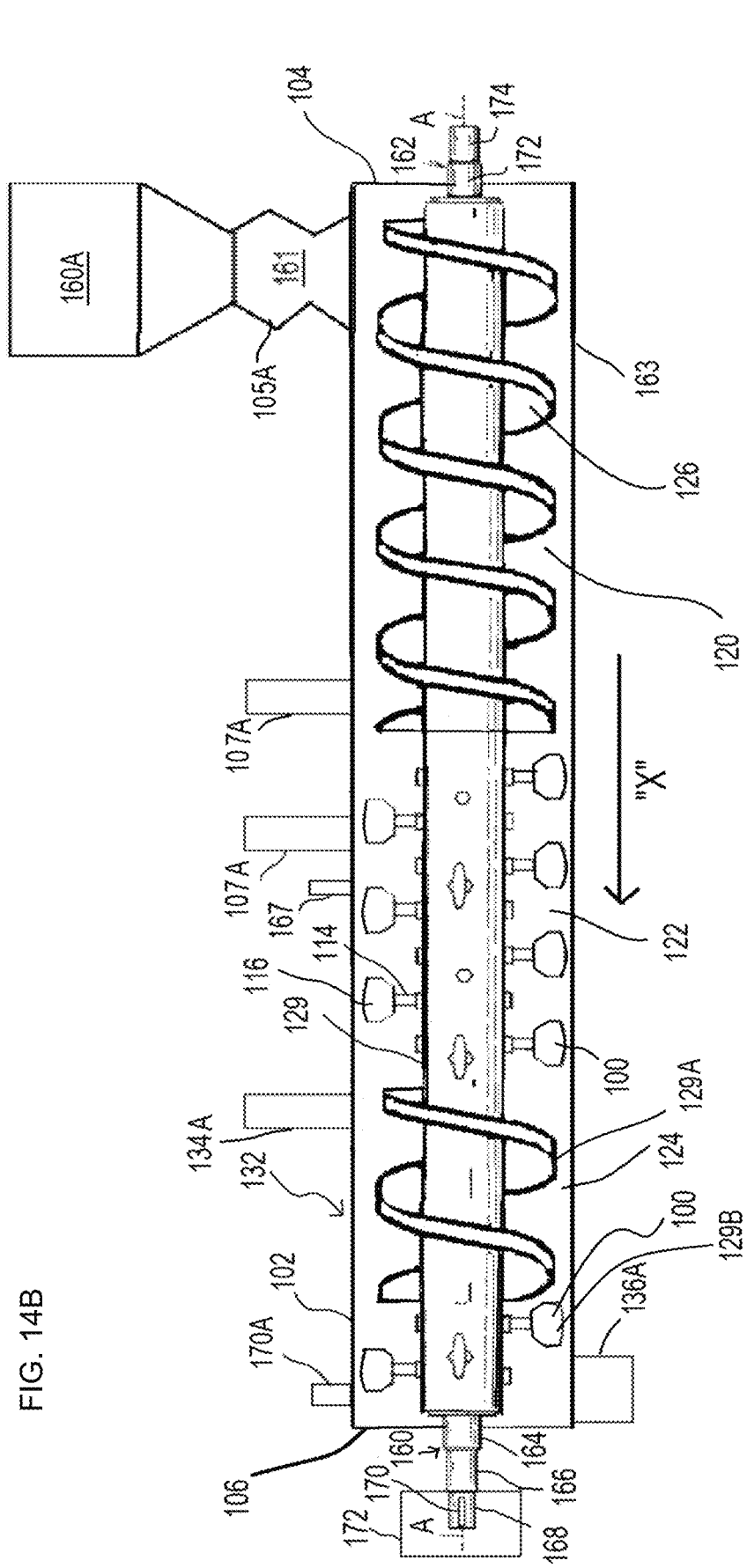
FIG. 14B shows a configuration (schematically shown in FIG. 13B) of a dual-shaft (one shaft shown) multi-stage continuous fiber-slurry mixer in which the first mixing section has paddles and the second mixing section has augers followed by paddles on both shafts.

FIG. 14B shows a configuration (schematically shown in FIG. 13B) of a dual-shaft (one shaft shown) multi-stage continuous fiber-slurry mixer 132 in which the first mixing section 122 has paddles 100 and the second mixing section 124 has augers 129A followed by paddles 129B, such as above-described paddles 100 on both shafts 129.

Figure 14C:
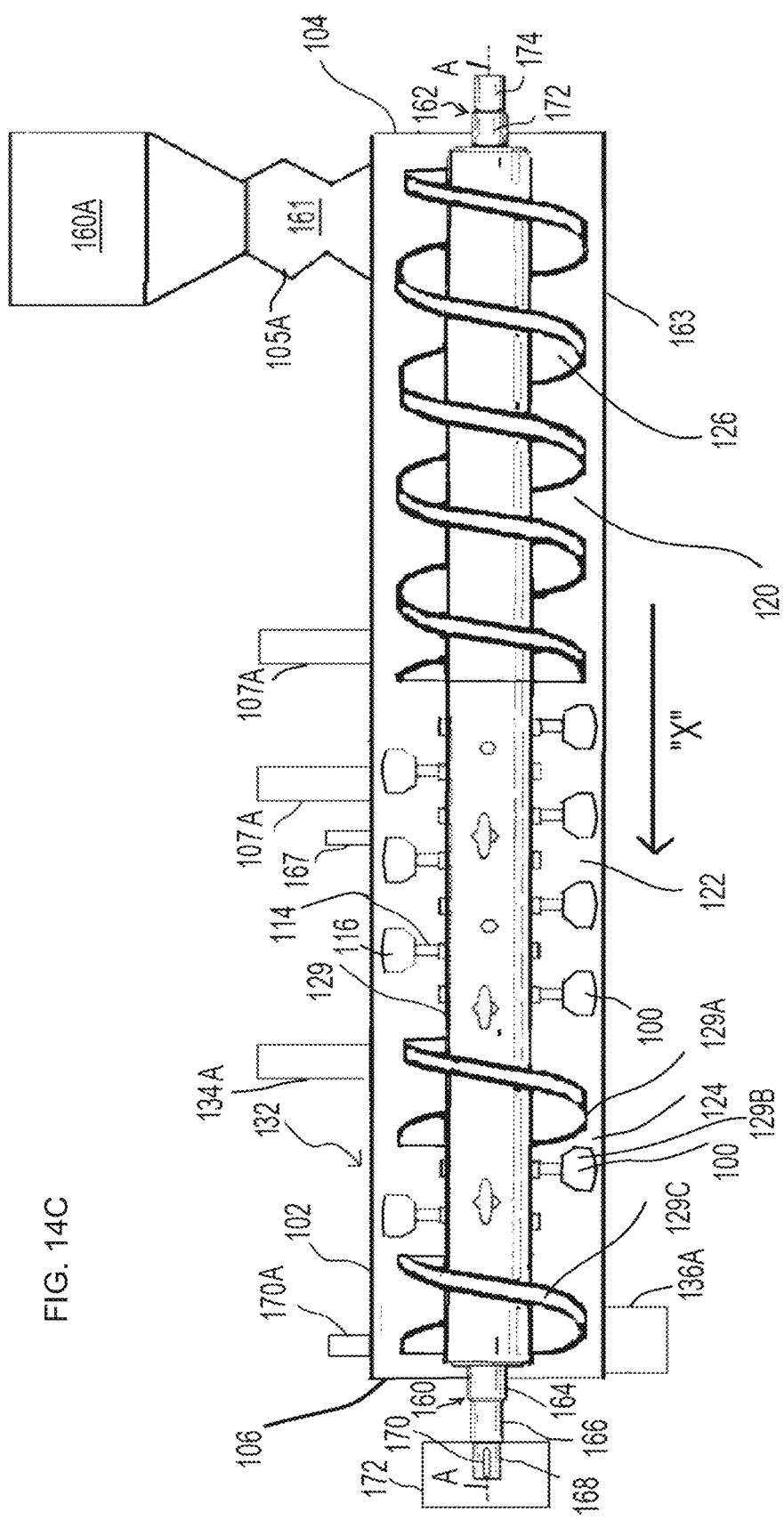
FIG. 14C shows a configuration (schematically shown in FIG. 13C) of a dual-shaft (one shaft shown) multi-stage continuous fiber-slurry mixer in which the first mixing section has paddles and the second mixing section has an auger followed by paddle/s followed by an auger on both shafts.

FIG. 14C shows a configuration (schematically shown in FIG. 13C) of a dual-shaft (one shaft shown) multi-stage continuous fiber-slurry mixer 132 in which the first mixing section 122 has paddles 100 and the second mixing section 124 has an auger 129A followed by paddles 129B, such as above-described paddles 100 followed by an auger 124C on both shafts 129.

Figure 14D:
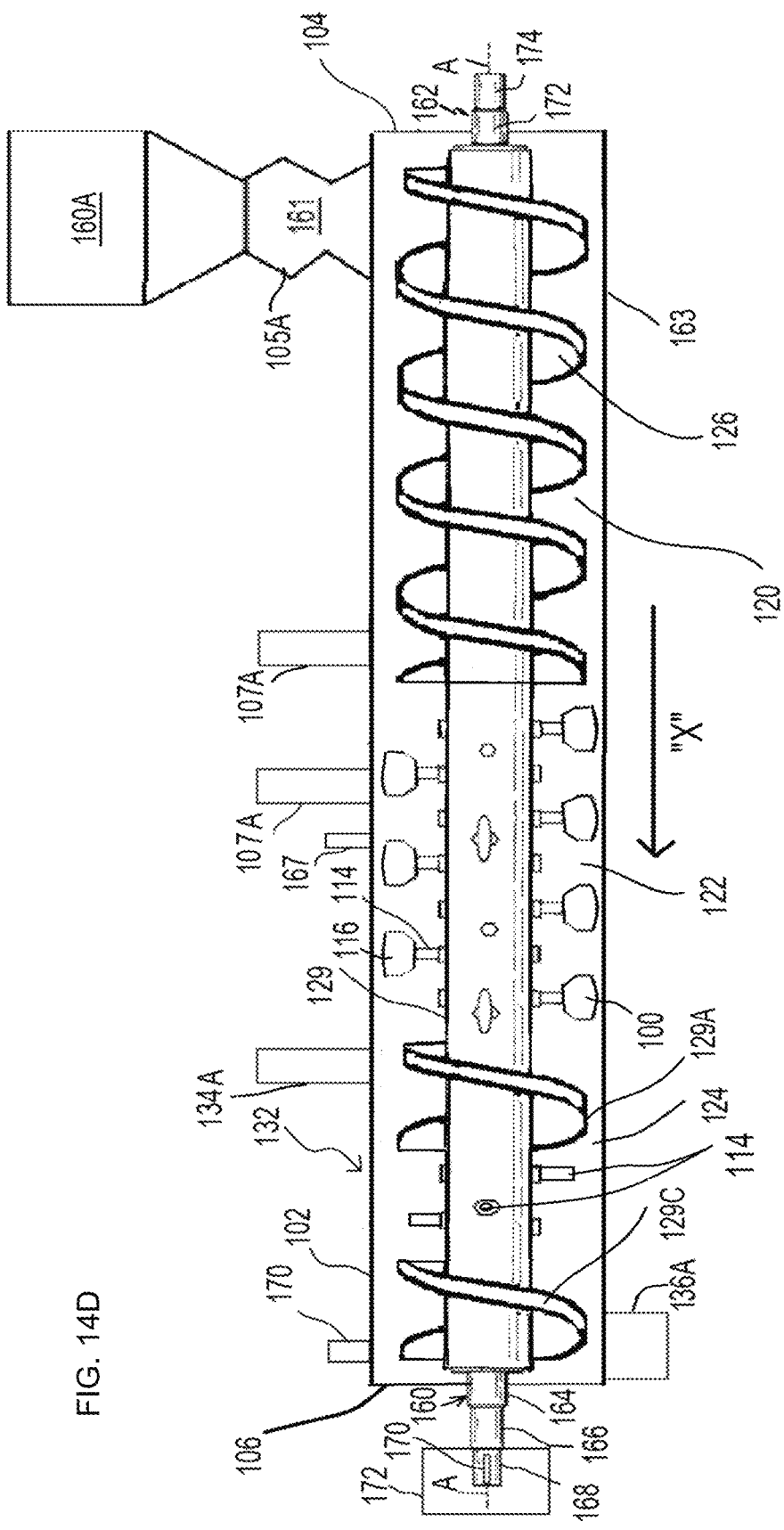
FIG. 14D shows a configuration (schematically shown in FIG. 13C) of a dual-shaft (one shaft shown) multi-stage continuous fiber-slurry mixer in which the first mixing section has paddles and the second mixing section has an auger followed by pin/s followed by an auger on both shafts.

FIG. 14D shows a configuration (which is also schematically shown in FIG. 13C) of a dual-shaft (one shaft shown) multi-stage continuous fiber-slurry mixer 132 in which the first mixing section 122 has paddles 100 and the second mixing section 124 has the auger 129A followed by pin/s 114 followed by the auger 129C on both shafts 129.

Figure 14E:
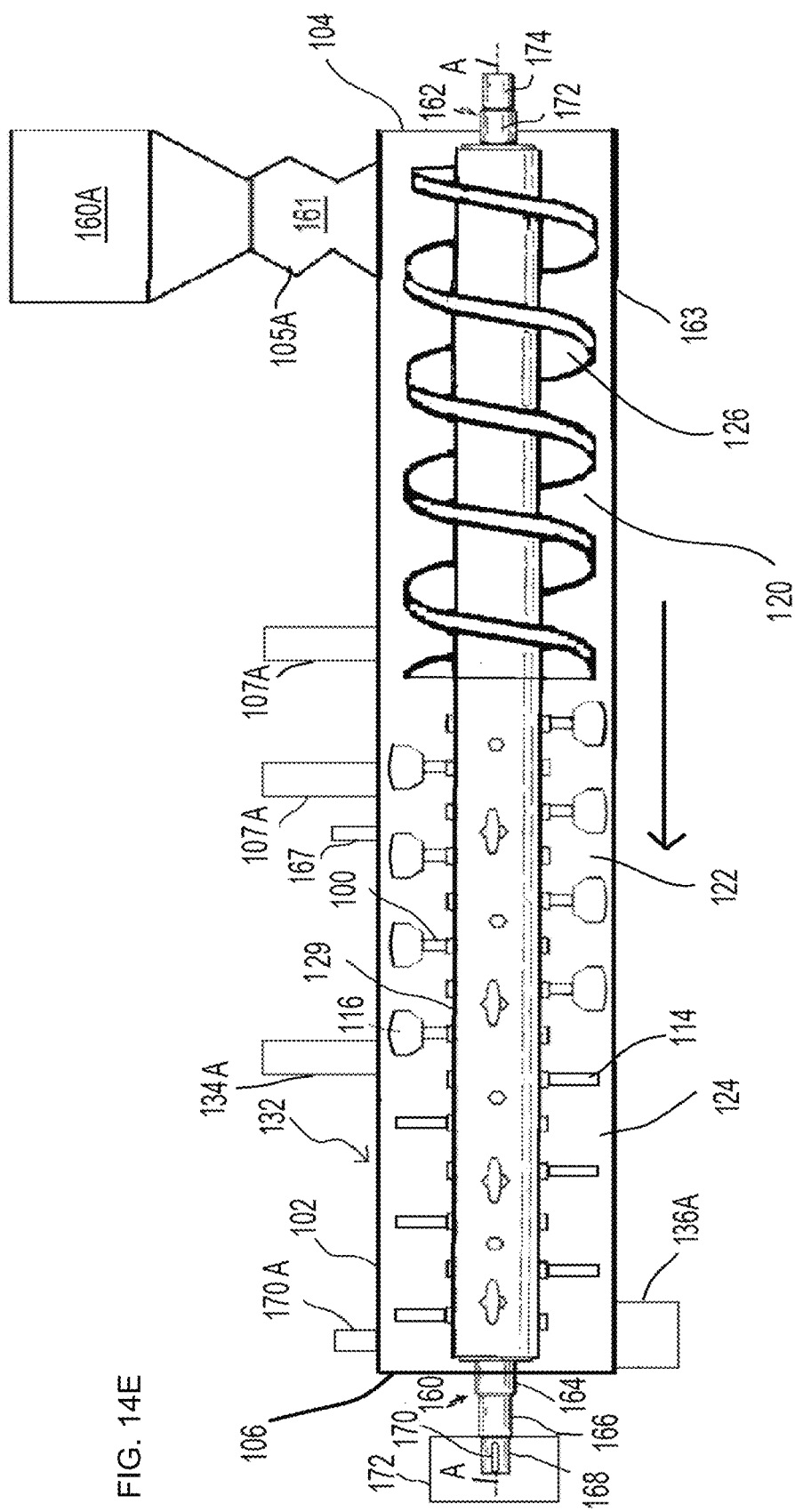
FIG. 14E shows a configuration (schematically shown in FIG. 13D) of a dual-shaft (one shaft shown) multi-stage continuous fiber-slurry mixer of the present invention in which the first mixing section has paddles and the second mixing section has only pins on both shafts.

FIG. 14E shows a configuration (schematically shown in FIG. 13D) of the horizontal dual-shaft (one shaft shown) multi-stage continuous fiber-slurry mixer 132 in which the first mixing section 122 has paddles 100 and second mixing section 124 has only pins 114 on both shafts 129.

Figure 14F:
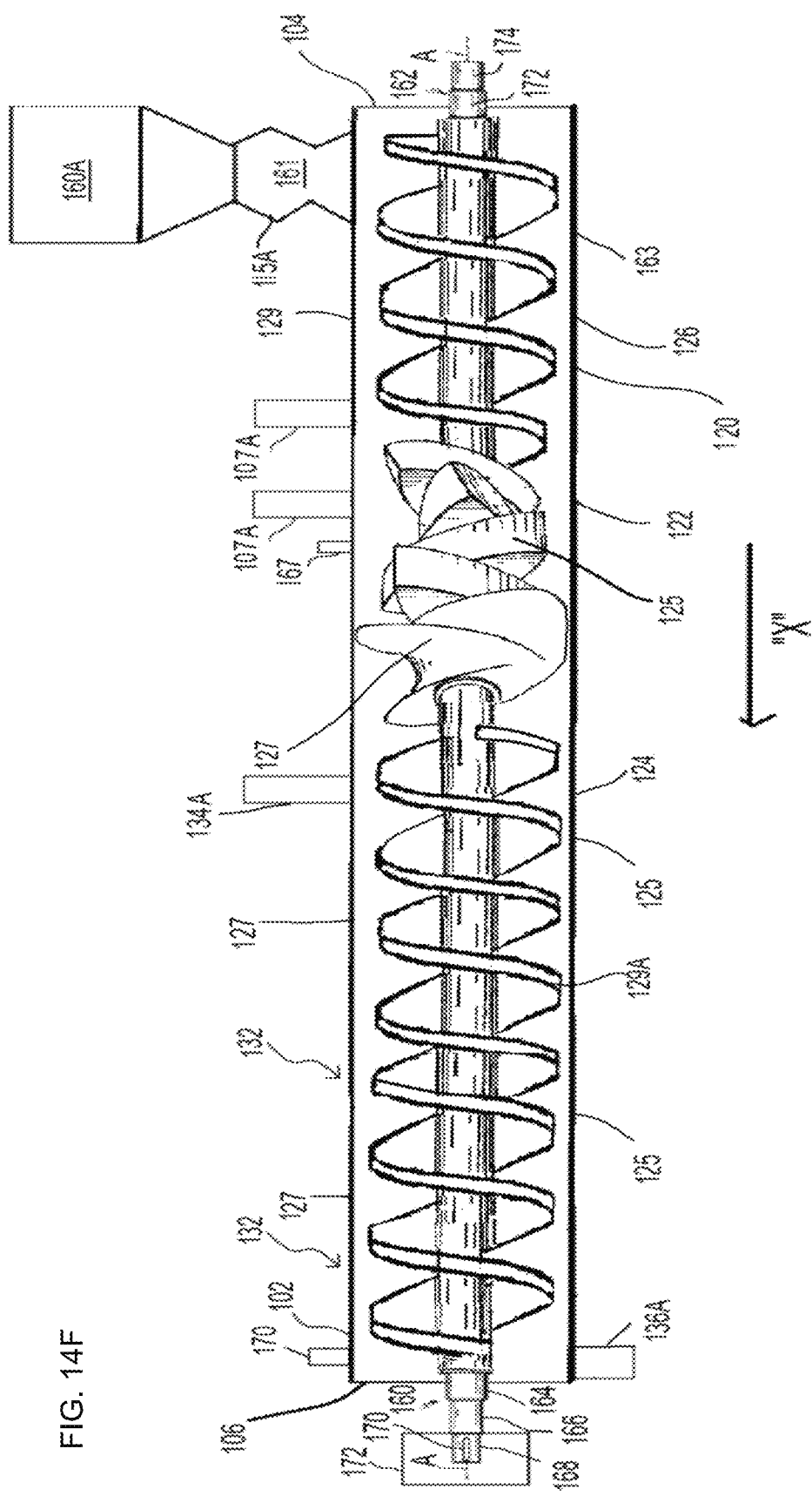
FIG. 14F shows a configuration (schematically shown in FIG. 13A) of a dual-shaft (one shaft shown) multi-stage continuous fiber-slurry mixer of the present invention in which the first mixing section has paddles and the second mixing section has augers on both shafts, wherein the paddles are flat paddles or helical paddles.

FIG. 14F shows a configuration (schematically shown in FIG. 13A) having a dual-shaft multi-stage continuous fiber-slurry mixer 132 of the present invention in which the first mixing section 122 has paddles and the second mixing section 124 has augers 129A on both shafts), wherein the paddles are flat paddles 125 or helical paddles 127.

Figure 14G:
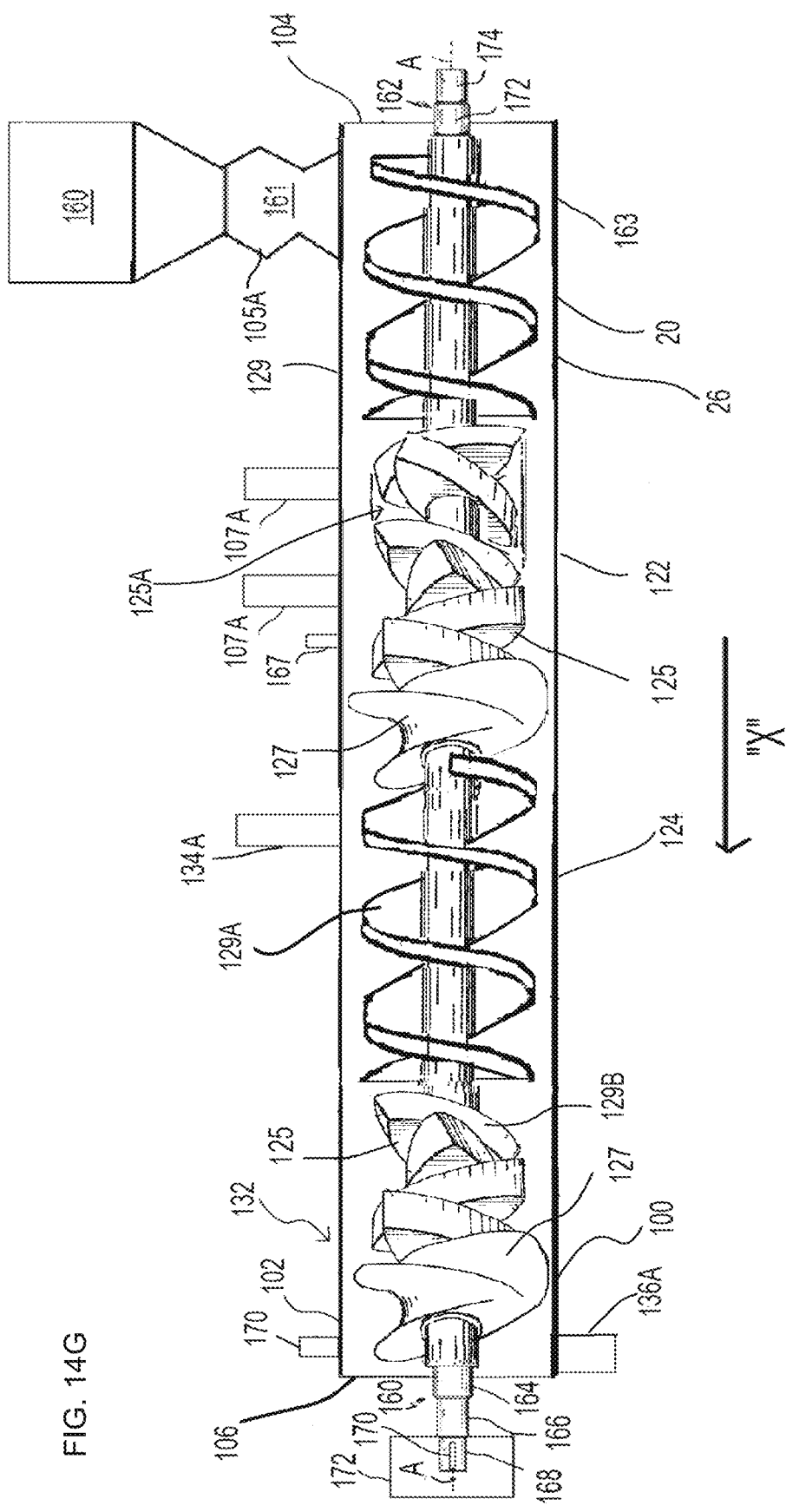
FIG. 14G shows a configuration (schematically shown in FIG. 13B) having a dual-shaft (one shaft shown) multi-stage continuous fiber-slurry mixer of the present invention in which the first mixing section has paddles and the second mixing section has augers followed by paddles on both shafts, wherein the paddles are flat paddles or helical paddles. The empty space where the shaft is visible is intended to convey presence of paddles.

FIG. 14G shows a configuration (schematically shown in FIG. 13B) having a dual-shaft (one shaft shown) multi-stage continuous fiber-slurry mixer of the present invention in which the first mixing section 122 has paddles and the second mixing section 124 has augers 129A followed by paddles 129B on both shafts (one shaft shown for clarity), wherein the paddles are flat paddles 125 or helical paddles 127. The empty space 125A between paddles where the shaft 129 is visible is intended to convey presence of flat paddles 125 and/or helical paddles 127.

Figure 14H:
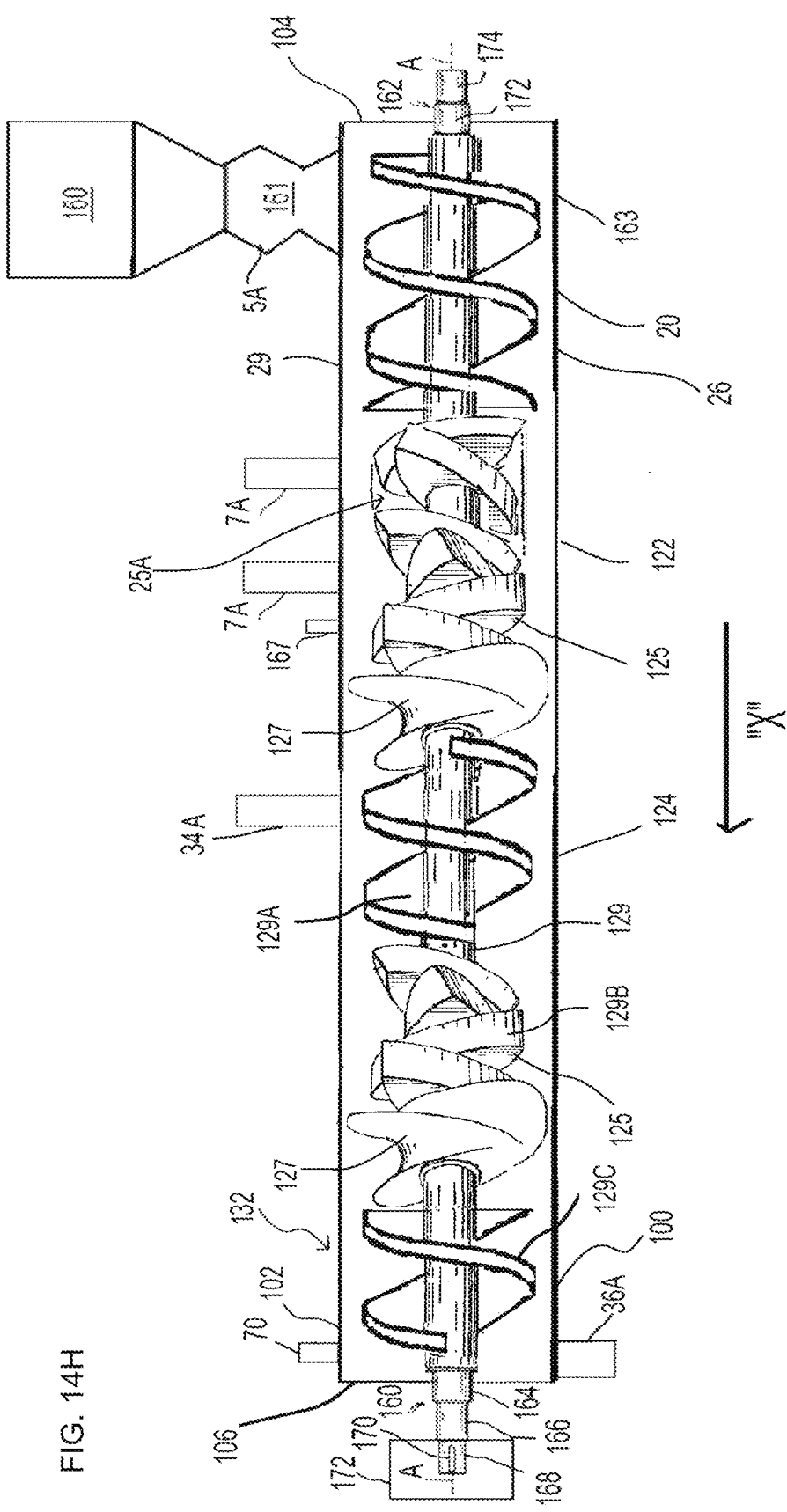
FIG. 14H shows a diagrammatic elevational side view of the configuration (schematically shown in FIG. 13C) having a dual-shaft (one shaft shown) multi-stage continuous fiber-slurry mixer of the present invention in which the first mixing section has flat paddle/s and/or helical paddle/s and the second mixing section has an auger followed by flat paddle/s and/or helical paddle/s followed by an auger on both shafts, wherein the paddles are flat paddles and/or helical paddles; the empty space between paddles where the shaft is visible is intended to convey presence of paddles.

FIG. 14H shows a configuration (schematically shown in FIG. 13C) having a dual-shaft (one shaft shown) multi-stage continuous fiber-slurry mixer 132 of the present invention in which the first mixing section 122 has flat paddles 125 and/or helical paddle/s 127 and the second mixing section 124 has an auger 129A followed by paddles 129B, namely flat paddles 125 and/or helical paddle/s 127 followed by an auger 129C on both shafts 129 (one shown), wherein the paddles 129B are flat paddles 125 and/or helical paddles 127. The empty space 125A between paddles where the shaft 129 is visible is intended to convey presence of flat paddles 125 and/or helical paddles 127.

Figure 14I:
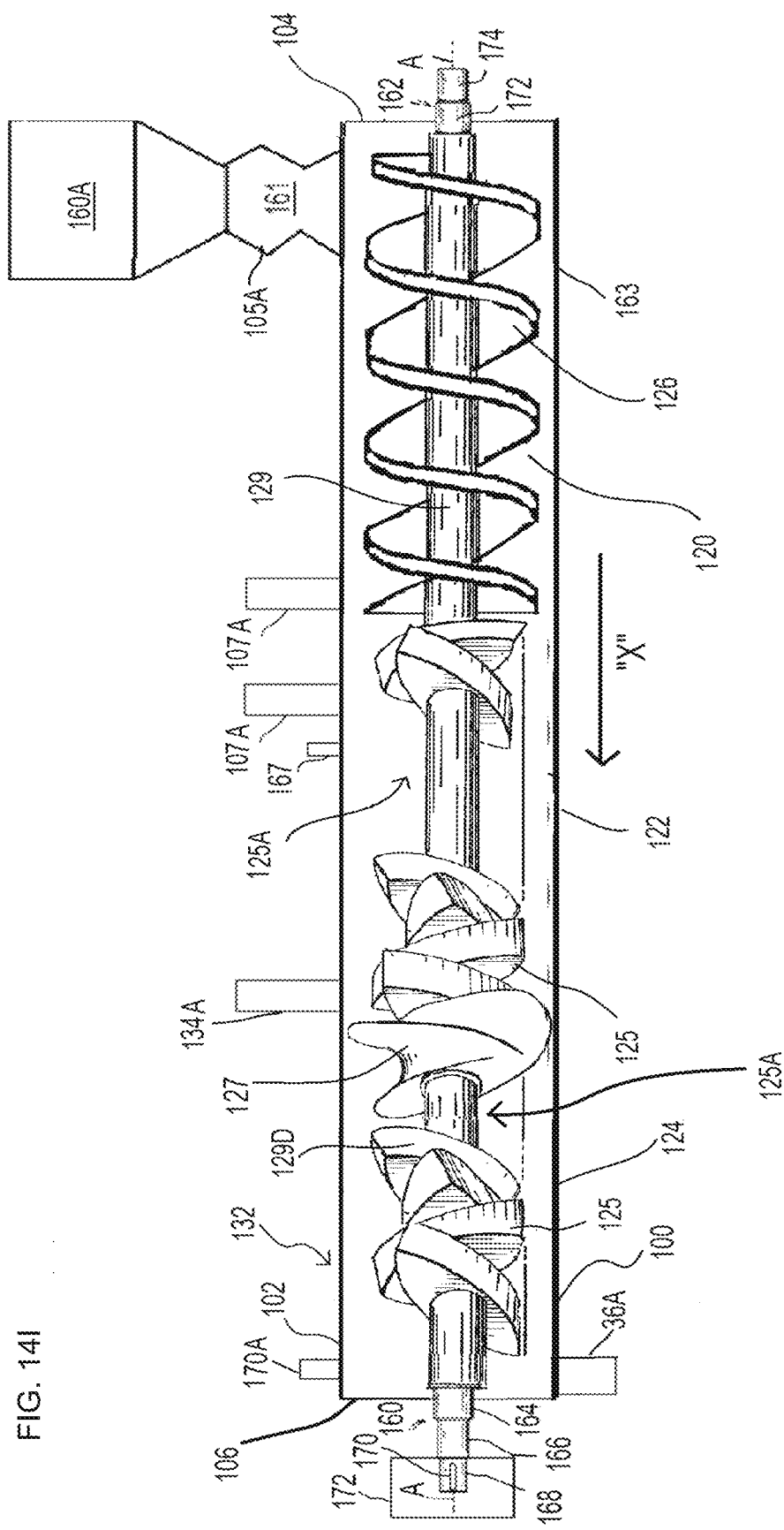
FIG. 14I shows a configuration (schematically shown in FIG. 13D) having a dual-shaft multi-stage continuous fiber-slurry mixer of the present invention in which the first mixing section has paddles and the second mixing section has paddles on both shafts (one shaft shown for clarity), wherein the paddles are flat paddles or helical paddles; the empty space between paddles where the shaft is visible is intended to convey presence of paddles.

FIG. 14I shows a configuration (schematically shown in FIG. 13D) having a dual-shaft (one shaft shown) multi-stage continuous fiber-slurry mixer 132 of the present invention in which the first mixing section 122 has paddles and the second mixing section 124 has paddles 129D on both shafts 129, wherein the paddles 129D are flat paddles 125 or helical paddles 127. The empty space 125A between paddles where the shaft 129 is visible is intended to convey presence of paddles 125 and/or helical paddles 127.

The FIG. 14I configuration has a dual-shaft multi-stage continuous fiber-slurry mixer of the present invention in which the first mixing section 122 has paddles and the second mixing section 124 has paddles on both shafts 129. It can have one type of paddles in the first mixing section 122 and can have a different type of paddles in the second mixing section 124.

Figure 14J:
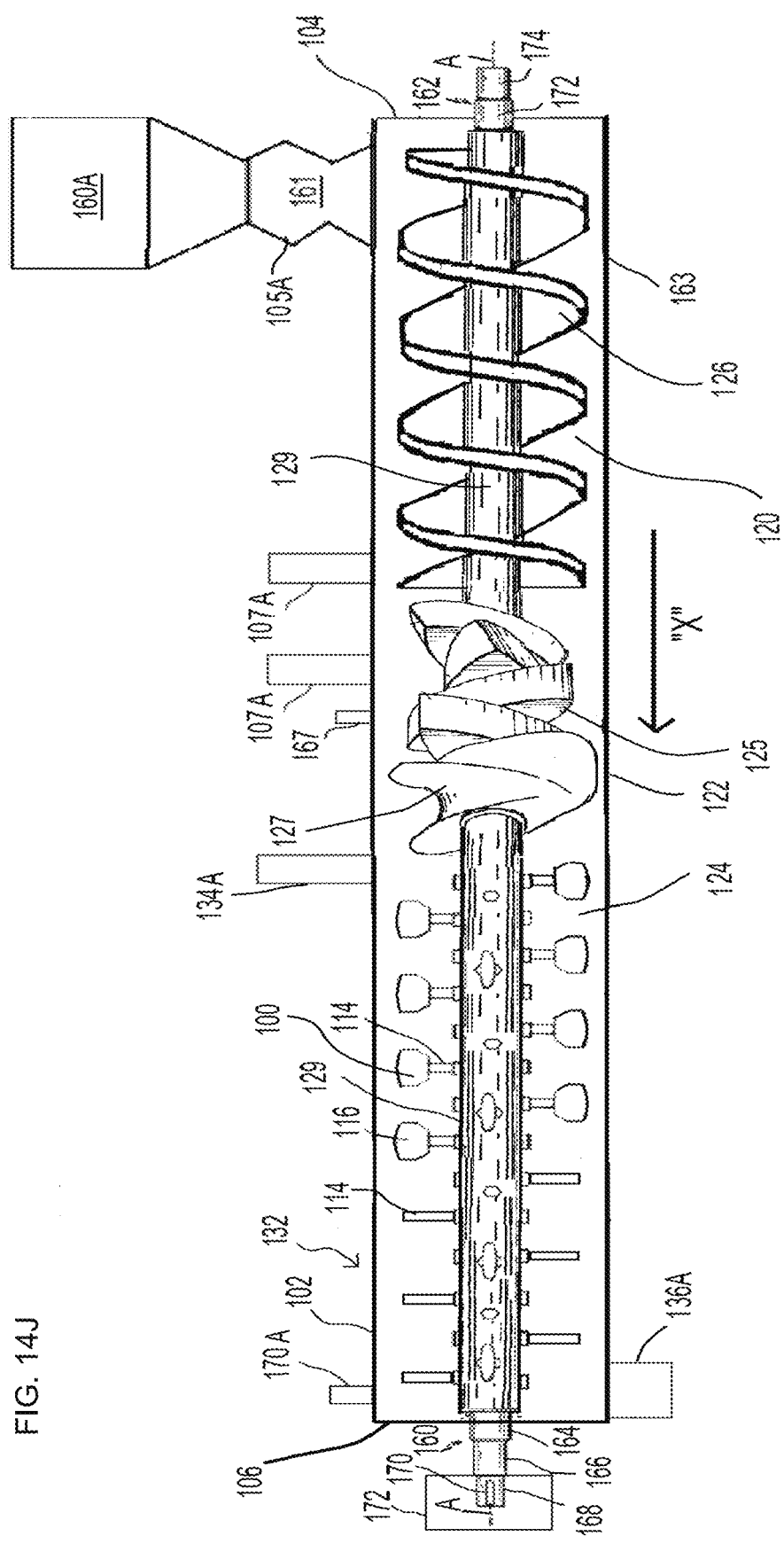
FIG. 14J shows a diagrammatic elevational side view of a variation of the configuration (schematically shown in FIG. 13D) having a dual-shaft multi-stage continuous fiber-slurry mixer of the present invention in which the first mixing section can have one type of paddles and the second mixing section can have a different type of paddles, in particular

FIG. 14J shows a diagrammatic elevational side view of a preferred arrangement in this configuration (schematically shown in FIG. 13D) having flat paddles 125 and/or helical 127 paddles in the first mixing section 122 and having pins 114 and paddles 100 with a pin 114 and a head 116 in the second mixing section 124. If desired, although not shown, the second mixing section could entirely have pins 114. Most preferably the paddles in the first mixing section 122 are flat or helical, and the paddles in the second mixing section 124 comprise pins and/or paddles with a pin and a head.

In the mixer configurations of the invention employing flat and/or helical paddles in the second mixing section, for example in the mixers of FIGS. 14F, 14G, 14H, 14I, and 14J, the flat paddles 125 and/or helical paddles 127 are on the shaft 129; and all adjacent flat and/or helical paddles on the shaft 129 in the second mixing section 124 have a 0 to 90 degree rotation with respect to each other.

If desired the flat and/or helical paddles are on the shaft in the second mixing section and all adjacent flat and/or helical paddles on the shaft in the second mixing section have a zero degree rotation with respect to each other.

If desired the flat and/or helical paddles are on the shaft in the second mixing section and all adjacent flat and/or helical paddles on the shaft in the second mixing section have a 30 degree rotation with respect to each other.

If desired the flat and/or helical paddles are on the shaft in the second mixing section and all adjacent flat and/or helical paddles on the shaft in the second mixing section have a 45 degree rotation with respect to each other.

If desired the flat and/or helical paddles are on the shaft in the second mixing section and all adjacent flat and/or helical paddles on the shaft in the second mixing section have a 60 degree rotation with respect to each other.

If desired the flat and/or helical paddles are on the shaft in the second mixing section and all adjacent flat and/or helical paddles on the shaft in the second mixing section have a 90 degree rotation with respect to each other.

The above mentioned features and parameters of the fiber-slurry continuous mixer of this invention are further described as follows. This applies not only to the embodiments of the drawings but the invention in general unless otherwise indicated.

Elongated Mixing Chamber

The elongated mixing chamber is typically cylindrical in shape. The length of the mixing chamber typically ranges anywhere from about 2 to 8 feet. The preferred length of the mixing chamber is from about 3 to 5 feet. The diameter of the mixing chamber typically ranges anywhere from about 4 to 24 inches. The preferred diameter of the mixing chamber ranges from about 6 to 12 inches.

Rotating Shafts

The diameter of the dual or multi-rotating shafts is typically from about 1 to 4 inches. The preferred diameter of the central shafts ranges from about 1 to 3 inches.

The central rotating shafts rotate at a speed, preferably ranging from about 30 to 450 RPM, more preferably 40 to 300 RPM, and most preferably 50 to 250 RPM. It has been discovered that relatively lower mixer speeds are preferable to meet the objectives of the present invention. It has been surprisingly found that excellent fiber dispersion in the cementitious slurry mixture can be obtained even at relatively low mixer speeds. Furthermore, another important benefit of using lower mixing speeds is that it results in reduced fiber breakage and superior material working and flow properties useful in further processing of the fiber reinforced cementitious slurry mixture.

A variable frequency drive is preferably used with the mixer for turning the central rotating shaft when the mixer is in the operational mode. The variable frequency drive is helpful for adjusting and fine-tuning the mixer speed for a given combination of raw materials involved in the production process.

The continuous mixers of the present invention can either be a single-shaft mixer, a dual-shaft mixer, or a multi-shaft mixer. This disclosure describes the single-shaft mixers of the present invention in greater detail. However, it is contemplated that dual-shaft or multiple-shaft mixers in accordance to the present invention can also be beneficially employed for producing fiber reinforced cementitious slurry mixtures possessing desirable properties that are useful in a variety of applications including continuous production processes.

Mixing Paddles

The mixing paddles mounted on the central shaft can have different shapes and dimensions to facilitate mixing and conveying of the added components in the mixer.

As explained above the invention may employ flat paddles and helical paddles.

The mixing paddles suitable for use in the present invention also include paddles with a pin and a relatively wider head to help move the material forward, for example paddle 100. In addition to the paddles having one type of pin and head, the fiber-slurry mixer may include more than one type of paddle having a pin and a relatively wider head, or just pins, to achieve desirable characteristics required for further processing of the material. However, as seen in FIG. 14B the invention may employ a single style paddle in both the first mixing section 122 and second mixing section 124. However, use of flat or helical paddles is most preferred in the first mixing section of the fourth mixer configuration which has paddles in both the first mixing section 122 and the second mixing section 124. Further, use of paddles 100 with a pin 114 and a head 116 or only pins 114 is most preferred in the second mixing section 124 of the fourth mixer configuration. The use of the same type of paddles in both mixing sections is allowed in the fourth mixer configuration but is not preferred.

The overall dimensions of the paddles are such that the clearance (space) between the inner circumference of the mixer chamber and the paddle's furthermost point from the central shaft is preferably less than ¼", more preferably less than ⅛", and most preferably less than 1/16". Too great a distance between the paddle tips and the inner walls of the chamber would result in slurry build-up. Pins 114 can be substituted for at least some of the paddles 100. For example, the pins may be the pins 114 of the paddles 100 without the broad paddle head 116.

The quality of mixing and conveying of the components in the mixer is also dictated by the orientation of the paddles in the mixer. A parallel or perpendicular paddle orientation with respect to the cross-section of the central shaft diminishes the conveying action of the paddles thus increasing the residence time of the material in the mixer. An increased residence time of the material in the mixer can lead to significant fiber damage and production of fiber reinforced cementitious slurry mixture having undesirable characteristics. When employing paddles having pins and heads, for example paddle 100, the orientation of the longitudinal axis "LH" of the paddle head 116 with respect to the longitudinal axis "A" of the central shaft 118 is preferably at an angle "B" (FIG. 4D) from about 10° to 80°, more preferably from about 15° to 70°, and most preferably from about 20° to 60°. The use of preferred paddle orientation leads to a more efficient mixing and conveying action of the slurry mixture and causes minimal damage to the reinforcing fibers in the mixer.

For the fiber-slurry mixer FIG. 8 provides a close-up view of the mixer 32 with a door 37 to the mixing chamber 63 open showing the orientation of the paddles 100 with respect to the central shaft 29 (one shaft shown). Placement of the paddles 100 on the central shaft 118 in the spiral form can also be observed. The paddles oriented in the multi-stage mixer would likewise be oriented.

When employing paddles having pins and heads, for example paddle 100, the set of paddles in the mixer are typically configured in a spiral form on the central shaft from one end of the mixer to another. This arrangement of paddles further facilitates conveying action of the material inside the mixer. Other configurations of paddle arrangement in the mixer are possible and are contemplated as part of this invention.

The paddles can be made of variety of materials including metals, ceramics, plastics, rubber, or a combination thereof. Paddles with softer lining (coating) materials are also contemplated as they tend to minimize material and fiber breakage.

The paddles and/or inner walls of the elongated mixing chamber may be coated with a release material, to minimize buildup of the cementitious slurry on the paddles and/or shell.

Other Configurations:

Other combinations of augers and mixing/conveying paddles to achieve the objectives of this invention are possible and contemplated as part of this invention. When employing paddles having pins and heads, for example paddle 100, these types of paddles may be used on their own in the first mixing section 122 and second mixing section 124 as described above and shown in FIG. 14B or they may be used in combination with augers. For example, they may be employed by substituting paddles having pins and heads, for example paddle 100, for the paddles 129B in FIGS. 13B-13C.

Inlet Ports

The inlet conduits 105A, 107A, 134A for the raw materials, such as the dry cementitious powder, aqueous liquid medium, and fibers fees into the mixer at inlet ports of the mixing chamber. The size, location, and orientation of raw material inlets ports of the fiber-slurry mixer are configured to ease introduction of the raw material into the mixer and to minimize potential for blocking of ports from the slurry mixture in the mixer.

The multi-stage continuous fiber-slurry mixer has at least one inlet port to introduce dry powders into the mixing chamber. This inlet port is located at the beginning of the first feed section (auger section) of the mixer.

The multi-stage continuous fiber-slurry mixer has at least one inlet port to introduce aqueous medium comprising water into the mixing chamber. The water inlet port is typically located at the end of the first feed section (auger section) of the continuous fiber-slurry. The continuous fiber-slurry mixer can have additional inlet ports to introduce other performance enhancing additives into the mixing chamber. These inlet ports are typically located at the end of the auger section or the beginning of the first mixing section of the co continuous fiber-slurry.

The multi-stage continuous fiber-slurry mixer has at least one inlet port to introduce reinforcing fibers into the mixing chamber. The fiber inlet port is typically located at the beginning of the second mixing section of the continuous fiber-slurry mixer. The fibers can be introduced into the continuous fiber-slurry mixer gravimetrically or volumetrically using a variety of metering equipment such as screw feeders or vibratory feeders. Fibers can be conveyed from a fiber feeder to the fiber-slurry mixer by a variety of conveying devices. For example, fibers can be transferred using screws (augers), air conveying, or simple gravity deposition. The discrete or chopped fibers can be made of different reinforcing fiber materials including fiberglass; polymeric materials such as polypropylene, polyethylene, polyvinyl alcohol, etc; carbon; graphite; aramid; ceramic; steel; cellulosic or natural fibers such as jute or sisal; or a combination thereof. Preferably the fibers are fiberglass. The fiber length is about 2 inches or lower, more preferably less than 1.5 inches or lower and most preferably less than 0.75 inches or lower.

The multi-stage continuous fiber-slurry mixer has an outlet port to discharge the fiber reinforced cementitious slurry mixture produced by the continuous fiber-slurry mixer. The outlet port is located at the end of the second mixing section of the continuous fiber-slurry mixer.

The multi-stage continuous fiber-slurry mixer has a venting port to remove any air introduced into the mixing chamber from raw material feed.

An electrical motor and drive mechanism to drive the shafts are associated with the mixing chamber.

Panel Production Using a Multi-Stage Fiber-Slurry Mixer

Fiber reinforced cementitious slurry made using this multi-stage continuous fiber-slurry mixer can be used for panel production. In particular, production of fiber reinforced concrete (FRC) panel, also known as fiber reinforced cement panel for use as a structural cement panels (SCP) is one preferred use.

Referring now to FIGS. 15 and 16, a cementitious panel production line is diagrammatically shown and is generally designated 110. FIG. 15 shows a production line 110 with the single continuous multi-stage mixer 132 used to prepare cement slurry and mix fibers to the cement slurry. FIG. 11 shows more details of the single continuous multi-stage mixer 132. A stream 105 of dry cementitious powder from dry powder feeder 102 feeds a first feed section 120 of the fiber-slurry mixer 132. An aqueous medium stream 107 from one or more liquid pumps 103 feeds a first mixing section 122 and optionally (shown in FIG. 11) also the first feed section 120 of the fiber-slurry mixer 132. A stream 134 of reinforcing fibers passes from a fiber feeder 131 to feed a second mixing section 124 of the fiber-slurry mixer 132. The stream 105 of dry cementitious powder, aqueous medium stream 107, and stream 134 of reinforcing fibers combine in the fiber-slurry mixer 132 to make a stream of fiber-cement mixture 136 which discharges at a downstream end of the mixer 132.

FIG. 16 shows the production line 110 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the cementitious panels are produced continuously as the moving carrier proceeds in a direction "T" from the proximal end 22 to the distal end 18.

In this embodiment, a web 26 of release paper, polymer film or a plastic carrier, for supporting a slurry prior to setting, may be provided and laid upon the carrier 14 to protect it and/or keep it clean. However, it is also contemplated that, rather than the continuous web 26, individual sheets (not shown) of a relatively rigid material, e.g., sheets of polymer plastic, may be placed on the carrier 14. These carrier films or sheets may can be removed from the produced panels at the end of the line or they may be incorporated as a permanent feature in the panel as part of the overall composite design. When these films or sheets are incorporated as a permanent feature in the panel they may provide enhanced attributes to the panel including improved aesthetics, enhanced tensile and flexural strengths, enhanced impact and blast resistance, enhanced environmental durability such as resistance to water and water vapor transmission, freeze-thaw resistance, salt-scaling resistance, and chemical resistance.

Optionally a layer of discrete reinforcing fibers (not shown) may be deposited directly on the conveying belt (carrier), release paper, or forming sheet upstream of the forming assembly 40.

In this embodiment, continuous reinforcement 44 such as a roving or a web of reinforcing scrim such as fiberglass scrim or nonwoven fiber mat may be provided for embedding in the slurry prior to setting and reinforcing the resulting cementitious panels. The continuous rovings and/or reinforcing web roll 42 are fed through the forming assembly 40 to be laid upon the carrier 14. However, it is also contemplated that, the continuous reinforcement 44 not be employed. The continuous scrim or rovings can be made of different reinforcing fiber materials including fiberglass; polymeric materials such as polypropylene, polyethylene, polyvinyl alcohol, etc; carbon; graphite; aramid; ceramic; steel; cellulosic, paper or natural fibers such as jute or sisal; or a combination thereof. A roving is an assemblage of continuous reinforcing monofilaments. Scrim is a web of continuous fibers typically running in the machine direction and the cross-direction. Reinforcement may also be provided as a nonwoven fiber web made of discrete reinforcement fibers.

It is also contemplated that the cementitious panels produced by the present line 110 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

The present production line 110 includes the continuous multi-stage fiber-slurry mixer 132 described above. The multi-stage continuous fiber-slurry mixer is preferably a dual shaft mixer. Dry powder feeder 104 feeds dry components of the cementitious composition, except for reinforcing fibers, to feed section 120 of the continuous multi-stage fiber-slurry mixer 132. Liquid pump 106 feeds to the first mixing section 122 of the fiber-slurry mixer 132 aqueous medium, such as water, with liquid or water soluble additives. The first mixing section 122 of the fiber-slurry mixer 132 mixes the dry components and the aqueous medium to form a cementitious slurry. The cementitious slurry passes to the second mixing section 124 of the multi-stage continuous fiber-slurry mixer 132. A fiber feeder 134 feeds fibers to the second mixing section 124 of the fiber-fiber-slurry mixer 132. Thus, in the second mixing section 124 of the fiber-slurry mixer 132 the fibers and slurry are mixed to form a fiber-slurry mixture 136. Fiber-slurry mixture 136 feeds a forming assembly 40.

Forming assembly 40 deposits the fiber-slurry mixture on the web 26 of release paper (if present) traveling on the moving carrier 14. Continuous reinforcement in form of rovings or scrim may be deposited on either one or both surface of the panel. If desired, continuous reinforcement 44 provided by fiber rovings or spools and/or scrim roll 42 is also passed through the forming assembly 40 as shown in FIGS. 15 and 16 to deposit on top of the deposited fiber-slurry mixture 46. Bottom continuous reinforcement, if desired, is fed behind the headbox 40 and it rests directly on top of the conveying/forming belt. The bottom continuous reinforcement passes under the headbox and the slurry in the headbox 40 is poured directly on its top as the continuous reinforcement moves forward. For example, continuous reinforcement can be provided by web 26 or a roll (not shown) upstream to the headbox in addition to that providing web 26 to lay the continuous reinforcement above web 26. To assist in leveling the fiber-slurry mixture 46 a forming vibrating plate 50 may be provided under or slightly downstream of the location where the forming assembly 40 deposits the fiber-slurry mixture 46.

The fiber-slurry mixture 46 sets as it travels along the moving carrier 14. To assist in leveling the fiber-slurry mixture 46 as it is setting the fiber-slurry mixture 46 passes under one or more vibrating screed plates 52. At the distal end 18 of the support frame 12 a cutter 54 cuts the set fiber-slurry mixture into boards 55. The boards (panels) 55 are then placed on an unloading and curing rack 57 (See FIG. 16) and allowed to cure.

Optionally, rather than applying scrim 42 or rovings to the top of the deposited fiber-slurry mixture 46, discrete reinforcing fibers (not shown) may be deposited on the surface of the fiber-slurry mixture 46 between the forming assembly 40 and the first screed plate 52. The deposited fibers are then embedded by the screed plates 52.

FIG. 16 further shows edge formation and leakage prevention devices 80. These are edge belts or edge rails or belt bonded slit formers (used singly or in combination). Belt bonded slit formers are raised portions on the belt with slits in the direction transverse to travel. The slits are narrow and so the adjacent portions of the belt bonded slit formers divided by a slit are tight against each other to seal and hold back fiber-slurry mixture when travelling in a straight direction but open when traveling in a curved direction, for example around a roll.

The fiber-cement mixtures produced by this invention contain cement, water, and other cement additives. However, to achieve the desired viscosity the cementitious compositions preferably avoid thickeners or other high viscosity processing aids at high dosage rates as commonly used with fiber cement extrusion. For example, the present slurries avoid high viscosity cellulose ethers at high dosage rates. Examples of high viscosity cellulose ethers which the present slurries avoid are methyl cellulose, hydroxypropyl methyl cellulose, and hydroxyethyl methylcellulose.

FIG. 17 shows a first variation of a composite view of a process flow chart for the portion of the cementitious panel production line suitable for use with the present fiber-slurry mixing device of FIG. 16 upstream of the forming assembly 40 and a top view of the production line downstream of the forming assembly 40. It adds slurry accumulator and pump 136A.

FIG. 18 shows a second variation of a composite view of a process flow chart for the portion of the cementitious panel production line suitable for use with the present fiber-slurry mixing device of FIG. 11 upstream of the forming assembly 40 and a top view of the production line downstream of the forming assembly 40. FIG. 18 shows an example of an embodiment of the present invention where optional continuous fiber roving choppers 40A are utilized on the production line for continuously chopping fibers from continuous fiber rovings and introducing them strategically at the panel bottom and/or top faces. The chopped fibers so introduced typically have a random two-dimensional orientation and are instrumental in increasing the panel tensile and flexural strengths. Other suitable means of introducing discrete/chopped fibers at one or both panel faces are also possible and may be utilized for the purposes of this invention.

Conveyor Line Edge Formation and Leakage Prevention Devices

FIGS. 19A through 25B show different embodiments of the present invention where different substrates are used to cast and form the product on a conveying line.

The panel can be formed directly on continuous forming belts 14 as shown in FIGS. 9, 10, and 15-18. Such a forming belt 14 having belt-bonded slit-formers and leakage suppressors 14A is shown in FIGS. 19A-20B. They may further have an endless edge-forming belt 14B which passes through an edge-forming belt return 14C.

Various types of forming belts 14 are well known in the art that permit formation of product directly on them. The preferred belts for the purposes of this invention are multi-layer engineered composites comprising plies made of materials such as thermoplastic/thermosetting resins (examples, polyester, polyurethane, etc.) reinforced with continuous fibers and/or webs (such as fiberglass and/or other high strength reinforcing materials). When the panel is formed directly on a forming belt, a thin layer of release agent is applied on the forming belt to facilitate quick release of the poured material on the belt. Also, when the panels are formed in this manner, a belt wash station is typically employed to properly clean and dry the belt on its return path to the forming end of the line. After the belt has been cleaned and dried, another layer of release agent is applied on the belt followed by extruding a fresh layer fiber reinforced cementitous slurry at the forming assembly.

Alternatively, the panel can be formed on a continuous release paper or on a forming panel such as a FRC slip sheet 14D as shown in FIGS. 21A-24B. The forming panels (for example, FRC slip sheets) are stacked abutting each other on the conveying line and the fiber reinforced cementitous slurry mixture is directly poured on to the forming panels. These forming panels are removed when the cement panel (fiber reinforced concrete (FRC) panel) reaches a certain degree of set and strength development.

Figure 22A:
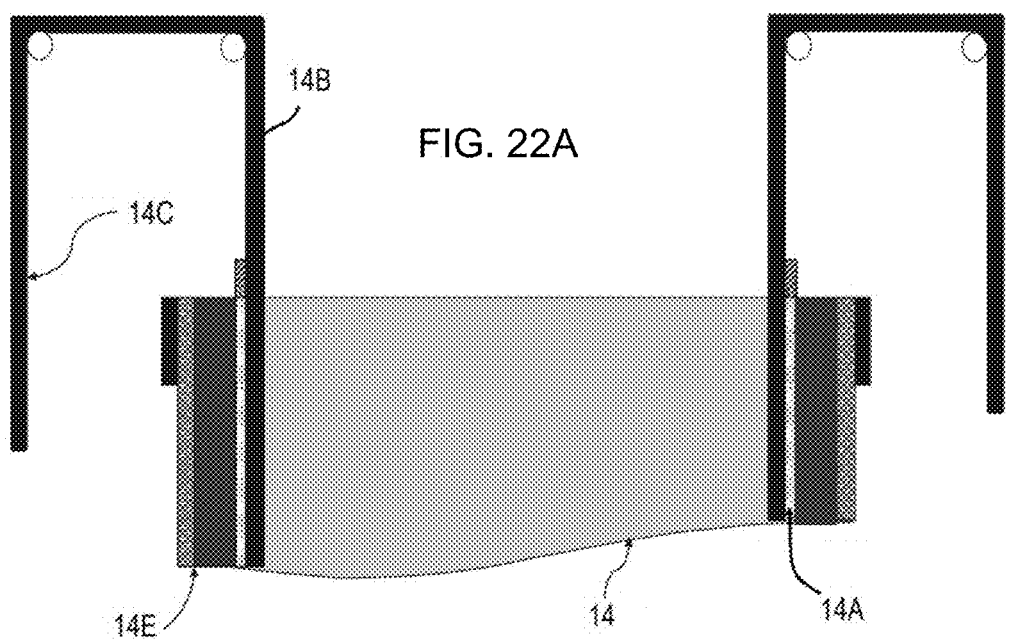
FIG. 22A shows a top view of a fourth embodiment of an edge forming belt with belt bonded slit formers and leakage suppressers, an optional slip sheet or release paper on the edge forming belt, and an edge support rail.
Figure 22B:
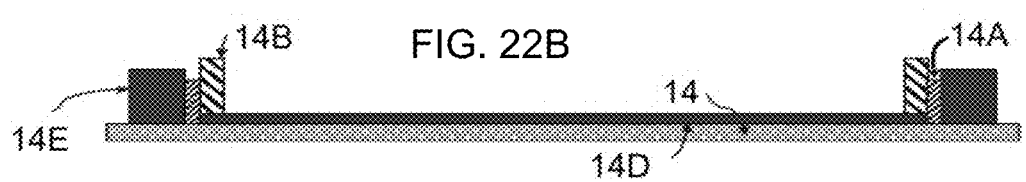
FIG. 22B shows a front view of the fourth embodiment of the edge belt with belt bonded slit formers and leakage suppressers, the optional slip sheet or release paper on the forming belt, and the edge support rail.

If desired the production line may also have edge support rails 14E as shown in FIGS. 22A-22B.

Figure 23A:
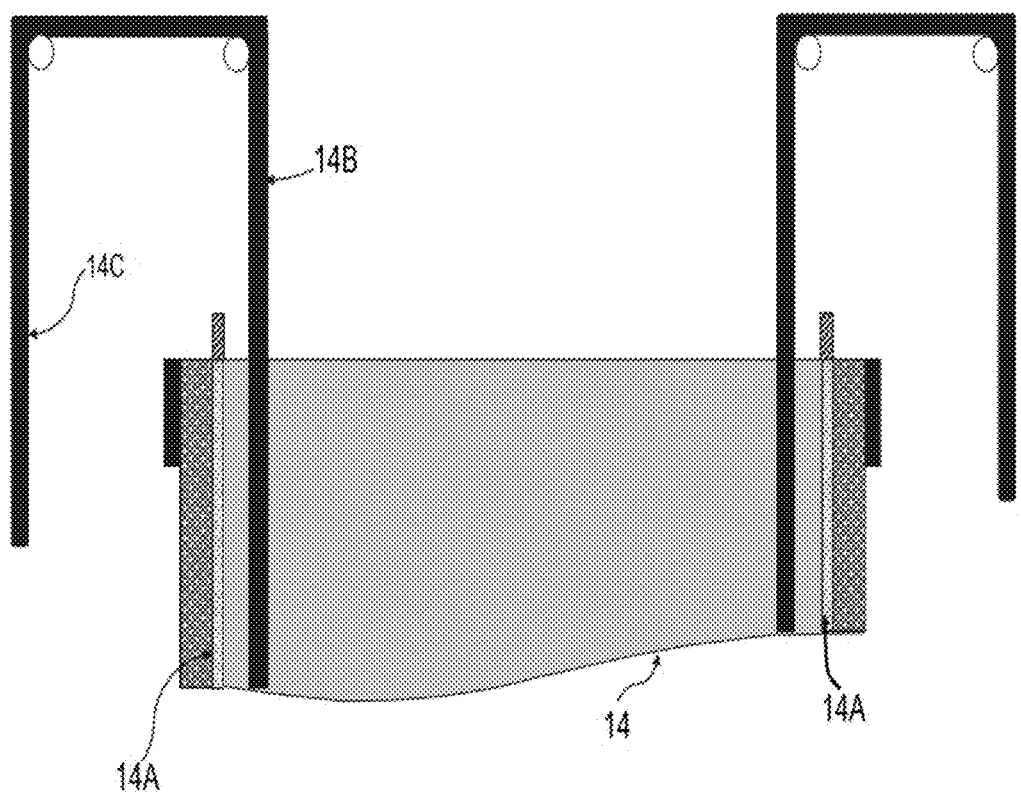
FIG. 23A shows a top view of a fifth embodiment of an edge forming belt with belt bonded slit formers and leakage suppressers, and an optional slip sheet or release paper on the forming belt.
Figure 23B:
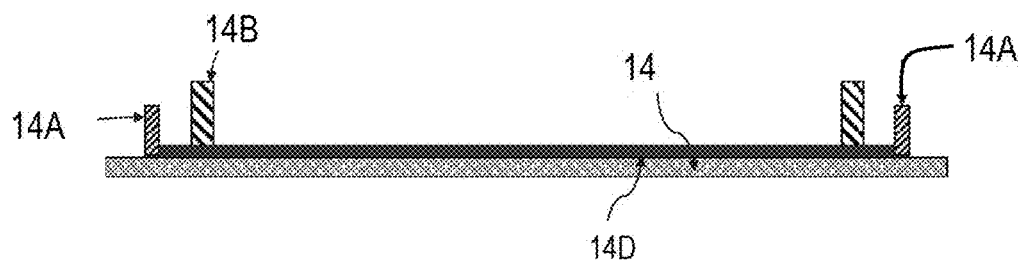
FIG. 23B shows a front view of the fifth embodiment of the edge belt with the belt bonded slit formers and leakage suppressers, and the optional slip sheet or release paper on the forming belt.
Figure 23C:
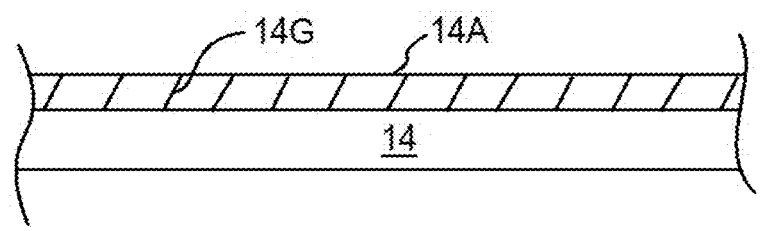
FIG. 23C shows a belt bonded slit former and leakage suppresser on the forming belt.

FIGS. 23A-23B show belt-bonded slit formers and leakage suppressors 14A and edge-forming belt 14B. FIG. 23C shows a belt bonded slit former and leakage suppresser 14A with slits 14G on the forming belt 14.

FIGS. 24A-24B show an edge-forming belt 14B.

The panel can also be formed in a containment mold as shown in FIGS. 25A-25B. In particular FIGS. 25A-25B show panel forming molds 14F, 14G. FIGS. 25A-25B also show mold guides/mold conveyors 14H. These molds are stacked right next to each other on the conveying line and the fiber reinforced cementitous slurry mixture is poured continuously into the molds as the line advances. Fine architectural features can easily be engineered on the panel bottom surface by fabricating molds having desirable design features.

The panels may also be formed on permanent molding sheets or three dimensional permanent forms. These molding sheets or forms become intrinsic part of the panel when the fiber reinforced cementitous slurry cures and hardens. When this aspect is desired, the molding sheets or forms are typically rough textured or they carry shear studs or anchors into which the fiber reinforced cementitous slurry mixture is poured. A rough texture and/or anchors enhance the bond between the panel and the permanent form/mold. Special FRC composite laminates for use as permanent forms or molds are particularly desirable in this regard since they allow formation of a composite FRC panel having special attributes including a significantly enhanced durability, impact resistance, and blast-resistance performance.

FIGS. 19A through 25B also show different methods for forming panels edges. These methods include the use of edge belts, edge bars, containment molds, and belt-bonded slit edge formers and leakage suppressers. The design of edge belts and containment molds can be engineered to produce panel products having finish edges with specific dimensions.

Forming Assembly (Slurry Feed Apparatus)

In both panel production using fiber-slurry mixture 36 produced by the separate slurry mixer 2 and fiber-slurry mixer 32 (as for example seen in FIGS. 1, 9, and 10) as well as using fiber-slurry mixture 136 produced by the Multi-Stage Fiber-Slurry Mixer 132 (as for example seen in FIGS. 11, and 15-18) a fiber-slurry feeder (also known as a fiber-slurry headbox 40) receives a supply of fiber-slurry mixture 36, 136 from the fiber-slurry mixer 132.

Different types of forming assemblies (slurry feed apparatus) are suitable on the forming line to produce the end product. A headbox is a preferred type of forming assembly. Other types of forming assemblies suitable in the present invention include: cylindrical screed rolls, roller coaters, vibrating plates with a gap at the bottom, vibrating plates (top and bottom) with a gap in the middle. FIGS. 10, 16, 17, and 18 show forming assembly (slurry feed apparatus) 40 in the form of a headbox or a screed roll. Different types of forming assemblies may also be combined and/or used in series to produce the product. For example, a headbox may be used in combination with a screed roll or a vibrating plate.

One preferred forming assembly (slurry feed apparatus) for depositing a slurry upon a moving forming web of a structural cementitious panel (SCP panel) production line or the like where settable slurries are used for producing fiber reinforced concrete (FRC) building panels or board having a direction of travel, comprises:
   a headbox mounted transverse to the direction of travel of the moving web, having a transverse back wall, sidewalls, a concave transverse front wall, an open top, and an open bottom for directing slurry onto the forming web;
   a moveable dam releasably attached to the back wall, a seal attached to a bottom wall of the dam; and
   headbox height adjustment and support system extending from opposed said sidewalls.

The preferred headbox 40 is disposed transversely to the direction of travel "T" of the carrier 14. The fiber-slurry mixture is deposited in a cavity of the headbox 40 and discharges through a discharge opening of the headbox onto the moving carrier web 14 (conveyor belt).

The preferred headbox 40 consists of a corrosion resistant material (for example, stainless steel) and has specific geometry to provide a reservoir for the slurry, height adjustment and support mounts to adjust slurry gap opening, and a curved transition to a straight lip to smoothly and evenly distribute the flow of slurry. The curved transition also provides a means to introduce a reinforcing fiberglass scrim (if needed) from above the headbox. An adjustable seal is provided at the back of the headbox in order to prevent any leakage. Reinforcing glass fiber scrim may also be added from underneath the headbox. Both scrim systems have adjustment for tracking purposes. The vibration unit is a single mass system consists of a table, springs, and two motors which direct forces directly into the mat and cancel out in other directions. This unit is placed under the headbox and it extends about 2 to 24 inches, or about 3 to 12 inches or about 3 to 6 inches beyond the headbox. The headbox height adjustment and support system can either be manually adjusted, mechanically operated, or electrically driven. The entire forming assembly has several advantages:

The fiber reinforced cementitious slurry can be pumped through a hose and hose oscillator system into the headbox 40 or it may be dropped into the headbox 40 directly from the fiber-slurry mixer 32. The oscillator system would be used in either case to agitate the slurry. Thickness of the product formed using the headbox 40 is controlled by the slurry flow rate in the headbox 40, the amount of slurry elevation head in the headbox 40, and headbox discharge opening gap for a given line speed. The discharge opening gap of the headbox 40 is a transverse opening through which the fiber-slurry mixture discharges from the headbox 40 onto the moving carrier web 14. The fiber-slurry mixture from the headbox deposits onto the moving carrier 14 in one step at close to the desired thickness and finish of the final panel 55. Vibration may be added to improve formation and different forms of continuous reinforcements such as scrims and rovings may be added to improve flexural strength of the formed product. For example, a vibration unit 50 may be located below the headbox 40 under the conveyor belt 14.

The vibration unit 50 is typically a single mass system of a table, springs, and two motors which direct forces directly into the deposited mat of fiber-cement slurry and cancel out in other directions. This unit 50 is placed under the headbox 40 and extends about 3 to 6 inches beyond the headbox.

The headbox 40 deposits an even layer of the fiber-slurry mixture of relatively controlled thickness upon the moving carrier web 14. Suitable layer thicknesses range from about 0.125 to 2 inches thick, preferably 0.25 to 1 inches thick, typically 0.40 to 0.75 inches thick.

The fiber-slurry mixture is completely deposited as a continuous curtain or sheet of slurry uniformly directed down to within a distance of about 1.0 to about 1.5 inches (2.54 to 3.81 cm.) of the carrier web 14.

FIGS. 29-33 show a design of a forming headbox 40 of the present invention. The headbox may be employed with any of the above-described mixer configurations, for example, both panel production using fiber-slurry mixture 36 produced by the separate slurry mixer 2 and fiber-slurry mixer 32 (as for example seen in FIGS. 1, 9, and 10) as well as using fiber-slurry mixture 136 produced by the Multi-Stage Fiber-Slurry Mixer 132 (as for example seen in FIGS. 11, and 15-18). This headbox design represents one embodiment of the present invention. Without departing from the scope of this disclosure, several modified designs of the forming headbox assembly are also contemplated to meet the objectives of the present invention. These modifications include size and shape of the curved transition, size of the reservoir, thickness of the plate used for fabricating the curved transition and straight lip, length of the straight lip extending beyond the curved transition, mechanisms to keep the slurry agitated in the reservoir, mechanical and vibrational means to prevent material buildup in the reservoir, methods to control slurry leakage at the backend of the reservoir, etc.

Referring now to FIGS. 29-33 fiber-slurry headbox 40 (also known as a fiber-slurry feeder) receives a supply of fiber-slurry mixture 36 from the fiber-slurry mixer 32 or the multi-stage mixer 132.

Figure 29:
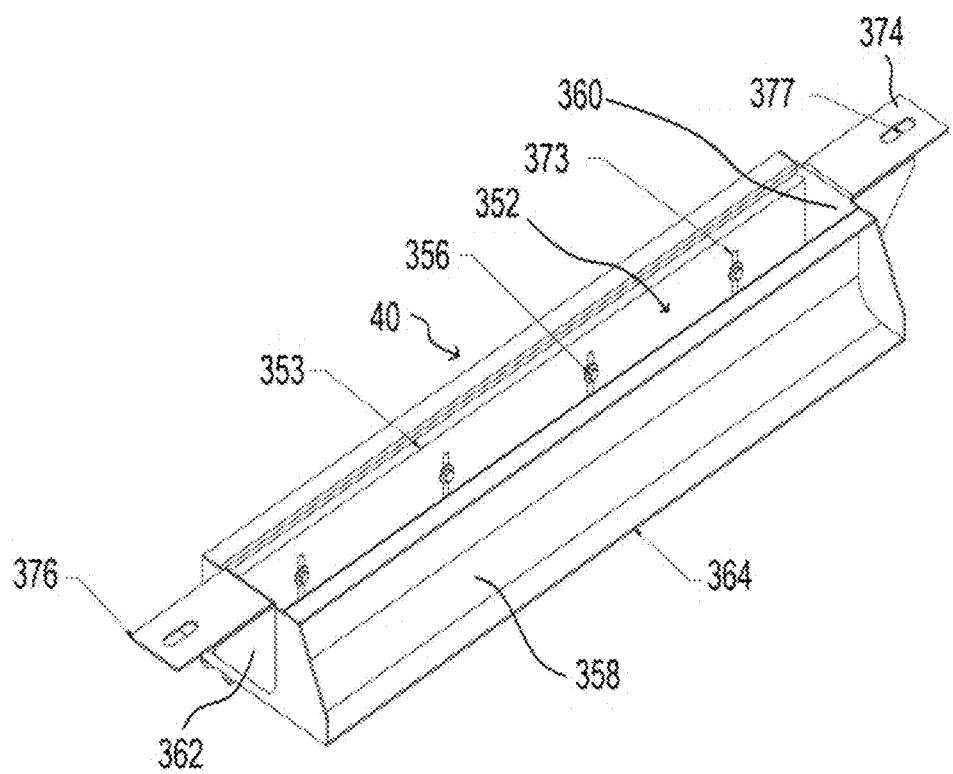
FIG. 29 shows a perspective view of a headbox for use with the invention.

FIG. 29 shows a perspective view of the headbox 40 defining a cavity 352. Headbox 40 has an adjustable UHMW dam 353 having adjustment openings 373 (typically slots as shown), and fastener hardware 356 (typically screws or bolts as shown) placed in the slots 373 for attaching the dam 353 to the headbox 40. The headbox 40 has sidewalls 360, 362, back wall 354 (FIG. 32), and front forming plate 364 defining a slurry chamber 352. The headbox 40 also has opposed headbox mounts 374, 376 extending from sidewalls 360, 362. Each headbox mount 374, 376 has a side to side adjustment slot to be used with a threaded rod or jack screw for height adjustment.

Figure 30:
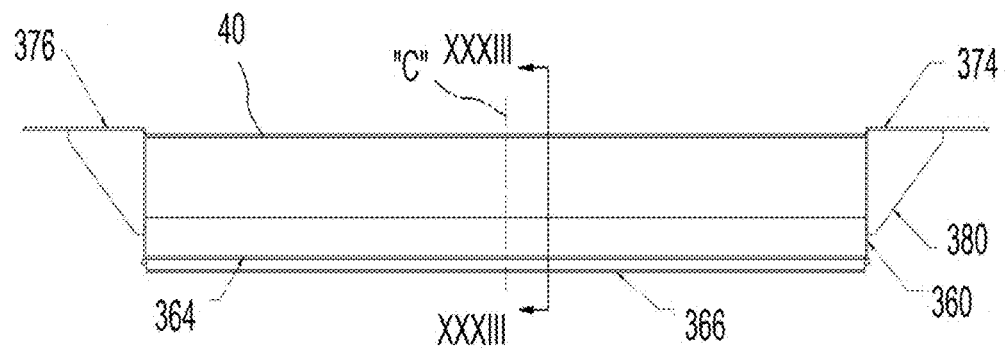
FIG. 30 shows a front view of the headbox.

FIG. 30 shows a front view of the headbox 40.

FIG. 31 shows a top view of the headbox 40. It is symmetrical about its center line "C". The headbox 40 has sidewalls 360, 362, back wall 54 (FIG. 32), and front forming plate 364 defining a slurry chamber 352. The adjustable dam 53 is for adjusting the height of the headbox 40 above the forming belt 14 and is attached by the bolts 356 through respective slots 373 to the back wall 354. The headbox mounts 374, 376 each have a gusset 380. A seal lip 366 is located at the bottom of the adjustable dam 353. A roller belt guide 365 is attached by a bolt 358 (FIG. 33) to the back wall 354. This assists in guiding a roll passed under the headbox 40 on the panel production line 10.

FIG. 32 shows a side view of the headbox.

The preferred headbox 40 is disposed transversely to the direction of travel "T" of the carrier 14. The fiber-slurry mixture is deposited in a cavity 352 of the headbox 40 and discharges onto the moving carrier web 14 (conveyor belt) through a discharge opening defined between the forming plate 364 of the headbox 40 and the moving carrier web 14.

The fiber reinforced cementitious slurry can be pumped through a hose and hose oscillator system into the headbox 40 or it may be dropped into the headbox 40 directly from the fiber-slurry mixer 32. The oscillator system would be used in either case to agitate the slurry. Thickness of the product formed using the headbox 40 is controlled by the slurry flow rate in the headbox 40, the amount of slurry elevation head in the headbox 40, and headbox discharge opening gap for a given line speed. Preferably the line speed is 1 to 100 feet per minute. The size (volume) of the slurry chamber 352 of the headbox is adjusted based on the line speed and product thickness being produced. Preferably the slurry is deposited in the headbox at a rate of about 0.10-25 cubic feet per minute.

The discharge opening gap of the headbox 40 is a transverse opening through which the fiber-slurry mixture discharges from the headbox 40 onto the moving carrier web 14. The fiber-slurry mixture from the headbox deposits onto the moving carrier 14 in one step at close to the desired thickness and finish of the final panel 55.

Vibration may be added to improve formation and different forms of continuous reinforcements such as scrims and rovings may be added to improve flexural strength of the formed product.

For example, a vibration unit 50 may be located below the headbox 40 under the conveyor belt 14. The vibration unit 50 typically vibrates at rate of 500 to 3000 cycles per minute, preferably 1000 to 2000 cycles per minute. The vibration unit 50 is typically a single mass system of a table, springs, and two motors which direct forces directly into the deposited mat of fiber-cement slurry and cancel out in other directions. This unit 50 is placed under the headbox 40 and it extends about 3 to 6 inches beyond the head box.

Figure 26:
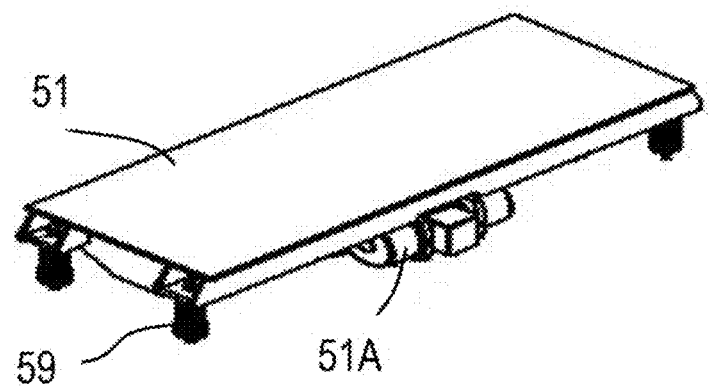
FIG. 26 shows design of a vibration table assembly used with the forming assembly of this invention.
Figure 27:
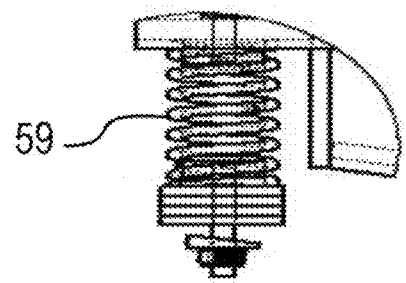
FIG. 27 shows design of a spring for the vibration table assembly used with the forming assembly of this invention.
Figure 28:
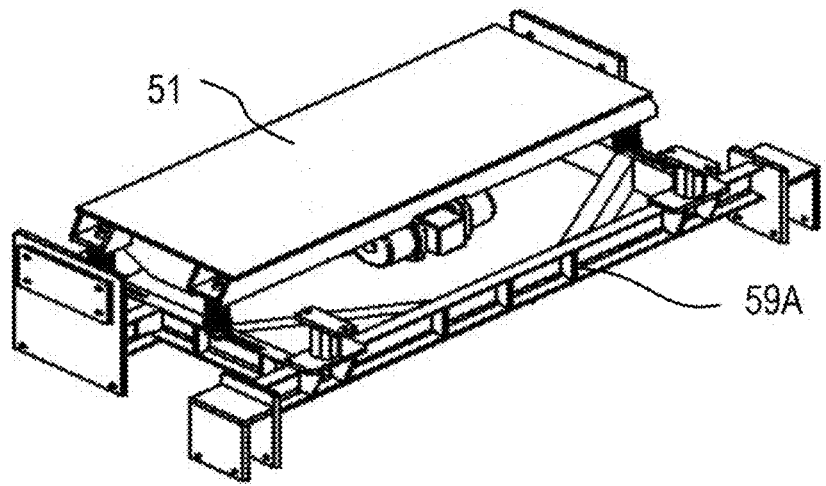
FIG. 28 shows design of the vibration base upon which the vibration table assembly is mounted.

FIGS. 26-28 show an embodiment of the vibration unit 50. FIG. 26 shows the vibration unit 50 is a vibration table 51 having four spring loaded legs 59 (three shown) and two motors 51A (one shown) which direct forces directly into the deposited mat of fiber-cement slurry and cancel out in other directions. The spring constant of the springs ranges between 50 to 500 lbs/inch, preferably 100 to 300 pounds/inch. The motors are selected such that they are capable of delivering sufficient force to the table to provide a stroke in the range of +/−1/64" to +/−1/4", preferably +/−1/32" to +/−1/8".

Figure 38:
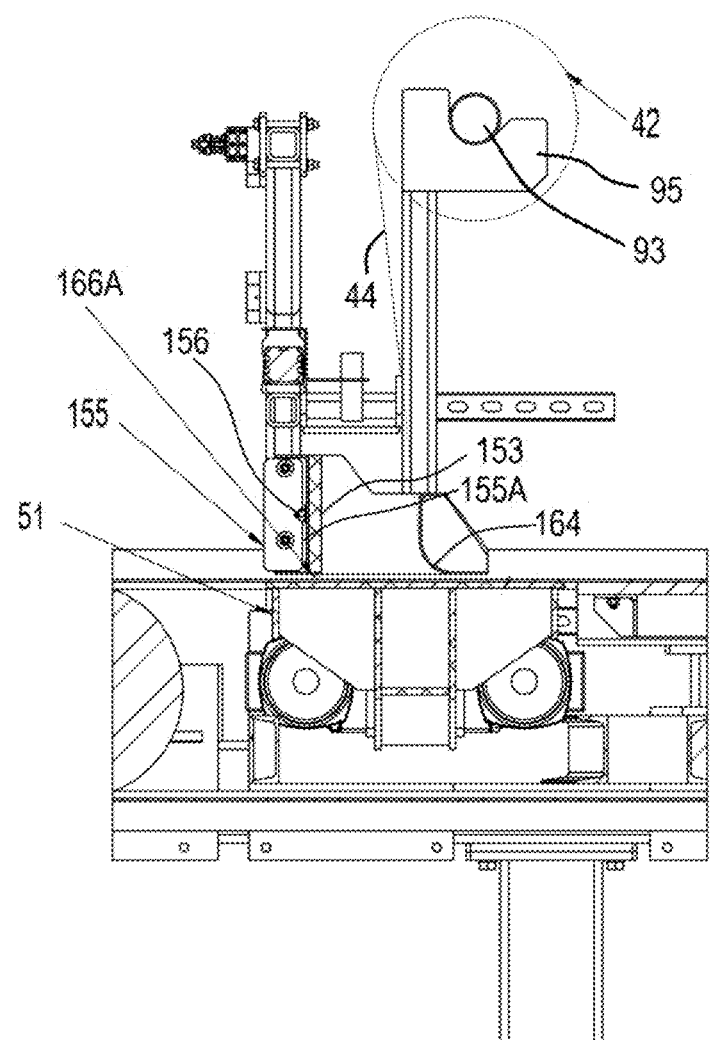
FIG. 38 shows a cross-section along line XXXVIII-XXVIII of FIG. 37.

FIG. 27 shows details of a spring leg 59. Preferably the vibration table 51 is mounted on a vibration base 59A as FIG. 28 shows. FIG. 38 shows a cross sectional view with additional details of the vibration table 51.

The headbox 40 deposits an even layer of the fiber-slurry mixture of relatively controlled thickness upon the moving carrier web 14. Suitable layer thicknesses range from about 0.125 to 2 inches thick, preferably 0.25 to 1 inches thick, typically 0.40 to 0.75 inches thick.

The fiber-slurry mixture is completely deposited as a continuous curtain or sheet of slurry uniformly directed down to within a distance of about 1.0 to about 1.5 inches (2.54 to 3.81 cm.) of the carrier web 14.

As the fiber-slurry mixture 46 moves toward the moving carrier web 14, it is important that all of the slurry be deposited on the web.

FIG. 33 shows a cross-section of the headbox along view XXXIII-XXXIII. This shows the curved forming plate 364. Forming plate 364 has a curved portion 364A having a radius of curvature of 1 to 24 inches. The curved portion 364A extends 30 to 90 degrees.

FIG. 34 shows a stand 342 to mount the headbox 40 with the production line 10. Each headbox mount 374, 376 would be attached to a respective stand 342 (one shown). FIG. 34 shows the stand for headbox mount 376. The stand for headbox mount 374 would be the same. Stand 342 includes two upright members 344 connected by a cross bar 346. Cross bar 346 has a hole through which a bolt 347 passes. Two nuts 348 hold bolt 347 in place on the cross bar 347. The bolt 347 also passes through slot 377 of headbox mount 376 and is held in place by two nuts 349. Movement of the nuts permits adjustment of the headbox gap "G" between the headbox forming plate 364 and the moving panel carrier 14 to set the thickness of the deposited layer of fiber-cementitious slurry mixture 46. The headbox mounts 374, 376 are preferably reinforced by gussets 80 (omitted in FIG. 29 for clarity but shown in FIG. 30).

Figure 35:
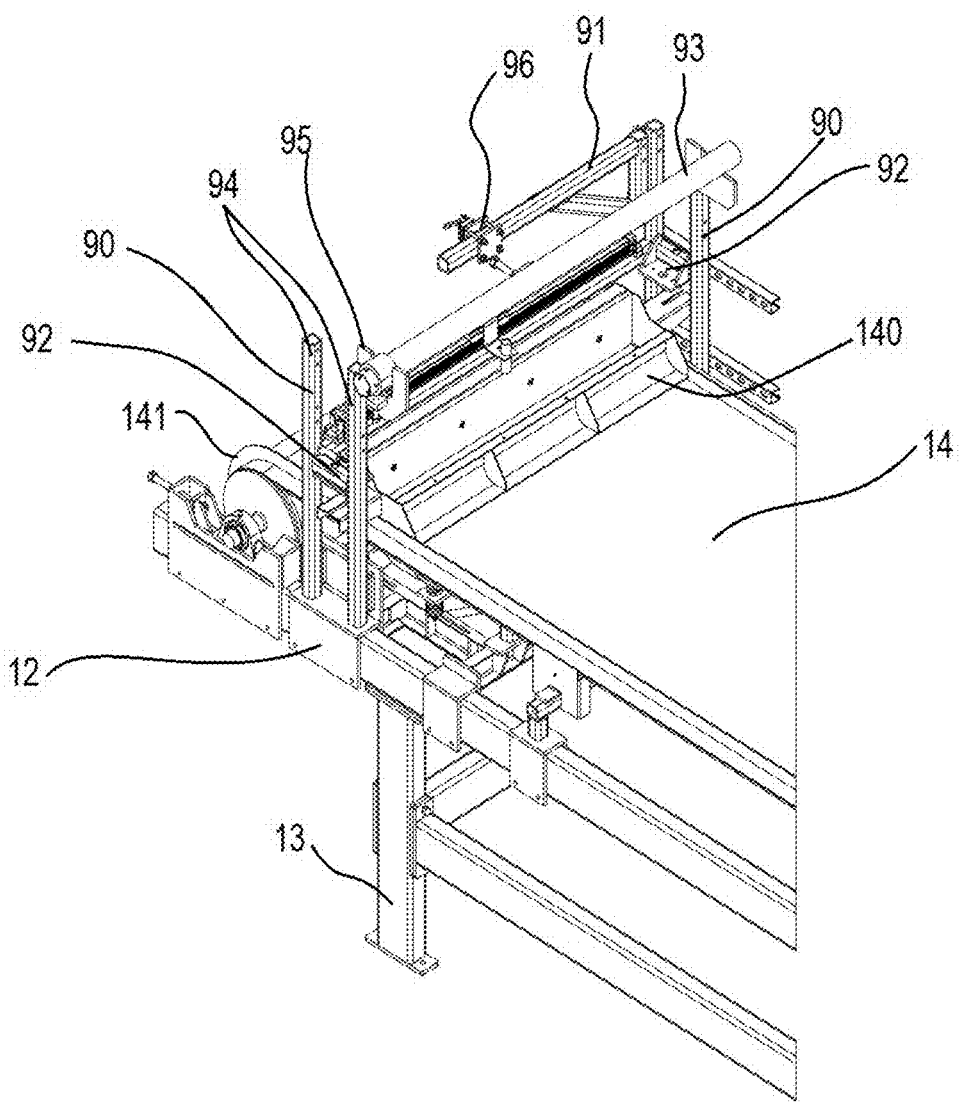
FIG. 35 shows a perspective view of a second embodiment of the headbox of the present invention mounted on a panel production line.

FIG. 35 shows a perspective view of a second embodiment of a headbox 140 of the present invention mounted to a table 12 of the production line 10. The supports 90 for the headbox 140 each have two upright members 94 and a cross bar 92. The support 90 also has a U-shaped bracket 95 for holding a transverse scrim roll holder 93 for holding a scrim roll 42 (FIG. 38). Another support 91 is provided for a slurry hose guide 96 and oscillating hose guide/actuator 97. The belt 14 also has a belt casting edge 141.

FIG. 35 shows the headbox 140 not yet attached to the supports 90. However, FIG. 36 shows the headbox 140 attached to the cross bar 92 by headbox height adjusters 100.

Figure 36:
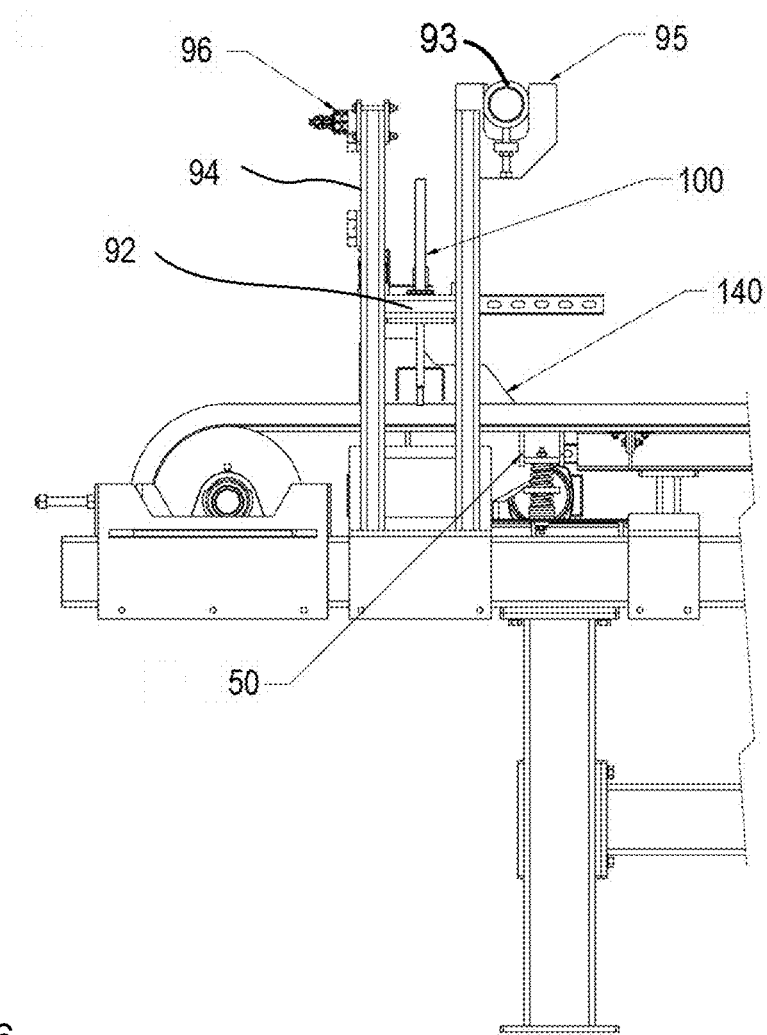
FIG. 36 shows a side view of the second embodiment of the headbox of the present invention mounted on a panel production line.

FIG. 36 also shows the vibrator 50 below the location on the forming belt where the headbox 140 deposits the fiber-slurry mixture. FIG. 36 also shows the U-shaped bracket 95 supporting the transverse scrim roll holder 93 for holding scrim roll 42 (FIG. 38). In place of the scrim roll 42 a roll of rovings or nonwoven fiber mat may be provided.

Figure 37:
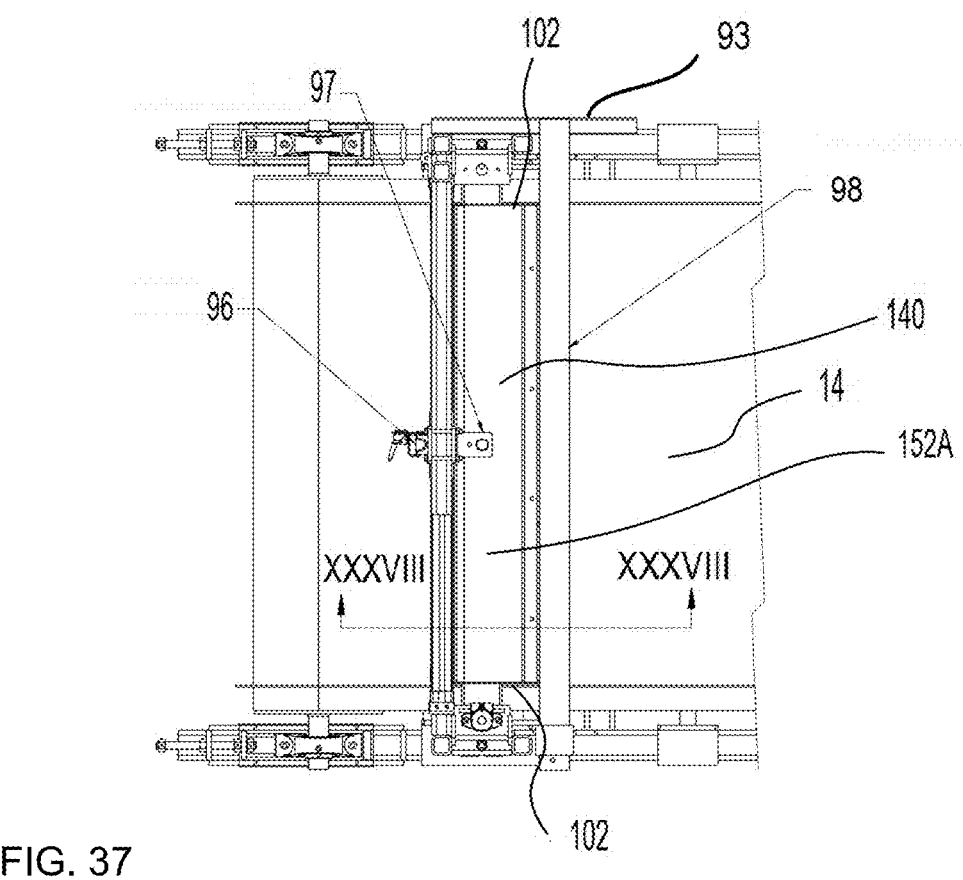
FIG. 37 shows a top view of a second embodiment of the headbox of the present invention mounted on a panel production line.

FIG. 37 shows a top view of the upstream end of the panel production table 12. This includes a top view of headbox 140. This shows forming belt 14 and the transverse scrim roll holder 93 for holding the scrim roll 42 (FIG. 38). In place of the scrim roll 42 a roll of rovings or nonwoven fiber mat may be provided. FIG. 37 also shows slurry hose guide 96 and oscillating hose guide/agitator 97, slurry chamber 152A, and sidewalls 102.

The headbox 140 has sidewalls 102 (FIG. 37), back wall 155A, and front forming plate 164 defining a slurry chamber 152A (FIG. 37).

FIG. 38 shows a cross-sectional side view of headbox 140 along view XXXVIII-XXXVIII. This shows the headbox 140 has a headbox counter weight 155. This also shows how scrim 44 from scrim roll 42, held on transverse scrim roll holder 93 nested in U-shaped bracket 95, may pass through the headbox 140 to be deposited on the top surface of the deposited fiber-slurry mixture. FIG. 38 also shows headbox seal 166A (seal lip) and the headbox counter weight 155. FIG. 38 also shows the vibration table 51 below the headbox 140. An adjustable dam 153 for adjusting the height of the headbox 140 above the forming belt 14 is attached by bolts 156 (one shown) through a slot to the back wall 155A. The headbox seal lip 166A is located at the bottom of the adjustable dam 153.

Scrim 42 passes through the slurry chamber 152A to run along the inside wall of the front forming plate 164. If desired the device of FIG. 10 may be modified to add a top roving plate to guide rovings through the headbox.

Forming and Smoothing and Cutting

In both panel production using fiber-slurry mixture 36 produced by the separate slurry mixer 2 and fiber-slurry mixer 32 (as for example seen in FIGS. 1, 9, and 10) as well as using fiber-slurry mixture 136 produced by the Multi-Stage Fiber-Slurry Mixer 132 (as for example seen in FIGS. 11, and 15-18) upon the deposition of the layer of fiber-embedded settable slurry as described above, the frame 12 may have forming devices provided to shape an upper surface of the setting slurry-fiber mixture 46 traveling on the belt 14.

Figure 5:
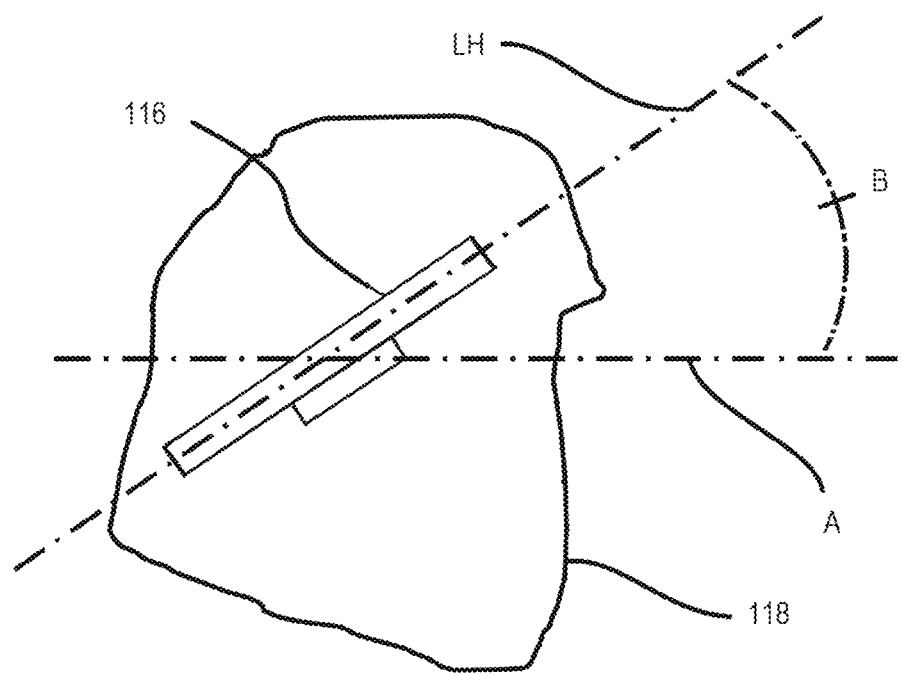
FIG. 5 shows a top view of a paddle and a portion of the shaft of the horizontal single shaft continuous fiber-slurry mixer embodiment of the present fiber-slurry mixing device of FIG. 3.

In addition to the above-mentioned vibrating table (forming and vibrating plate) 50 that assists to smooth the slurry being deposited by the forming assembly 40, the production line 10 may include smoothing devices, also termed vibrating screed plates 52, to gently smooth the upper surface of the panel (see FIGS. 5 and 6).

By applying vibration to the slurry 46, the smoothing device 144 facilitates the distribution of the fibers 30, 68 throughout the panel 92, and provides a more uniform upper surface. The smoothing device 144 may either be pivoted or rigidly mounted to the forming line frame assembly.

After smoothing, the layer of slurry has begun to set, and the respective panels 55 are separated from each other by a cutting device 54, which in a typical embodiment is a water jet cutter. The cutting device 54 is disposed relative to the line 10 and the frame 12 so panels are produced having a desired length, which may be different from the representation shown in FIG. 1. When the speed of the carrier web 14 is relatively slow, the cutting device 54 may be mounted to cut perpendicularly to the direction of travel of the web 14. With faster production speeds, such cutting devices are known to be mounted to the production line 10 on an angle to the direction of web travel. Upon cutting, the separated panels 92 are stacked for further handling, packaging, storage and/or shipment as is well known in the art.

Another feature of the present invention is that the resulting cementitious panel 55 is constructed so the fibers 30 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the fiber-slurry mixture 46.

FIG. 10 shows the method of FIG. 9 as a composite view of a process flow chart for the portion of the cementitious panel production line suitable for use with the present fiber-slurry mixing device upstream of the headbox and a top view of the production line downstream of the headbox. FIG. 10 shows slurry accumulator and positive displacement pump 30 after the slurry mixer 2 and slurry accumulator and positive displacement pump 32 after the fiber-slurry mixer 32. Both slurry accumulator and positive displacement pumps 30, 32 are optional.

Figure 41:
FIG. 41 shows a fiber reinforced cementitious slurry mixture produced with the fiber-slurry mixer of the present invention being deposited using a forming headbox on a continuous cementitious panel manufacturing line.

FIG. 41 shows a fiber reinforced cementitious slurry mixture produced with the fiber-slurry mixer of the present invention deposited using a forming headbox on a continuous cementitious panel manufacturing line.

Wrapping a Fiber Reinforced Concrete (FRC) Panel in Nonwoven Fiber Layers

The invention also encompasses to make a board wrapped in nonwoven fiber mat, typically a nonwoven polymer fiber mat such as a polypropylene mat or a substantially inorganic nonwoven fiber mat such as a fiberglass mat, on the panel production line. The inorganic nonwoven fiber mat may optionally be coated with a variety of coating materials that impart handling characteristics to the continuous web and enhance physical and chemical durability. The nonwoven fiber mat is preferably applied on the both major faces of the panel but optionally may be applied only on one of the major faces of the panel.

Figure 42:
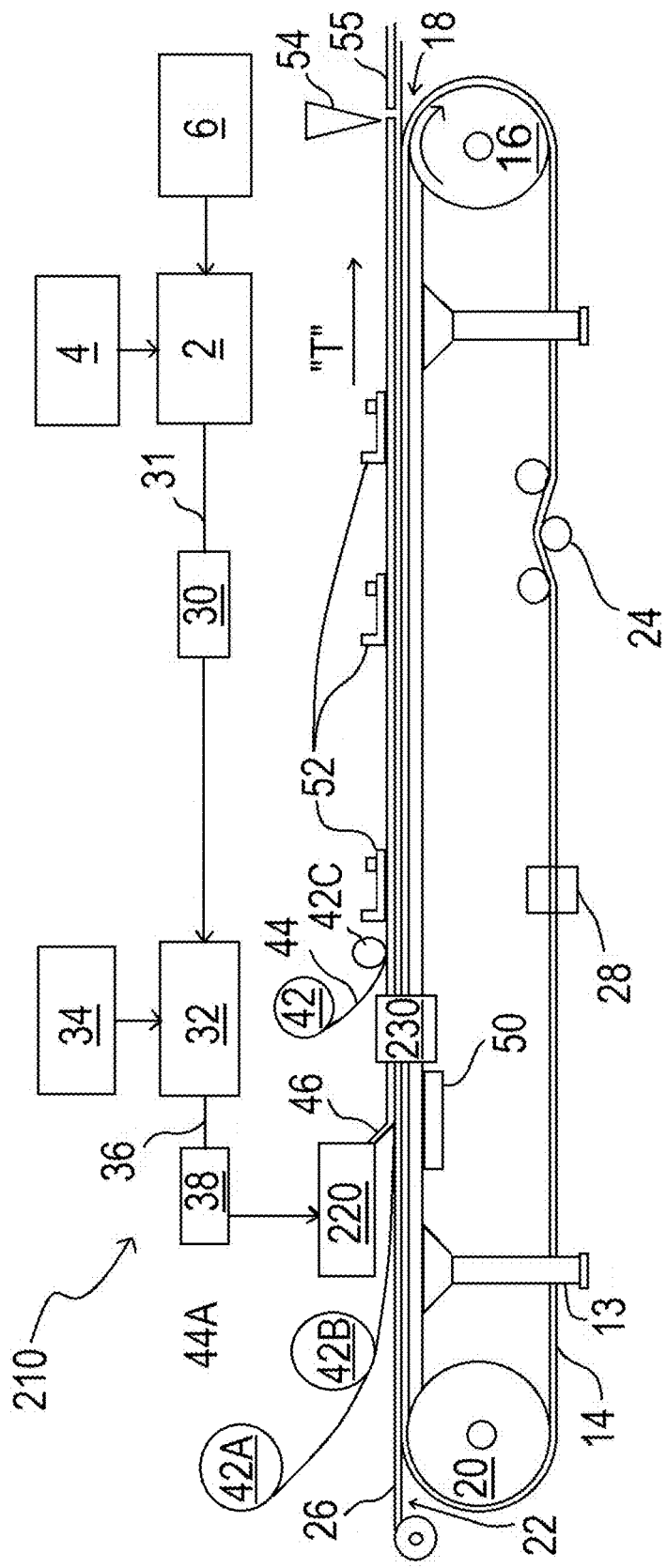
FIG. 42 is a diagrammatic elevational view of a cementitous panel production line of FIG. 9 suitable for use with the present fiber-slurry mixing device which shows a fiber reinforced cementitious slurry mixture produced with the fiber-slurry mixer of the present invention being deposited using a forming headbox on a continuous cementitious panel manufacturing line modified for applying nonwoven glass mat above and below the fiber-slurry mixture.

FIG. 42 is a diagrammatic elevational view of a cementitous panel production line 210 for use with the present fiber-slurry mixing device which is production line 10 of FIG. 9 modified for applying nonwoven fiber mat 44A below the fiber-slurry mixture and applying nonwoven fiber mat 44 above the fiber-slurry mixture 46 to wrap the produced board 55. (However, this modification could also be used to modify any version of the present invention, for example, the versions of the invention with the multi-stage continuous mixer of FIGS. 15-18). In FIG. 42 like reference numbers from FIG. 9 are employed to represent like elements.

A first continuous mat of nonwoven (preferably fiberglass or multi-layer polyolefin) fiber 44A from a feed roller 42A passes under a roller 42B onto the surface of the moving belt 14. Then the fiber reinforced cementitious slurry mixture 46 produced with the fiber-slurry mixer of the present invention is deposited on the first mat of nonwoven fiber 44A using the forming headbox 220.

The mat of nonwoven fiber 44A on the moving surface of the panel production line 210 extends from the right and left sides of the setting fiber-slurry mixture 46 for board 55. Folding unit 230 flips the edges 44B, 44C (see FIG. 43) of the mat 44A to wrap around the right and left sides of the setting fiber-slurry mixture 46 for board 55. Thus, the mat 44A can be wrapped around the setting fiber-slurry mixture 46 of board 55 to wrap the right and left edges 44B, 44C (FIG. 44) of the mat 44A when the board 55 is not entirely set. In particular, the right and left edges 44B, 44C are wrapped while the fiber-slurry mixture 46 is still sufficiently tacky to hold the flipped mat (web) of nonwoven fiber 44A in place. Then the invention feeds a top mat (web) 44 of nonwoven fiber material from a feed roll 42, then under an application roll 42C onto the upper surface of the fiber-slurry mixture and glues the top mat (web) 44 to the setting fiber-slurry mixture 46 for board 55. Then the setting fiber-slurry mixture 46 for board 55 is run under a forming plate 52. Then the wrapped setting fiber-slurry mixture 46 for board 55 is processed as described above for production line 10 of FIG. 9. FIG. 44 shows a resulting board 55.

Thus, the method may comprise applying a first web 44A of nonwoven fibers on the moving surface of a panel production line, the first web 44A is sufficiently impermeable to prevent seepage of the fiber-slurry mixture on the panel production line; the first web 44A being wider than the cement board 55 being made; forming a continuous trough by bending outer portions of the first web 44A upright; continuously depositing the fiber-slurry mixture 46 from the headbox 200 on the first web 44A and distributing the fiber-slurry mixture 46 laterally to fill the trough to a substantially uniform depth; folding upright portions of the first mesh 44A inward and over the fiber-slurry mixture such that edges are flipped to wrap around right and left edges of the setting fiber-slurry mixture; applying the second web 44 of nonwoven fibers to an upper surface of the setting fiber-slurry mixture 46 on the panel production line 10 and glue the second web 44 to the setting fiber-slurry mixture 46 for the panel 55 and then the setting panel 55 is run under a forming plate 52. Production line 210 applies the second web 44 of nonwoven fibers to an upper surface of the setting fiber-slurry mixture 46 to overlap the folded over portions of the first mesh 44A as is preferred when applying upper and lower nonwoven fiber mats 44, 44A. In an alternative, shown in FIG. 42A and described in further detail below, the upright portions of the first mesh 44A are folded after applying the top web.

Folding unit 230 may be any suitable folding unit. For example, U.S. Pat. No. 5,221,386 to Esminger et al, incorporated herein by reference, describes an apparatus for wrapping bare surfaces of setting cement panel with woven mesh of reinforcing fibers underlying the top, bottom, and longitudinal edge surfaces (in other words, embedded). The Esminger et al apparatus can be adapted to be folding unit 230 by replacing its cement and woven mesh with setting fiber-slurry mixture 46 for board 55 and nonwoven fiber mats 44, 44A (which do not embed). The Esminger et al apparatus includes a pair of edger rails which slidably rest on a conveyor belt and define the path of the cement board being made on the conveyor belt and a means for folding and pressing outer margins of its bottom mesh comprising first pair of flexed spatulas mounted over the conveyor belt on a cross bar transverse to the direction of travel of the moving fiber-slurry mixture Thus, to achieve the folding the present invention may employ a first pair of flexed spatulas (not shown) mounted over the fiber-slurry mixture 46. For example, the spatulas can be mounted on a cross bar (not shown, but disclosed in U.S. Pat. No. 5,221,386 to Esminger et al) transverse to the direction of travel of the moving fiber-slurry mixture. As the trough of fiber-slurry mixture 46 approaches the first pair of flexed spatulas the margins of the first mat 44A and the walls of the trough they form contact the spatulas to be tucked under the spatulas to initiate the folding over of the continuously approaching mat 44A. It is preferred to fold the upright edges 44B, 44C of the bottom mat 44A over onto the fiber-slurry mixture 46 and use the pressure of the flexed spatula blades to press the folded over first matt edges 44B, 44C down onto the fiber-slurry mixture 46 before applying the top second mat 44.

Preferably, the mats are not substantially embedded in the cementitious core. Preferably, less than about 50% of the thickness of each mat is embedded in the cementitious core, more preferably less than about 30% is embedded in the cementitious core, furthermore preferably less than about 15%, less than about 5% or less than about 1% of the thickness of the mat is embedded in the cementitious core.

In this production line 210, an optional web 26 of release paper, polymer film or a plastic carrier, for supporting a slurry prior to setting, may be provided and laid upon the carrier 14 to protect it and/or keep it clean. It is also contemplated that, rather than the continuous web 26, individual sheets (not shown) of a relatively rigid material, e.g., sheets of polymer plastic, may be placed on the carrier 14. These carrier films or sheets may be removed from the produced panels at the end of the line or they may be incorporated as a permanent feature of the panel as part of the overall composite design. When these films or sheets are incorporated as a permanent feature in the panel they may provide enhanced attributes to the panel including improved aesthetics, enhanced tensile and flexural strengths, enhanced impact and blast resistance, enhanced environmental durability such as resistance to water and water vapor transmission, freeze-thaw resistance, salt-scaling resistance, and chemical resistance. The nonwoven fiber mat 44, 44A may optionally be used in conjunction with a continuous web 26 (for instance the continuous web 26 could be a release paper that prevents any permeated slurry through the nonwoven fiber mat 44A to reach the forming belt). When employing web 26 as a permanent feature of the panel and employing the relatively impermeable nonwoven fiber mat 44, 44A, the web 26 may be affixed to the nonwoven fiber mat 44, 44A with adhesive (for example web 26 may be provided with pressure sensitive adhesive). However, the web 26 or individual sheets of relatively rigid material (not shown) are optional and preferably not employed in this production line 10 of FIG. 42 when the relatively impermeable mats 44A, 44 are employed. Or preferably the continuous web 26 is the relatively impermeable nonwoven fiber mat and in that event the relatively impermeable nonwoven fiber mat 44A is not employed.

Figure 43:
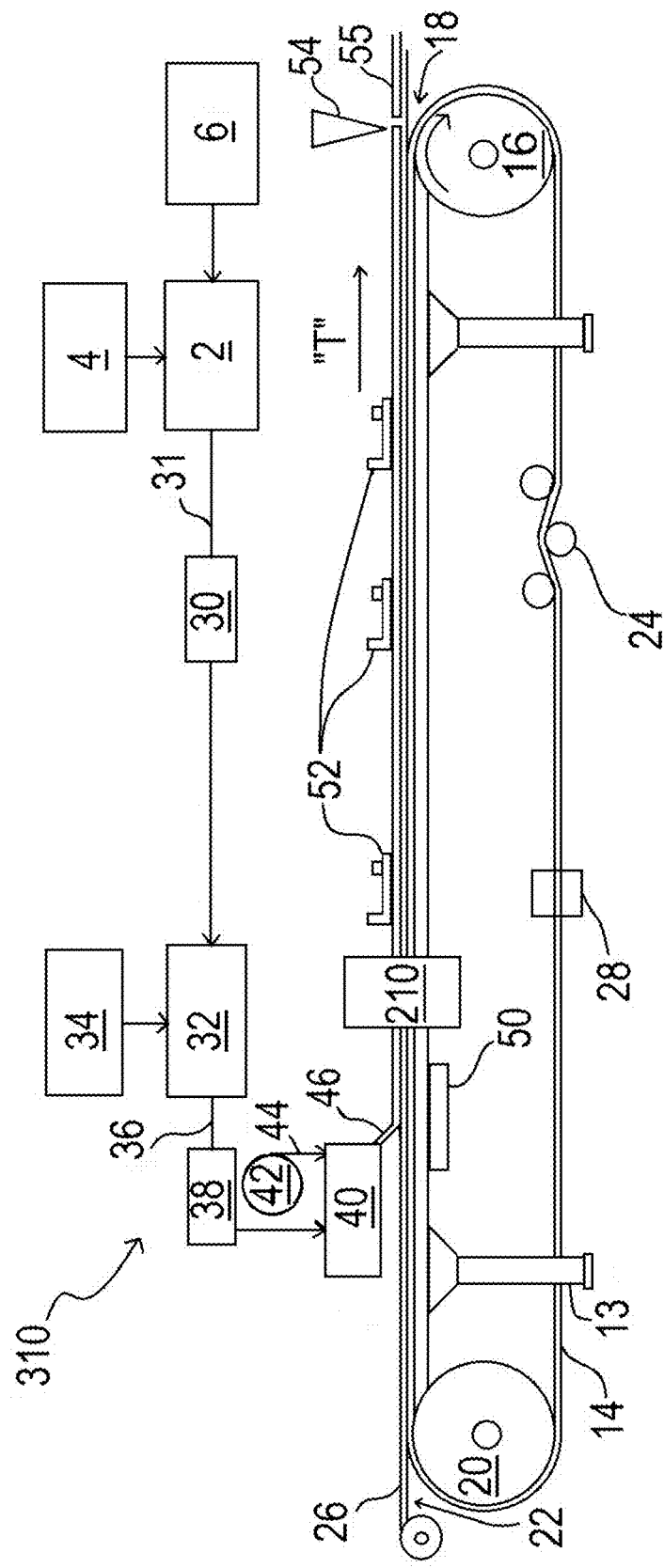
FIG. 43 is a diagrammatic elevational view of a second modification of the cementitous panel production line of FIG. 9 suitable for use with the present fiber-slurry mixing device which shows a fiber reinforced cementitious slurry mixture produced with the fiber-slurry mixer of the present invention being deposited using a forming headbox on a continuous cementitious panel manufacturing line modified for applying nonwoven glass mat above and below the fiber-slurry mixture.
Figure 44:
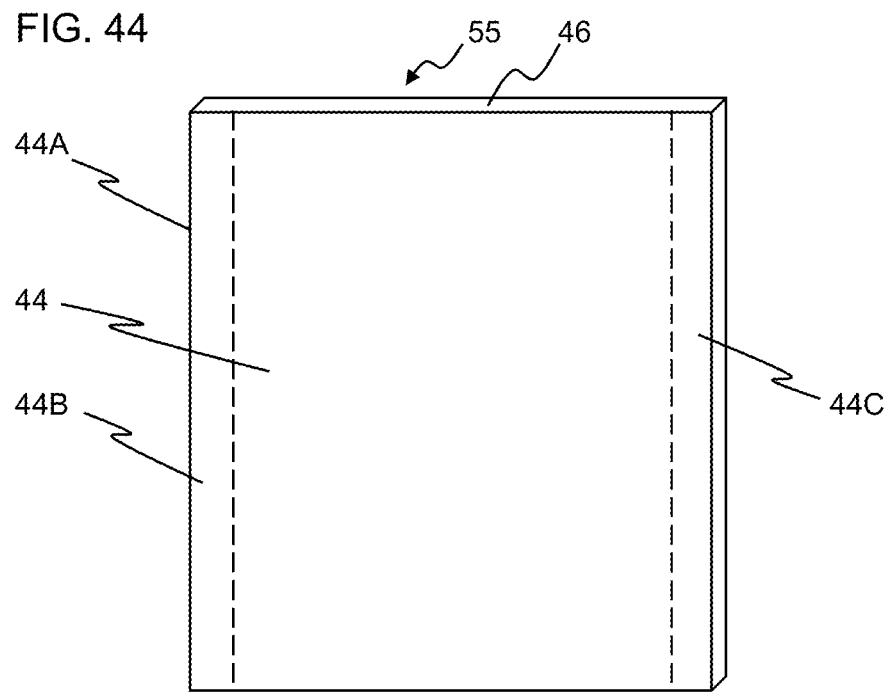
FIG. 44 is a schematic view of a board (panel) wrapped in a mat.

FIG. 43 shows a second modified production line 310 of the production line of FIG. 9 having two modifications. (However, these modifications could also be used to modify any version of the present invention, for example, the versions of the invention with the multi-stage continuous mixer of FIGS. 15-18). Its first modification is to employ the continuous web 26 as the relatively impermeable nonwoven fiber mat. Thus, the relatively impermeable nonwoven fiber mat 44A is not employed. Its second modification is to feed the second continuous nonwoven (preferably fiberglass or multi-layer polyolefin) fiber mat 44 from roll 42 through the headbox 40 to be laid upon the upper surface of the fiber-slurry mixture on the carrier 14. Then the moving fiber-slurry mixture with the webs 44, 44A feeds the folding station 210 to fold the right and left edges 44B, 44C over edges of the top mat 44. The production line 10 of FIG. 42 can be modified to have either or both of these modifications.

FIG. 44 is a schematic view of a cross-section of a board 55 of FIG. 42 wrapped in nonwoven fiber mat made according to production line 210. The nonwoven fiber mat covering includes a core of set fiber-slurry mixture 46, a front mat 44, and a rear mat 44A having right and left edges wrapped around the right and left sides of the panel 55 to the front of the panel. Mats 44 and 44A preferably are of the same material but can optionally be made of different materials depending on the product application requirements. In some embodiments, the nonwoven fiber mat may be used only on one of the major faces of the panel.

Materials and Structures for Nonwoven Fiber Mats which do not Fully Embed

These nonwoven fiber mats in the invention designed for not fully embedding into the fiber-slurry mixture, such as for example mats 44, 44A of FIG. 42, comprise any suitable type of polymer fiber, glass fiber, or combination thereof. Preferably, the majority of fibers in the nonwoven fiber mat are glass fibers or polymeric fibers. Non-limiting examples of suitable fibers include glass fibers, polyamide fibers, polyaramide fibers, polypropylene fibers, polyester fibers (e.g., polyethylene terephthalate (PET)), polyvinyl alcohol (PVOH), polyvinyl acetate (PVAc), cellulosic fibers (e.g., cotton, rayon, etc.), and combinations thereof, preferably glass fibers. Furthermore, the fibers of the mat can be hydrophobic or hydrophilic, coated or uncoated.

These nonwoven fiber mats are not permeable to the fiber-slurry mixture or they are at most slightly permeable to the fiber-slurry mixture. In particular, the nonwoven fiber mats provide sufficient impermeability to not let fiber-slurry mixture of the invention seep through even when the fiber-slurry mixture of the invention is vibrated and/or goes under forming plates on the production line. Fiber-slurry mixture of the invention can undergo a shear thinning when vibrated or spread on the panel production line. This makes the selection of the proper nonwoven sheet to prevent seepage important. If mats are nonwoven fiber glass mats they are coated nonwoven fiberglass mats so they do not completely embed into the fiber reinforced cementitious slurry material. This aspect of the invention with mats that do not embed does not use woven glass mat because woven glass mat is not tight enough to prevent seepage of the slurry through it. The invention contemplates using upper and/or lower meshes and scrims, for example, woven glass mats, when embedding is desired.

In the alternative the nonwoven fiber mats are preferably made of polyolefin (preferably polypropylene and/or polyethylene).

Figure 45:
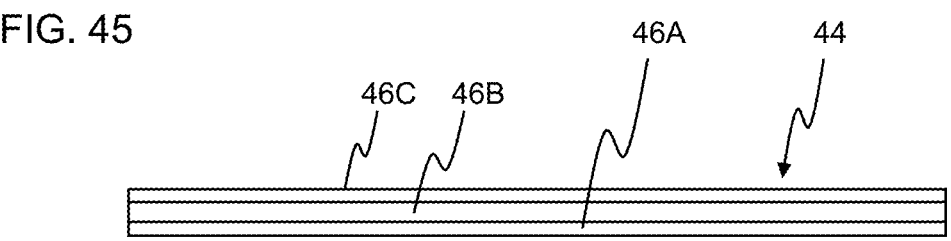
FIG. 45 is a schematic view of a three layer polymer fiber mat.

The nonwoven fiber mats can each be a single layer. For example, the preferred coated fiberglass mats are single layers. However, polymer mats are preferably made of more than one layer. For example, a preferred mat of polymer fibers has a laminate composite structure of one spun bound layer of the fibers and a relatively impermeable melt blown layer of the fibers. More preferably the mat 44 is a polyolefin mat shown in FIG. 45 having two spun bound layers 46A, 46C of the fibers and a melt blown layer 46B of the fibers sandwiched in-between the spun bound layers. The melt blown layer provides sufficient impermeability to not let fiber-slurry mixture of the invention seep through even when the fiber-slurry mixture of the invention is vibrated and/or goes under forming plates on the production line.

The fibers used in the nonwoven glass mat should be at least 0.25 inch long or longer, more preferably at least one half inch or three quarters inch long and most preferably at least about one inch long, but mixtures of fibers of different lengths and/or fiber diameters can be used as is known. It is preferred that these fibers be coated with a silane containing size composition as is well known in the industry. A preferred continuous glass fiber for fibrous web is at least one member selected from the group consisting of E, C, and T type and sodium borosilicate glasses, and mixtures thereof.

As is known in the glass art, C glass typically has a soda-lime-borosilicate composition that provides it with enhanced chemical stability in corrosive environments, and T glass usually has a magnesium aluminosilicate composition and especially high tensile strength in filament form. The present mat is preferably composed of E glass, which is also known as electrical glass and typically has a calcium aluminoborosilicate composition and a maximum alkali content of 2.0%. E glass fiber is commonly used to reinforce various articles. The chopped fibers of the major portion can have varying lengths, but more commonly are substantially of similar length. E glass fiber has sufficiently high strength and other mechanical properties to produce acceptable mats and is relatively low in cost and widely available. Most preferred is E glass having an average fiber diameter of about 11+/−1.5 μm and a length ranging from about 6 to 12 mm.

The non-woven fiber mats generally comprise fibers bound together by a binder, solvent treatment, or heat. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and combinations thereof. Typical polymeric fibers are any of nylon, polyester, polyethylene, or polypropylene. Any suitable amount of binder can be used. However, melt blown nonwoven fiber mats do not need binder.

Typically the fibrous mat can have any suitable weight effective to prevent bleed through during manufacturing. Typically, for glass mat the basis weight will be about 18 lbs/1000 ft$^2$ or greater (e.g., about 18-30 lbs/1000 ft$^2$), equivalent to about 88 g/m$^2$ or greater (e.g., about 88-147 g/m$^2$). In one embodiment, the fibrous mat, especially a glass fiber mat, has a basis weight of about 20 lbs/1000 ft$^2$ or greater (e.g., about 20-26 lbs/1000 ft$^2$, or about 23-26 lbs/1000 ft$^2$), equivalent to about 98 g/m$^2$ or greater (e.g., about 98-127 g/m$^2$ or greater).

Typically, for polymer mat the basis weight will be about 8 lbs/1000 ft$^2$ or greater (e.g., about 8-30 lbs/1000 ft$^2$), equivalent to about 39 g/m$^2$ or greater (e.g., about 39-147 g/m$^2$), preferably a basis weight of about 15 lbs/1000 ft$^2$ or greater (e.g., about 15-20 lbs/1000 ft$^2$), equivalent to about 73 g/m$^2$ or greater (e.g., about 73-98 g/m$^2$ or greater).

The mats are preferably each made of a single layer nonwoven fiberglass. In the alternative, preferably they are each made of nonwoven polymer (preferably polyolefin) mat having a multi-layer laminate structure. FIG. 44 is a schematic view of a front mat 44 of nonwoven polymer having a preferred multi-layer structure of three layers 46A, 46B, 46C. This polymer mat 44 has two spun bound layers 46A, 46C of the fibers and a melt blown layer 46B of the fibers sandwiched in-between the spun bound layers 46A, 46C. The melt blown layer provides sufficient impermeability to not let fiber-slurry mixture of the invention seep through even when the fiber-slurry mixture of the invention is vibrated and/or goes under forming plates on the production line.

The nonwoven fiber mats applied to the panel surfaces provide a smooth surface to the finish product and also help with the stacking of the fiber reinforced concrete panels during manufacturing. Rather than having to stack the panels in a rack separately during curing, if the panels are sufficiently set, the wrapped panels can be put directly on one another while curing. Casting fiber reinforced concrete panels edges in a nonwoven fiber mat will ease edge formation and clean up. The panel cast with a back, sides and front made of the sufficiently impermeable mat will have the benefit of a better surface, easier clean-up, and simplified board stacking (during manufacturing). This process will also yield a structural cement panel that requires zero finishing. The use of nonwoven glass mat has the advantage of a better bond over nonwoven polymer mats. The use of nonwoven polymer mats has the advantage of better alkali resistance over the nonwoven glass mats.

EXAMPLES

Example 1

Figure 39:
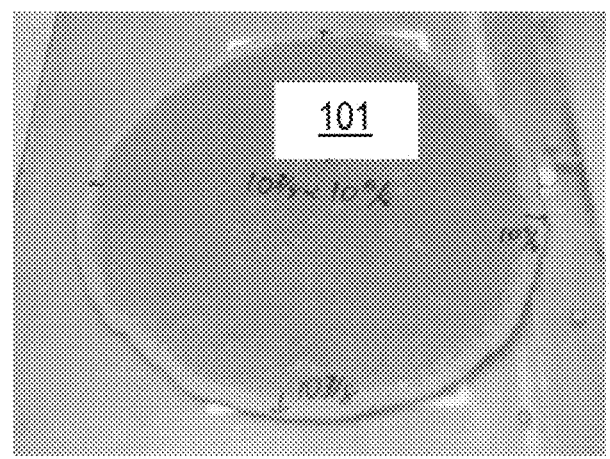
FIG. 39 shows a photograph of a slump patty of a fiber reinforced slurry cementitious mixture made using the fiber-slurry mixer of the present invention.

FIG. 39 shows a photograph of a slump patty 101 of a fiber reinforced cementitious slurry mixture made using the method of the present invention employing a slurry mixer followed by a separate fiber-slurry mixer.

Example 2

Figure 40:
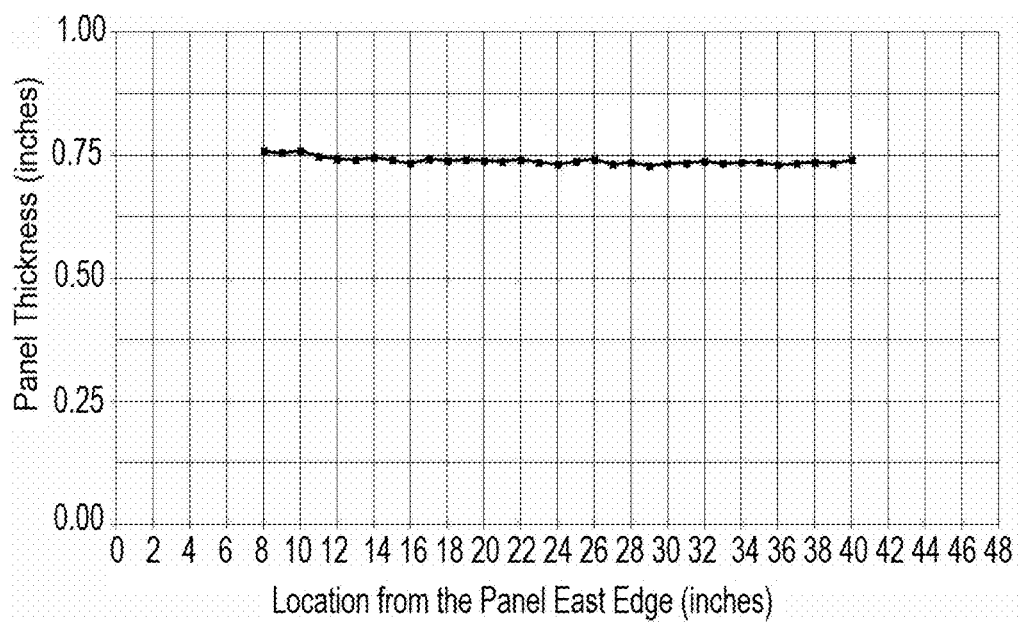
FIG. 40 is a thickness profile of a ¾" thick panel produced as a single layer on a FRC pilot line using the forming headbox of this invention. No smoothening device or vibrating screed plates were used on the top surface of the cast panel.

FIG. 40 is a thickness profile of a ¾" thick panel of fiber reinforced cement produced by the method of the present invention employing a slurry mixer followed by a separate fiber-slurry mixer. It shows consistent thickness achieved when a single layer was deposited. The fiber-slurry mixture contained Portland cement, gypsum, and glass fibers.

While a particular embodiment of the present slurry feed apparatus for fiber-reinforced structural cementitious panel production has been shown and described, it will be appreciated by those skilled in the art that changes and modifications may be made thereto without departing from the invention in its broader aspects and as set forth in the following claims.

What is claimed is:

1. A continuous method for preparing a fiber reinforced concrete panel comprising:
mixing water and dry cementitious powder to form a cementitious slurry, wherein the dry cementitious powder comprises at least one of Portland cement, calcium aluminate cements (CAC), calcium sulfoaluminate cements (CSA), geopolymers, magnesium oxychloride cements (sorel cements), and magnesium phosphate cements;
mixing the cementitious slurry and reinforcement fibers in a single pass horizontal continuous mixer to form a fiber-slurry mixture of fiber reinforced cementitious slurry mixture,
the single pass horizontal continuous mixer comprising:
an elongated mixing chamber defined by a horizontal housing having an interior cylindrical side wall,
at least one reinforcement fiber inlet port to introduce the reinforcement fibers through the interior cylindrical side wall directly into the mixing chamber, said reinforcement fibers comprises at least one of fiberglass, polymeric materials, polypropylene, polyethylene, polyvinyl alcohol, carbon, graphite, aramid, ceramic, steel or a combination thereof, and
upstream of the at least one fiber inlet port is (a) at least one inlet port to introduce the water and the dry cementitious powder together as one stream through the interior cylindrical side wall directly into the mixing chamber or (b) at least two inlet ports to introduce the water and the dry cementitious powder separately as separate streams through the interior cylindrical side wall directly into the chamber,
a fiber-slurry mixture outlet port at a downstream discharge end section of the horizontal housing to discharge the fiber reinforced cementitious slurry mixture, produced by the horizontal continuous mixer, laterally relative to the horizontal housing through an opening in the side wall of the horizontal housing into and through the fiber-slurry mixture outlet port on the horizontal housing,
a venting port to remove any air introduced into the mixing chamber from raw material feed, and
a rotating centrally horizontally oriented shaft mounted within the elongated mixing chamber traversing from one end of the horizontal continuous mixer to another end of the horizontal continuous mixer,
wherein the cementitious slurry and reinforcement fibers are mixed in a part of the mixing chamber for mixing the reinforcement fibers and cementitious slurry and moving the cementitious slurry and reinforcement fibers being mixed to the fiber-slurry mixture outlet;
wherein the centrally horizontally oriented shaft in the part of the mixing chamber for mixing the reinforcement fibers and cementitious slurry and moving the cementitious slurry and reinforcement fibers being mixed to the fiber-slurry mixture outlet comprises at least one mixing element selected from the group consisting of (1) an auger and (2) a plurality of mixing paddles mounted on the centrally horizontally oriented shaft at regular intervals and different circumferential locations to extend from the centrally horizontally oriented shaft, wherein the at least one mixing element rotates with the centrally horizontally oriented shaft within the housing;
wherein the cementitious slurry and reinforcement fibers are mixed in the mixing chamber of the horizontal fiber-slurry mixer for an average mixing residence time of about 5 to about 240 seconds while the at least one mixing element applies shear force, wherein the centrally horizontally oriented shaft rotates at 30 to 450 RPM;
discharging the fiber-slurry mixture laterally from the horizontal mixer through the opening in the side wall of the horizontal housing into and through the fiber-slurry mixture outlet port;
wherein, simultaneous with the discharging of the water, the dry cementitious powder, and the reinforcement fibers forming the fiber-slurry mixture from the single pass horizontal continuous mixer, further water, cementitous powder which is dry or combined with the further water, and reinforcement fibers forming further fiber-slurry mixture are fed to the single pass horizontal continuous mixer;
feeding the discharged fiber-slurry mixture to a forming assembly which deposits the fiber-slurry mixture on a moving surface of a panel production line uniformly as a layer 0.25 to 2 inches thick;
leveling the fiber-slurry mixture on the moving surface;
allowing the fiber-slurry mixture to set on the moving surface;
cutting the set fiber-slurry mixture into panels and removing the panels from the moving surface, wherein an additional layer of fiber-slurry mixture is not deposited on the deposited layer of fiber-slurry mixture.

2. The method of claim 1, wherein the at least one mixing element is the plurality of mixing paddles.

3. The method of claim 1, wherein the water and the dry cementitious material are mixed in a first mixer having a first mixing vessel which forms the cementitious slurry, the cementitious slurry discharges from the first mixer and feeds the single pass horizontal continuous mixer, and then the cementitous slurry and the fibers are mixed in a second fiber-slurry mixer comprising the single pass horizontal continuous mixer to form the fiber-slurry mixture, wherein the first mixer is separate from the single pass horizontal continuous mixer.

4. The method of claim 3, wherein the first mixer is a continuous slurry mixer, wherein a liquid stream comprising the water is fed into the continuous slurry mixer through a liquid stream inlet and a stream of the cementitious material as a dry cementitous powder is fed into the continuous slurry mixer to form the cementitous slurry, said continuous slurry mixer having a horizontally or vertically mounted impeller;

wherein the cementitous slurry passes from the continuous slurry mixer into the horizontal continuous mixer comprising the single pass horizontal fiber-slurry continuous mixer and a stream of reinforcement fibers passes into the horizontal fiber-slurry continuous mixer and mixing the cementitous slurry and the reinforcement fibers to form the fiber-slurry mixture, wherein the single pass horizontal fiber-slurry continuous mixer comprises the plurality of mixing and conveying paddles mounted on the centrally horizontally oriented shaft, the paddles extending radially from a location on the centrally horizontally oriented shaft, the paddles comprising a pin engaged to a paddle head, the pin pivotally engaged to the centrally horizontally oriented shaft and/or the paddle head to permit pivotal rotation of the paddle head relative to the respective location on the centrally horizontally oriented shaft, wherein the plurality of paddles are arranged to mix the reinforcement fibers and cementitous slurry and move the cementitous slurry and reinforcement fibers being mixed to the fiber-slurry mixture outlet;

wherein the centrally horizontally oriented shaft is externally connected to a drive mechanism and a drive motor to accomplish said shaft rotation.

5. The method of claim 4, wherein orientation of the paddle head having a broad surface with respect to the centrally horizontally oriented shaft vertical cross-section is from about 10° to 80°, wherein the overall dimensions of the paddles are such that the clearance space between the inner circumference of the mixing chamber and the paddle's furthermost point from the centrally horizontally oriented shaft is less than ¼.

6. The method of claim 1, wherein the single pass horizontal continuous mixer is a single combination continuous mixer vessel performing the mixing of the water and cementitous material and reinforcement fibers, wherein a first section of the combination continuous mixer vessel produces the cementitous slurry by combining all dry powders, chemical additives, and water; and a second section of the combination continuous mixer vessel comprises the mixing chamber which produces the fiber reinforced cementitous slurry mixture by introducing and combining the reinforcing fibers with the incoming cementitous slurry produced in the first section of the combination continuous mixer vessel.

7. The method of claim 1, wherein the dry cementitous powder is fed into the single pass horizontal continuous mixer through at least one of said inlet ports;

the horizontal continuous mixer comprising:

the elongated mixing chamber defined by the horizontal housing having the interior side wall, the elongated mixing chamber having an upstream end feed section, a first mixing section, and a second downstream end mixing section, wherein the first mixing section is between the upstream end feed section and the second downstream end mixing section, at least a pair of horizontally oriented intermeshing self-wiping impellers traversing from an upstream end of the elongated mixing chamber to a downstream end of the elongated mixing chamber and rotating within the elongated mixing chamber, wherein each horizontally mounted impeller within the upstream end feed section of the elongated mixing chamber comprises an auger, wherein the dry cementitous powder is fed into the upstream end feed section of the elongated mixing chamber and conveyed by the augers to the first mixing section, wherein a liquid stream comprising water is fed into the elongated mixing chamber of the continuous slurry mixer through at least one of said inlet ports downstream of the at least one dry cementitous powder inlet port and mixing the dry cementitous powder and the liquid stream in the first mixing section to form the cementitous slurry;

wherein each horizontally mounted impeller within the first mixing section comprises a first plurality of mixing paddles mounted on the horizontally oriented shaft of the impeller at regular intervals and different circumferential locations, the paddles rotated with the horizontally oriented shaft within the horizontal housing, the paddles extending radially from the horizontally oriented shaft, wherein a stream of the reinforcement fibers is fed through at least one of said inlet ports into the second mixing section, and the cementitous slurry and the reinforcement fibers mix in the second mixing section to form the fiber-slurry mixture, wherein at least a portion of each horizontally mounted impeller within the second mixing section of the elongated mixing chamber comprises at least one member selected from the group consisting of:

an auger, and a second plurality of mixing paddles mounted on the horizontally oriented shaft of the mixer at regular intervals and different circumferential locations, the paddles rotated about each respective horizontally oriented shaft within the horizontal housing, the paddles extending radially from the respective shaft, wherein the fiber-slurry mixture laterally discharges directly from the second mixing zone of the mixer through the fiber-slurry mixture outlet port at the downstream discharge end section of the horizontal housing which is a downstream end portion of the second mixing section.

8. The method of claim 7, wherein the paddles of the first and/or second mixing sections are selected from the group consisting of flat paddles and helical paddles, wherein the flat paddles and helical paddles are unitary paddles having a central opening fitted to the horizontally oriented shaft such that the paddle encircles a portion of the horizontally oriented shaft, wherein the flat paddles and helical paddles have opposed ends extending in opposite directions from the horizontally oriented shaft, wherein the flat paddles or helical paddles are employed in the second mixing section in a paddle portion of the second mixing section and an auger is also employed in the second mixing section before the paddle section of the second mixing section.

9. The method of claim 8, wherein augers on both shafts are used in the second mixing section followed by helical paddles mounted on both shafts.

10. The method of claim 8, wherein flat and/or helical paddles are on the shafts in the second mixing section and all adjacent flat and/or helical paddles on each shaft in the second mixing section have a zero to 90 degree rotation with respect to each other.

11. The method of claim 8, wherein flat and/or helical paddles are on the shaft in the second mixing section.

12. The method of claim 8, wherein second augers followed by mixing/conveying paddles followed by third augers are mounted on both shafts in the second mixing section.

13. The method of claim 7, wherein the paddle of the first and/or second mixing sections comprise a pin engaged to a paddle head, the pin pivotally engaged to the horizontally oriented shaft and/or the paddle head to permit pivotal rotation of the paddle head relative to the respective location on the horizontally oriented shaft, wherein the plurality of paddles are arranged to mix the reinforcement fibers and cementitious slurry and move the cementitious slurry and reinforcement fibers being mixed to the fiber-slurry mixture outlet, wherein the paddles of the first and second mixing section each comprise the pin engaged to the paddle head and the second mixing section has an absence of an auger.

14. The method of claim 13, wherein orientation of the paddle head having a broad surface with respect to the central shaft vertical cross-section is from about 10° to 80°, wherein the overall dimensions of the paddles are such that the clearance (space) between the inner circumference of the mixing chamber and the paddle's furthermost point from the central shaft is less than ¼.

15. The method of claim 1, wherein the fiber-slurry mixture has an absence of cellulosic fibers.

16. The method of claim 1, wherein the reinforcement fibers consist of fiberglass reinforcement fibers.

17. The method of claim 1, further comprising:
applying a first web of nonwoven fibers on the moving surface of a panel production line, the first web is sufficiently impermeable to prevent seepage of the fiber-slurry mixture on the panel production line, the first web being wider than the cement board being made;
forming a continuous trough by bending outer portions of the first web upright;
continuously depositing the fiber-slurry mixture from a headbox on the first web; and
distributing the fiber-slurry mixture laterally to fill the trough to a substantially uniform depth;
folding upright portions of the first web inward and over the fiber-slurry mixture such that edges are folded to wrap around right and left edges of the setting fiber-slurry mixture;
applying a second web of nonwoven fibers to an upper surface of the setting fiber-slurry mixture on the panel production line,
gluing the second web to the upper surface of the setting fiber-slurry mixture on the panel production line, and
then running the upper surface of the setting fiber-slurry mixture on the panel production line under a forming plate.

18. The method of claim 1, wherein the second section of the combination continuous mixer vessel has an absence of an auger.

19. The method of claim 1, wherein the at least one mixing element of the shaft, in the part of the mixing chamber for mixing the reinforcement fibers and cementitious slurry and moving the cementitious slurry and reinforcement fibers being mixed to the fiber-slurry mixture outlet consist of the plurality of mixing paddles mounted on the shaft at regular intervals and different circumferential locations to extend from the shaft,
wherein the mixing of the cementitious slurry and reinforcement fibers in the single pass horizontal continuous mixer to form a fiber-slurry mixture of fiber reinforced cementitious slurry occurs in the absence of an auger.

20. A continuous method for preparing a fiber reinforced concrete panel comprising:
mixing water and dry cementitious powder to form a cementitious slurry;
mixing the cementitious slurry and reinforcement fibers in a single pass horizontal continuous mixer to form a fiber-slurry mixture of fiber reinforced cementitious slurry mixture,
the single pass horizontal continuous mixer comprising:
an elongated mixing chamber defined by a horizontal housing having an interior side wall,
at least one reinforcement fiber inlet port to introduce the reinforcement fibers into the mixing chamber, and
upstream of the at least one fiber inlet port is (a) at least one inlet port to introduce the water and the dry cementitious powder together as one stream or (b) at least two inlet ports to introduce water and dry cementitious powder separately as separate streams into the chamber,
a fiber-slurry mixture outlet port at a downstream discharge end section of the horizontal housing to discharge the fiber reinforced cementitious slurry mixture, produced by the horizontal continuous mixer,
a venting port to remove any air introduced into the mixing chamber from raw material feed, and
a rotating centrally horizontally oriented shaft mounted within the elongated mixing chamber traversing from one end of the horizontal continuous mixer to another end of the horizontal continuous mixer,
wherein the cementitious slurry and reinforcement fibers are mixed in a part of the mixing chamber for mixing the reinforcement fibers and cementitious slurry and moving the cementitous slurry and reinforcement fibers being mixed to the fiber-slurry mixture outlet;
wherein the centrally horizontally oriented shaft in the part of the mixing chamber for mixing the reinforcement fibers and cementitous slurry and moving the cementitous slurry and reinforcement fibers being mixed to the fiber-slurry mixture outlet comprises at least one mixing element selected from the group consisting of (1) an auger and (2) a plurality of mixing paddles mounted on the shaft at regular intervals and different circumferential locations to extend from the shaft, wherein the at least one mixing element rotates with the shaft within the housing;
wherein the cementitious slurry and reinforcement fibers are mixed in the mixing chamber of the single pass horizontal continuous mixer for an average mixing residence time of about 5 to about 240 seconds while the at least one mixing element applies shear force, wherein the centrally horizontally oriented shaft rotates at 30 to 450 RPM;

discharging the fiber-slurry mixture from the horizontal mixer;

wherein, simultaneous with the discharging of the water, the dry cementitous powder, and the reinforcement fibers forming the fiber-slurry mixture from the single pass horizontal continuous mixer, further water, cementitous powder which is dry or combined with the further water, and reinforcement fibers forming further fiber-slurry mixture are fed to the single pass horizontal continuous mixer;

feeding the fiber-slurry mixture to a forming assembly which deposits the fiber-slurry mixture on a moving surface of a panel production line uniformly as a layer 0.25 to 2 inches thick;

leveling the fiber-slurry mixture on the moving surface;

allowing the fiber-slurry mixture to set on the moving surface;

cutting the set fiber-slurry mixture into panels and removing the panels from the moving surface, wherein an additional layer of fiber-slurry mixture is not deposited on the deposited layer of fiber-slurry mixture, wherein the moving surface is a moving endless belt with belt bonded slit formers comprising raised portions on the belt with slits in the direction transverse to travel, the slits are narrow so the adjacent portions of the belt bonded slit formers divided by a slit are tight against each other to seal and hold back fiber-slurry mixture when travelling in a straight direction but open when traveling in a curved direction.

* * * * *